US012739089B2

(12) United States Patent
Zhang et al.

(10) Patent No.: US 12,739,089 B2
(45) Date of Patent: Sep. 15, 2026

(54) TECHNIQUES FOR SYNCHRONIZATION SIGNAL BLOCK TRANSMISSION IN FULL-DUPLEX COMMUNICATIONS

(71) Applicant: QUALCOMM Incorporated, San Diego, CA (US)

(72) Inventors: Qian Zhang, Basking Ridge, NJ (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 18/500,861

(22) Filed: Nov. 2, 2023

(65) Prior Publication Data

US 2025/0150245 A1 May 8, 2025

(51) Int. Cl.

| | |
|---|---|
| ***H04L 5/14*** | (2006.01) |
| ***H04L 5/00*** | (2006.01) |
| ***H04W 28/02*** | (2009.01) |
| ***H04W 72/56*** | (2023.01) |

(52) U.S. Cl.

CPC .............. *H04L 5/14* (2013.01); *H04L 5/0048* (2013.01); *H04W 28/0215* (2013.01); *H04W 72/56* (2023.01)

(58) Field of Classification Search

CPC ........ H04L 5/14; H04L 5/0048; H04W 72/56; H04W 28/0215

See application file for complete search history.

(56) References Cited

U.S. PATENT DOCUMENTS

| | | | | |
|---|---|---|---|---|
| 2021/0273774 | A1* | 9/2021 | Abotabl | H04L 5/14 |
| 2021/0337489 | A1* | 10/2021 | Abotabl | H04L 1/0013 |
| 2021/0337495 | A1* | 10/2021 | Abotabl | H04L 5/0048 |
| 2021/0360618 | A1* | 11/2021 | Novlan | H04W 56/001 |

(Continued)

FOREIGN PATENT DOCUMENTS

| | | | |
|---|---|---|---|
| CN | 117917162 | * | 9/2022 |
| EP | 4002947 | A1 | 5/2022 |

(Continued)

OTHER PUBLICATIONS

Abdelghaffar translation of CN 117917162 2022-09-09 (Year: 2022).*

(Continued)

*Primary Examiner* — Zaihan Jiang

(74) *Attorney, Agent, or Firm* — Holland & Hart LLP

(57) ABSTRACT

Methods, systems, and devices for wireless communications are described in which full-duplex communications may be configured at a serving network entity. One or more symbols of a set of symbols may be configured for full-duplex communications at the network entity, and at least a first symbol that is configured for full-duplex communications also may be configured for synchronization signal block (SSB) transmissions according to a SSB configuration. A user equipment (UE) that is configured to monitor the first symbol for a SSB may use a priority rule to determine whether to transmit an uplink communication on the first symbol, or to monitor for the SSB on the first symbol. Additionally, or alternatively, a UE may transmit capability information that indicates whether the UE supports the full-duplex operation configured in SSB symbols.

24 Claims, 27 Drawing Sheets

(56) References Cited

U.S. PATENT DOCUMENTS

| | | | | |
|---|---|---|---|---|
| 2021/0367651 | A1* | 11/2021 | Zhang | H04B 7/0696 |
| 2021/0368459 | A1* | 11/2021 | Zhang | H04B 17/336 |
| 2022/0014346 | A1* | 1/2022 | Zhang | H04B 7/022 |
| 2022/0103236 | A1* | 3/2022 | Zhang | H04B 17/336 |
| 2022/0182110 | A1* | 6/2022 | Zhang | H04B 17/336 |
| 2022/0182999 | A1* | 6/2022 | Zhang | H04L 5/0053 |
| 2022/0183041 | A1* | 6/2022 | Zhang | H04B 7/0696 |
| 2022/0271791 | A1* | 8/2022 | Zhang | H04B 7/0695 |
| 2023/0088283 | A1* | 3/2023 | Lee | H04W 56/001<br>370/503 |

FOREIGN PATENT DOCUMENTS

| | | | |
|---|---|---|---|
| WO | WO-2022211388 | * | 3/2022 |
| WO | WO-2023033609 | A1 | 3/2023 |

OTHER PUBLICATIONS

Partial International Search Report—PCT/US2024/050579—ISA/EPO—Jan. 31, 2025.

International Search Report and Written Opinion—PCT/US2024/050579—ISA/EPO—Mar. 21, 2025.

* cited by examiner

Receive first configuration information for full-duplex communications for a set of symbols, the full-duplex communications providing uplink communications and downlink communications for each symbol of the set of symbols

1705

Receive second configuration information for synchronization signal block transmissions, where the second configuration information indicates at least a first subset of symbols of the set of symbols is configured in symbols overlapped on one or more symbols configured for a synchronization signal block transmission

1710

Receive configured grant information that provides periodic uplink resources for a set of multiple configured grant uplink transmissions, including first periodic uplink resources that include the first symbol for a first configured grant uplink transmission, and where the method further includes

1715

Configure the first symbol for uplink communications or downlink communications based on a priority rule associated with the full-duplex communications, where the priority rule indicates the first symbol is to be configured for uplink communications or for downlink communications for reception of the synchronization signal block transmission based on whether the uplink transmission is a dynamically scheduled uplink transmission or a configured grant uplink transmission

1720

Transmit the uplink transmission in the first symbol based on the priority rule and the second configuration information indicating that the UE is not to measure the synchronization signal block transmission in the first symbol

1725

1700

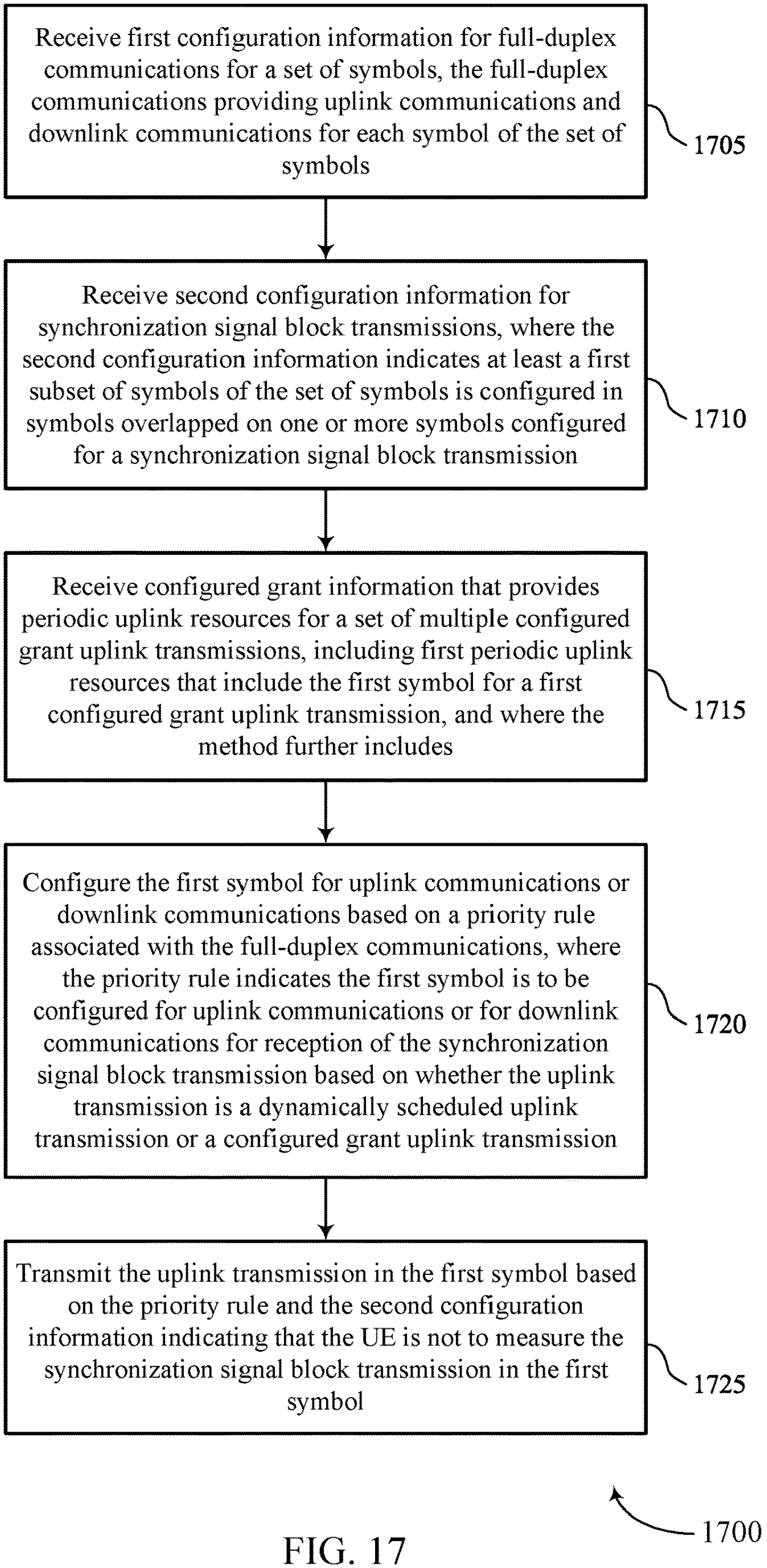

FIG. 17

TECHNIQUES FOR SYNCHRONIZATION SIGNAL BLOCK TRANSMISSION IN FULL-DUPLEX COMMUNICATIONS

FIELD OF TECHNOLOGY

The following relates to wireless communications, including techniques for synchronization signal block transmission in full-duplex communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, certain devices (e.g., base stations, transmission-reception points, radio heads, or other network entities) may operate in a full-duplex mode in which the device transmits signals and receives signals using a same set of wireless resources (e.g., a same or overlapping set of time and frequency resources). Efficient techniques for reliable communications when a device is operating in full-duplex mode can help to enhance network efficiency, enhance network throughput, and create an enhanced user experience.

SUMMARY

The described techniques relate to improved methods, systems, devices, and apparatuses that support techniques for synchronization signal block (SSB) transmission in full-duplex communications. For example, the described techniques provide for one or more symbols of a set of symbols to be configured for full-duplex communications at a network entity, in which the network entity receives uplink communications and transmits downlink communications on each of the one or more symbols. Further, at least a first symbol that is configured for full-duplex communications also may be configured for SSB according to a SSB configuration. In accordance with some aspects, a user equipment (UE) that is configured to monitor the first symbol for a SSB may use a priority rule to determine whether to transmit an uplink communication on the first symbol, or is to receive the SSB on the first symbol. In some aspects, the priority rule may provide that a dynamically scheduled uplink transmission has priority over receiving SSB, and that a configured grant uplink transmission has lower priority than receiving SSB. Thus, in such aspects, if an uplink transmission is dynamically scheduled, the UE transmits the uplink transmission on the first symbol and skips receiving the SSB. In cases where the uplink transmission is a configured grant transmission, if the UE is configured to receive the SSB on the symbol the UE may skip the configured grant transmission and receive the SSB, and if the UE is not configured to receive the SSB on the symbol the UE may transmit the configured grant transmission on the symbol. Additionally, or alternatively, a UE may transmit capability information that indicates whether the UE supports the full-duplex operation configured in SSB symbols.

A method for wireless communications by a user equipment (UE) is described. The method may include receiving first configuration information for full-duplex communications for a set of symbols, the full-duplex communications providing uplink communications and downlink communications for each symbol of the set of symbols, receiving second configuration information for synchronization signal block transmissions, where the second configuration information indicates at least a first subset of symbols of the set of symbols is configured in symbols overlapped on one or more symbols configured for a synchronization signal block transmission, receiving scheduling information that indicates an uplink transmission is scheduled for transmission in at least a first symbol of the first subset of symbols, and configuring the first symbol for uplink communications or downlink communications based on a priority rule associated with the full-duplex communications, where the priority rule indicates the first symbol is to be configured for uplink communications or for downlink communications for reception of the synchronization signal block transmission based on whether the uplink transmission is a dynamically scheduled uplink transmission or a configured grant uplink transmission.

A UE for wireless communications is described. The UE may include one or more memories storing processor executable code, and one or more processors coupled with the one or more memories. The one or more processors may individually or collectively operable to execute the code to cause the UE to receive first configuration information for full-duplex communications for a set of symbols, the full-duplex communications providing uplink communications and downlink communications for each symbol of the set of symbols, receive second configuration information for synchronization signal block transmissions, where the second configuration information indicates at least a first subset of symbols of the set of symbols is configured in symbols overlapped on one or more symbols configured for a synchronization signal block transmission, receive scheduling information that indicates an uplink transmission is scheduled for transmission in at least a first symbol of the first subset of symbols, and configure the first symbol for uplink communications or downlink communications based on a priority rule associated with the full-duplex communications, where the priority rule indicates the first symbol is to be configured for uplink communications or for downlink communications for reception of the synchronization signal block transmission based on whether the uplink transmission is a dynamically scheduled uplink transmission or a configured grant uplink transmission.

Another UE for wireless communications is described. The UE may include means for receiving first configuration information for full-duplex communications for a set of symbols, the full-duplex communications providing uplink communications and downlink communications for each symbol of the set of symbols, means for receiving second configuration information for synchronization signal block transmissions, where the second configuration information indicates at least a first subset of symbols of the set of symbols is configured in symbols overlapped on one or more symbols configured for a synchronization signal block transmission, means for receiving scheduling information that indicates an uplink transmission is scheduled for transmission in at least a first symbol of the first subset of symbols, and means for configuring the first symbol for uplink communications or downlink communications based on a priority rule associated with the full-duplex communications, where the priority rule indicates the first symbol is to be configured for uplink communications or for downlink communications for reception of the synchronization signal block transmission based on whether the uplink transmission is a dynamically scheduled uplink transmission or a configured grant uplink transmission.

A non-transitory computer-readable medium storing code for wireless communications is described. The code may include instructions executable by a processor to receive first configuration information for full-duplex communications for a set of symbols, the full-duplex communications providing uplink communications and downlink communications for each symbol of the set of symbols, receive second configuration information for synchronization signal block transmissions, where the second configuration information indicates at least a first subset of symbols of the set of symbols is configured in symbols overlapped on one or more symbols configured for a synchronization signal block transmission, receive scheduling information that indicates an uplink transmission is scheduled for transmission in at least a first symbol of the first subset of symbols, and configure the first symbol for uplink communications or downlink communications based on a priority rule associated with the full-duplex communications, where the priority rule indicates the first symbol is to be configured for uplink communications or for downlink communications for reception of the synchronization signal block transmission based on whether the uplink transmission is a dynamically scheduled uplink transmission or a configured grant uplink transmission.

In some examples of the method, user equipment (UEs), and non-transitory computer-readable medium described herein, the receiving the scheduling information may include operations, features, means, or instructions for receiving downlink control information that includes a dynamically scheduled uplink resource allocation of a set of resources that includes the first symbol, and the uplink transmission is transmitted in the first symbol based on the priority rule.

In some examples of the method, user equipment (UEs), and non-transitory computer-readable medium described herein, the receiving the scheduling information may include operations, features, means, or instructions for receiving configured grant information that provides periodic uplink resources for a set of multiple configured grant uplink transmissions, including first periodic uplink resources that include the first symbol for a first configured grant uplink transmission, and the synchronization signal block transmission is received in the first symbol based on the priority rule and the second configuration information indicating that the UE is to measure the synchronization signal block transmission, and where the first configured grant uplink transmission is skipped.

In some examples of the method, user equipment (UEs), and non-transitory computer-readable medium described herein, the receiving the scheduling information may include operations, features, means, or instructions for receiving configured grant information that provides periodic uplink resources for a set of multiple configured grant uplink transmissions, including first periodic uplink resources that include the first symbol for a first configured grant uplink transmission, and where the uplink transmission is transmitted in the first symbol based on the priority rule and the second configuration information indicating that the UE is not to measure the synchronization signal block transmission in the first symbol.

Some examples of the method, user equipment (UEs), and non-transitory computer-readable medium described herein may further include operations, features, means, or instructions for transmitting a capability message that indicates whether the UE supports receipt of synchronization signal blocks in symbols that are configured for full-duplex communications.

In some examples of the method, user equipment (UEs), and non-transitory computer-readable medium described herein, the capability message is transmitted in capability signaling subsequent to establishment of a radio resource control connection, or is transmitted as an early UE capability indication prior to establishment of the radio resource control connection.

In some examples of the method, user equipment (UEs), and non-transitory computer-readable medium described herein, the first configuration information is a sub-band full-duplex configuration in which at least a first sub-band of a component carrier bandwidth is configured for downlink communications and at least a second sub-band of the component carrier bandwidth or another component carrier is configured for uplink communications.

A method for wireless communications by a UE is described. The method may include transmitting, to a network entity, a capability message that indicates whether the UE supports receipt of synchronization signal blocks in symbols that are configured for full-duplex communications, receiving a synchronization signal block configuration that indicates at least a first symbol of a set of symbols is configured for reception of a synchronization signal block, the first symbol also configured for full-duplex communications, the full-duplex communications providing uplink communications and downlink communications for the first symbol, and communicating with the network entity based on the capability message indication and the synchronization signal block configuration of the first symbol.

A UE for wireless communications is described. The UE may include one or more memories storing processor executable code, and one or more processors coupled with the one or more memories. The one or more processors may individually or collectively operable to execute the code to cause the UE to transmit, to a network entity, a capability message that indicates whether the UE supports receipt of synchronization signal blocks in symbols that are configured for full-duplex communications, receive a synchronization signal block configuration that indicates at least a first symbol of a set of symbols is configured for reception of a synchronization signal block, the first symbol also configured for full-duplex communications, the full-duplex communications providing uplink communications and downlink communications for the first symbol, and communicate with the network entity based on the capability message indication and the synchronization signal block configuration of the first symbol.

Another UE for wireless communications is described. The UE may include means for transmitting, to a network entity, a capability message that indicates whether the UE supports receipt of synchronization signal blocks in symbols that are configured for full-duplex communications, means for receiving a synchronization signal block configuration that indicates at least a first symbol of a set of symbols is configured for reception of a synchronization signal block, the first symbol also configured for full-duplex communications, the full-duplex communications providing uplink communications and downlink communications for the first symbol, and means for communicating with the network entity based on the capability message indication and the synchronization signal block configuration of the first symbol.

A non-transitory computer-readable medium storing code for wireless communications is described. The code may include instructions executable by a processor to transmit, to a network entity, a capability message that indicates whether the UE supports receipt of synchronization signal blocks in symbols that are configured for full-duplex communications, receive a synchronization signal block configuration that indicates at least a first symbol of a set of symbols is configured for reception of a synchronization signal block, the first symbol also configured for full-duplex communications, the full-duplex communications providing uplink communications and downlink communications for the first symbol, and communicate with the network entity based on the capability message indication and the synchronization signal block configuration of the first symbol.

Some examples of the method, user equipment (UEs), and non-transitory computer-readable medium described herein may further include operations, features, means, or instructions for receiving at least a portion of the synchronization signal block in the first symbol based on the capability message indicating that the UE supports receipt of synchronization signal blocks in symbols configured for full-duplex communications.

Some examples of the method, user equipment (UEs), and non-transitory computer-readable medium described herein may further include operations, features, means, or instructions for receiving synchronization signal blocks only in symbols configured for half-duplex communications based on the capability message indicating that reception of the synchronization signal blocks in symbols configured for full-duplex communications is unsupported by the UE.

In some examples of the method, user equipment (UEs), and non-transitory computer-readable medium described herein, the capability message is transmitted in capability signaling subsequent to establishment of a radio resource control connection, or is transmitted as an early UE capability indication prior to establishment of the radio resource control connection.

In some examples of the method, user equipment (UEs), and non-transitory computer-readable medium described herein, the communicating with the network entity may include operations, features, means, or instructions for configuring the first symbol for an uplink communication or a downlink communication based on a priority rule associated with the full-duplex communications.

In some examples of the method, user equipment (UEs), and non-transitory computer-readable medium described herein, the priority rule indicates the first symbol is to be configured for uplink communications or for the downlink communication for reception of the synchronization signal block based on whether the uplink communication is a dynamically scheduled uplink transmission or a configured grant uplink transmission.

In some examples of the method, user equipment (UEs), and non-transitory computer-readable medium described herein, uplink transmissions are prohibited for UEs configured to monitor for synchronization signal blocks in symbols that are configured for full-duplex communications, and where the capability message indicates that the UE supports receiving synchronization signal blocks in symbols that are configured for full-duplex communications.

In some examples of the method, user equipment (UEs), and non-transitory computer-readable medium described herein, the capability message indicates that the UE does not support receiving synchronization signal blocks in symbols that are configured for full-duplex communications, and where synchronization signal blocks are not configured to be transmitted in symbols that are configured for full-duplex communications.

In some examples of the method, user equipment (UEs), and non-transitory computer-readable medium described herein, uplink transmissions are allowed for UEs configured to monitor for synchronization signal blocks in symbols that are configured for full-duplex communications, and where the capability message indicates that the UE supports receiving downlink communications and transmitting uplink communications in symbols that are configured for full-duplex communications and that include synchronization signal block transmissions.

In some examples of the method, user equipment (UEs), and non-transitory computer-readable medium described herein, a priority rule is used to determine whether to transmit an uplink communication or receive a synchronization signal block transmission in a symbol configured for full-duplex communications that includes a synchronization signal block transmission.

Some examples of the method, user equipment (UEs), and non-transitory computer-readable medium described herein may further include operations, features, means, or instructions for receiving full-duplex configuration information in common signaling that is provided to a set of multiple UEs, and where the full-duplex configuration information applies to each UE of the set of multiple UEs.

In some examples of the method, user equipment (UEs), and non-transitory computer-readable medium described herein, the capability message indicates that the UE does not support receiving synchronization signal blocks in symbols that are configured for full-duplex communications, and where the UE ignores synchronization signal blocks that are configured in full-duplex symbols.

In some examples of the method, user equipment (UEs), and non-transitory computer-readable medium described herein, the capability message indicates that the UE does not support receiving synchronization signal blocks in symbols that are configured for full-duplex communications, and where the UE ignores full-duplex configuration information that is provided in common signaling for the set of multiple UEs.

In some examples of the method, user equipment (UEs), and non-transitory computer-readable medium described herein, the full-duplex communications are configured by a sub-band full-duplex configuration in which at least a first sub-band of a component carrier bandwidth is configured for downlink communications and at least a second sub-band of the component carrier bandwidth or another component carrier is configured for uplink communications.

A method for wireless communications by a network entity is described. The method may include transmitting, to a UE, first configuration information for full-duplex communications for a set of symbols, the full-duplex communications providing uplink communications and downlink communications for each symbol of the set of symbols, transmitting second configuration information for synchronization signal block transmissions, where the second configuration information indicates at least a first subset of symbols of the set of symbols is configured in symbols overlapped on one or more symbols configured for a synchronization signal block transmission, transmitting, to the UE, scheduling information that indicates an uplink transmission is scheduled for transmission in at least a first symbol of the first subset of symbols, and monitoring the first symbol for uplink communications from the UE based on a priority rule associated with the full-duplex communications, where the priority rule indicates the first symbol is for uplink communications from the UE or for downlink communications of the synchronization signal block transmission based on whether the uplink transmission is a dynamically scheduled uplink transmission or a configured grant uplink transmission.

A network entity for wireless communications is described. The network entity may include one or more memories storing processor executable code, and one or more processors coupled with the one or more memories. The one or more processors may individually or collectively operable to execute the code to cause the network entity to transmit, to a UE, first configuration information for full-duplex communications for a set of symbols, the full-duplex communications providing uplink communications and downlink communications for each symbol of the set of symbols, transmit second configuration information for synchronization signal block transmissions, where the second configuration information indicates at least a first subset of symbols of the set of symbols is configured in symbols overlapped on one or more symbols configured for a synchronization signal block transmission, transmit, to the UE, scheduling information that indicates an uplink transmission is scheduled for transmission in at least a first symbol of the first subset of symbols, and monitor the first symbol for uplink communications from the UE based on a priority rule associated with the full-duplex communications, where the priority rule indicates the first symbol is for uplink communications from the UE or for downlink communications of the synchronization signal block transmission based on whether the uplink transmission is a dynamically scheduled uplink transmission or a configured grant uplink transmission.

Another network entity for wireless communications is described. The network entity may include means for transmitting, to a UE, first configuration information for full-duplex communications for a set of symbols, the full-duplex communications providing uplink communications and downlink communications for each symbol of the set of symbols, means for transmitting second configuration information for synchronization signal block transmissions, where the second configuration information indicates at least a first subset of symbols of the set of symbols is configured in symbols overlapped on one or more symbols configured for a synchronization signal block transmission, means for transmitting, to the UE, scheduling information that indicates an uplink transmission is scheduled for transmission in at least a first symbol of the first subset of symbols, and means for monitoring the first symbol for uplink communications from the UE based on a priority rule associated with the full-duplex communications, where the priority rule indicates the first symbol is for uplink communications from the UE or for downlink communications of the synchronization signal block transmission based on whether the uplink transmission is a dynamically scheduled uplink transmission or a configured grant uplink transmission.

A non-transitory computer-readable medium storing code for wireless communications is described. The code may include instructions executable by a processor to transmit, to a UE, first configuration information for full-duplex communications for a set of symbols, the full-duplex communications providing uplink communications and downlink communications for each symbol of the set of symbols, transmit second configuration information for synchronization signal block transmissions, where the second configuration information indicates at least a first subset of symbols of the set of symbols is configured in symbols overlapped on one or more symbols configured for a synchronization signal block transmission, transmit, to the UE, scheduling information that indicates an uplink transmission is scheduled for transmission in at least a first symbol of the first subset of symbols, and monitor the first symbol for uplink communications from the UE based on a priority rule associated with the full-duplex communications, where the priority rule indicates the first symbol is for uplink communications from the UE or for downlink communications of the synchronization signal block transmission based on whether the uplink transmission is a dynamically scheduled uplink transmission or a configured grant uplink transmission.

In some examples of the method, network entities, and non-transitory computer-readable medium described herein, the transmitting the scheduling information may include operations, features, means, or instructions for transmitting downlink control information that includes a dynamically scheduled uplink resource allocation of a set of resources that includes the first symbol, and where the uplink transmission is received in the first symbol based on the priority rule.

In some examples of the method, network entities, and non-transitory computer-readable medium described herein, the transmitting the scheduling information may include operations, features, means, or instructions for transmitting configured grant information that provides periodic uplink resources for a set of multiple configured grant uplink transmissions, including first periodic uplink resources that include the first symbol for a first configured grant uplink transmission, and where the monitoring of the first symbol is skipped for the first configured grant uplink transmission based on the priority rule and the second configuration information indicating that the UE is to measure the synchronization signal block transmission.

In some examples of the method, network entities, and non-transitory computer-readable medium described herein, the transmitting the scheduling information may include operations, features, means, or instructions for transmitting configured grant information that provides periodic uplink resources for a set of multiple configured grant uplink transmissions, including first periodic uplink resources that include the first symbol for a first configured grant uplink transmission, and where the uplink transmission is received in the first symbol based on the priority rule and the second configuration information indicating that the UE is not to measure the synchronization signal block transmission in the first symbol.

Some examples of the method, network entities, and non-transitory computer-readable medium described herein may further include operations, features, means, or instructions for receiving a capability message from the UE that indicates whether the UE supports receipt of synchronization signal blocks in symbols that are configured for full-duplex communications.

In some examples of the method, network entities, and non-transitory computer-readable medium described herein, the capability message is received in capability signaling subsequent to establishment of a radio resource control connection, or is received as an early UE capability indication prior to establishment of the radio resource control connection.

In some examples of the method, network entities, and non-transitory computer-readable medium described herein, the first configuration information is a sub-band full-duplex configuration in which at least a first sub-band of a component carrier bandwidth is configured for downlink communications and at least a second sub-band of the component carrier bandwidth or another component carrier is configured for uplink communications.

A method for wireless communications by a network entity is described. The method may include receiving, from a UE, a capability message that indicates whether the UE supports receipt of synchronization signal blocks in symbols that are configured for full-duplex communications, transmitting a synchronization signal block configuration that indicates at least a first symbol of a set of symbols is configured for transmission of a synchronization signal block, the first symbol also configured for full-duplex communications, the full-duplex communications providing uplink communications and downlink communications for the first symbol, and transmitting the synchronization signal block based on the capability message.

A network entity for wireless communications is described. The network entity may include one or more memories storing processor executable code, and one or more processors coupled with the one or more memories. The one or more processors may individually or collectively operable to execute the code to cause the network entity to receive, from a UE, a capability message that indicates whether the UE supports receipt of synchronization signal blocks in symbols that are configured for full-duplex communications, transmit a synchronization signal block configuration that indicates at least a first symbol of a set of symbols is configured for transmission of a synchronization signal block, the first symbol also configured for full-duplex communications, the full-duplex communications providing uplink communications and downlink communications for the first symbol, and transmit the synchronization signal block based on the capability message.

Another network entity for wireless communications is described. The network entity may include means for receiving, from a UE, a capability message that indicates whether the UE supports receipt of synchronization signal blocks in symbols that are configured for full-duplex communications, means for transmitting a synchronization signal block configuration that indicates at least a first symbol of a set of symbols is configured for transmission of a synchronization signal block, the first symbol also configured for full-duplex communications, the full-duplex communications providing uplink communications and downlink communications for the first symbol, and means for transmitting the synchronization signal block based on the capability message.

A non-transitory computer-readable medium storing code for wireless communications is described. The code may include instructions executable by a processor to receive, from a UE, a capability message that indicates whether the UE supports receipt of synchronization signal blocks in symbols that are configured for full-duplex communications, transmit a synchronization signal block configuration that indicates at least a first symbol of a set of symbols is configured for transmission of a synchronization signal block, the first symbol also configured for full-duplex communications, the full-duplex communications providing uplink communications and downlink communications for the first symbol, and transmit the synchronization signal block based on the capability message.

Some examples of the method, network entities, and non-transitory computer-readable medium described herein may further include operations, features, means, or instructions for transmitting at least a portion of the synchronization signal block to the UE in the first symbol based on the capability message indicating that the UE supports receipt of synchronization signal blocks in symbols configured for full-duplex communications.

Some examples of the method, network entities, and non-transitory computer-readable medium described herein may further include operations, features, means, or instructions for transmitting synchronization signal blocks to the UE only in symbols configured for half-duplex communications based on the capability message indicating that reception of the synchronization signal blocks in symbols configured for full-duplex communications is unsupported by the UE.

In some examples of the method, network entities, and non-transitory computer-readable medium described herein, the capability message is transmitted in capability signaling subsequent to establishment of a radio resource control connection, or is transmitted as an early UE capability indication prior to establishment of the radio resource control connection.

Some examples of the method, network entities, and non-transitory computer-readable medium described herein may further include operations, features, means, or instructions for configuring the first symbol for uplink communications or downlink communications based on a priority rule associated with the full-duplex communications.

In some examples of the method, network entities, and non-transitory computer-readable medium described herein, the priority rule indicates the first symbol is to be configured for uplink communications or for downlink communications for reception of the synchronization signal block transmission based on whether the uplink communications are dynamically scheduled uplink transmissions or are configured grant uplink transmissions.

In some examples of the method, network entities, and non-transitory computer-readable medium described herein, uplink transmissions are prohibited for UEs configured to monitor for synchronization signal blocks in symbols that are configured for full-duplex communications, and where the capability message indicates that the UE supports receiving synchronization signal blocks in symbols that are configured for full-duplex communications.

In some examples of the method, network entities, and non-transitory computer-readable medium described herein, the capability message indicates that the UE does not support receiving synchronization signal blocks in symbols that are configured for full-duplex communications, and where synchronization signal blocks are not transmitted in symbols that are configured for full-duplex communications.

In some examples of the method, network entities, and non-transitory computer-readable medium described herein, uplink transmissions are allowed for UEs configured to monitor for synchronization signal blocks in symbols that are configured for full-duplex communications, and where the capability message indicates that the UE supports receiving downlink communications and transmitting uplink communications in symbols that are configured for full-duplex communications and that include synchronization signal block transmissions.

In some examples of the method, network entities, and non-transitory computer-readable medium described herein, a priority rule is used to determine whether to monitor for an uplink communication in a symbol configured for full-duplex communications that includes a synchronization signal block transmission.

Some examples of the method, network entities, and non-transitory computer-readable medium described herein may further include operations, features, means, or instructions for transmitting full-duplex configuration information to a set of multiple UEs in common signaling, and where the full-duplex configuration information applies to each UE of the set of multiple UEs.

In some examples of the method, network entities, and non-transitory computer-readable medium described herein, the capability message indicates that the UE does not support receiving synchronization signal blocks in symbols that are configured for full-duplex communications, and where the UE ignores synchronization signal blocks that are configured in full-duplex symbols.

In some examples of the method, network entities, and non-transitory computer-readable medium described herein, the capability message indicates that the UE does not support receiving synchronization signal blocks in symbols that are configured for full-duplex communications, and where the UE ignores full-duplex configuration information that is provided in common signaling for the set of multiple UEs.

In some examples of the method, network entities, and non-transitory computer-readable medium described herein, the full-duplex communications are configured by a sub-band full-duplex configuration in which at least a first sub-band of a component carrier bandwidth is configured for downlink communications and at least a second sub-band of the component carrier bandwidth or another component carrier is configured for uplink communications.

BRIEF DESCRIPTION OF THE DRAWINGS

FIGS. 14 through 27 show flowcharts illustrating methods that support techniques for SSB transmission in full-duplex communications in accordance with one or more aspects of the present disclosure.

DETAILED DESCRIPTION

Figure 1:
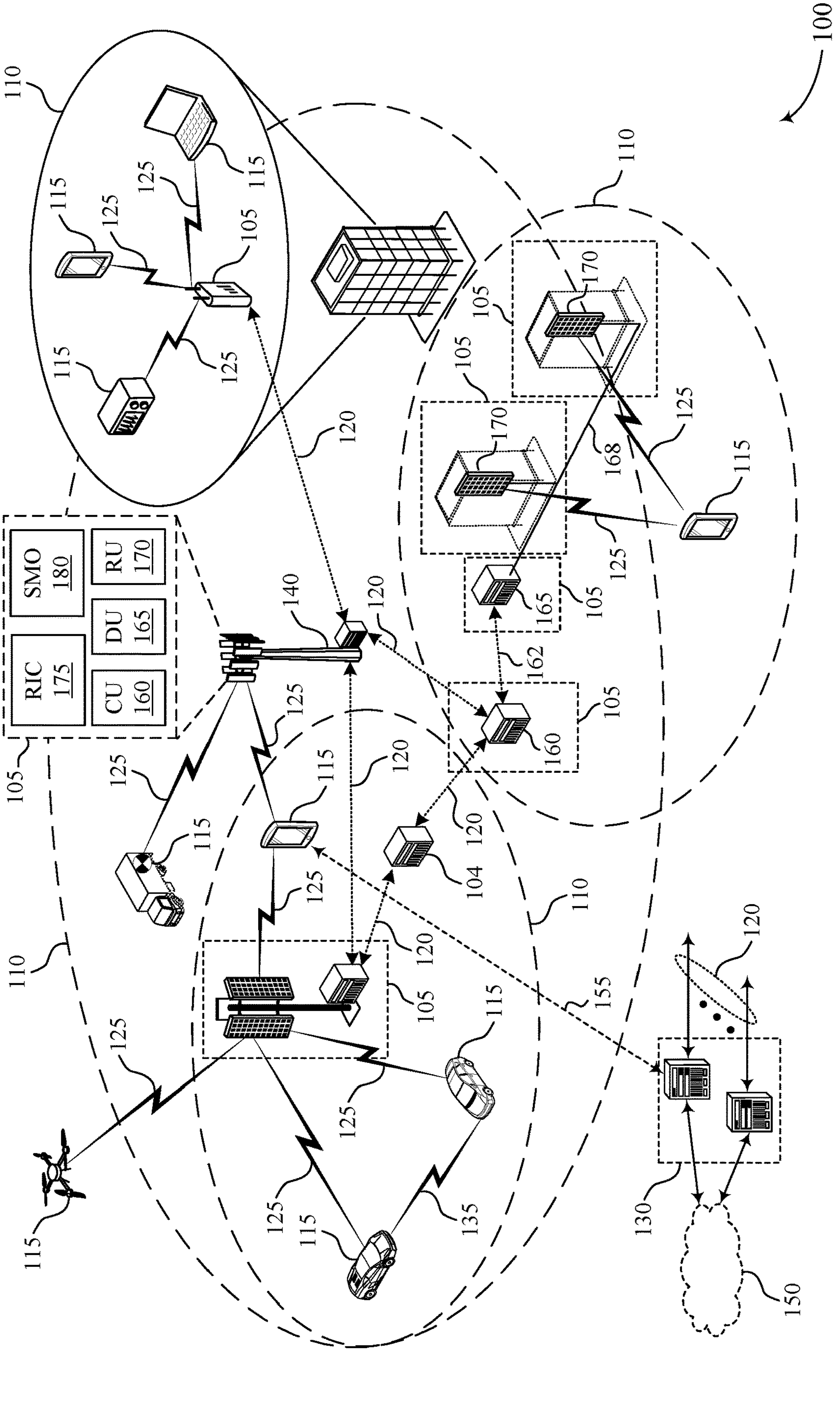
FIG. 1 shows an example of a wireless communications system that supports techniques for synchronization signal block (SSB) transmission in full-duplex communications in accordance with one or more aspects of the present disclosure.

In some systems, one or more devices, such as a network entity or a user equipment (UE), may operate in a full-duplex mode (also referred to as FD mode) in which the one or more devices transmit signals and receive signals using a same set of wireless resources (e.g., a same set of time and frequency resources). When a device is operating in full-duplex mode, concurrent transmission and reception may result in self-interference where transmitted signals interfere with signals that are to be concurrently received, cross-link interference (CLI) from other transmitters, or both. Such interference may reduce the likelihood of successful reception and decoding of communications, and various techniques to mitigate such interference may be implemented in order to enhance reliability of communications (e.g., higher transmission power during periods of full-duplex operation, reduced coding rates or modulation orders, beam selection to avoid interfering beams, or any combinations thereof).

In some deployments, full-duplex communication techniques may provide for full-duplex communications at a network entity, and half-duplex (also referred to as HD) communications at UEs. Thus, a network entity may transmit downlink communications to a first UE while receiving uplink communications from a second UE. In other deployments, one or more UEs, or both a UE and network entity, may operate using full-duplex communications. Further, some deployments may use sub-band full duplex (SBFD) in which a bandwidth part may be configured for full-duplex communications. In SBFD, the bandwidth part may be divided into downlink frequency resources and uplink frequency resources. For example, one or more frequency sub-bands may be for uplink communications and one or more other frequency sub-bands may be for downlink communications. In some cases, the uplink frequency sub-band(s) and the downlink frequency sub-band(s) may be non-overlapping, although techniques as discussed herein may be used in cases where downlink and uplink frequency sub-bands may be partially or fully overlapping. In some cases, a network entity may transmit synchronization signal blocks (SSBs) that may be measured at UEs in order to identify suitable beams for communications. Further, such SSBs may be configured in symbols that are also configured for full-duplex communications.

In accordance with various aspects discussed herein, techniques are provided for UE and network operation related to SSB transmissions in symbols that are also full-duplex symbols. In some aspects, one or more symbols of a set of symbols may be configured for full-duplex communications at a network entity, and at least a first symbol that is configured for full-duplex communications also may be configured for SSB according to a SSB configuration. In accordance with some aspects, a UE that is configured to monitor the first symbol for a SSB may use a priority rule to determine whether to transmit an uplink communication on the first symbol, or is to receive the SSB on the first symbol. In some aspects, the priority rule may provide that a dynamically scheduled uplink transmission has priority over receiving SSB, and that a configured grant uplink transmission has lower priority than receiving SSB. Thus, in such aspects, if an uplink transmission is dynamically scheduled, the UE transmits the uplink transmission on the first symbol and skips receiving the SSB. In cases where the uplink transmission is a configured grant transmission, if the UE is configured to receive the SSB on the symbol the UE may skip the configured grant transmission and receive the SSB, and if the UE is not configured to receive the SSB on the symbol the UE may transmit the configured grant transmission on the symbol.

In accordance with some aspects, a UE may transmit capability information that indicates whether the UE supports the full-duplex operation configured in SSB symbols. The signaling can be in UE capability signaling after establishing a radio resource control (RRC) connection, or in a random access channel (RACH) message (e.g., RACH MSG3) as an early UE capability indication before being RRC connected. In some cases, a UE may not be allowed to transmit in the SSB symbol but may be allowed to receive downlink in the SSB symbol, then UE may indicate a UE capability of whether the UE supports full-duplex operation configured in SSB symbols to receive the SSB. In cases where a UE does not support full-duplex operation configured in SSB symbols, a serving network entity may configure SSB transmissions for the UE only in half-duplex symbols. In cases where a UE may be allowed to transmit in the SSB full-duplex symbol, the UE capability may indicate whether the UE can receive, transmit, or both, on the SSB symbol. In cases where full-duplex configuration is provided in common signaling to multiple UEs, if the UE does not support SSB in full-duplex symbols, the UE may ignore SSBs in full-duplex symbols, or the UE may ignore the full-duplex configuration.

Techniques as discussed herein may thus provide for enhanced resource utilization and communications efficiency related to full-duplex communications. Such techniques may help to enhance network efficiency through additional flexibility of full-duplex configurations in which SSB transmissions may be provided in full-duplex symbols. Efficient UE operation may be provided through priority rules that indicate when a UE may transmit on a symbol versus monitor for SSB on the symbol, through an indication of UE capability related to full-duplex symbols that may include SSB transmissions, or both. Such techniques thus enhance network efficiency through reduced overhead, enhance reliability, enhance throughput, and provide for enhanced user experience.

Aspects of the disclosure are initially described in the context of wireless communications systems. Aspects of the disclosure are further illustrated by and described with reference to full-duplex and half-duplex operation modes and configurations, process flows, apparatus diagrams, system diagrams, and flowcharts that relate to techniques for SSB transmission in full-duplex communications.

FIG. 1 shows an example of a wireless communications system 100 that supports techniques for SSB transmission in full-duplex communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for SSB transmission in full-duplex communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some cases, full-duplex communications may be configured at a serving network entity 105 in which the UE 115, the network entity 105, or both can perform full-duplex communications or half-duplex communications. In some aspects, one or more symbols of a set of symbols may be configured for full-duplex communications at a network entity 105, and at least a first symbol that is configured for full-duplex communications also may be configured for SSB according to a SSB configuration. In accordance with some aspects, a UE 115 that is configured to monitor the first symbol for a SSB may use a priority rule to determine whether to transmit an uplink communication on the first symbol, or to monitor for the SSB on the first symbol. Additionally, or alternatively, a UE 115 may transmit capability information that indicates whether the UE 115 supports the full-duplex operation configured in SSB symbols.

Figure 2:
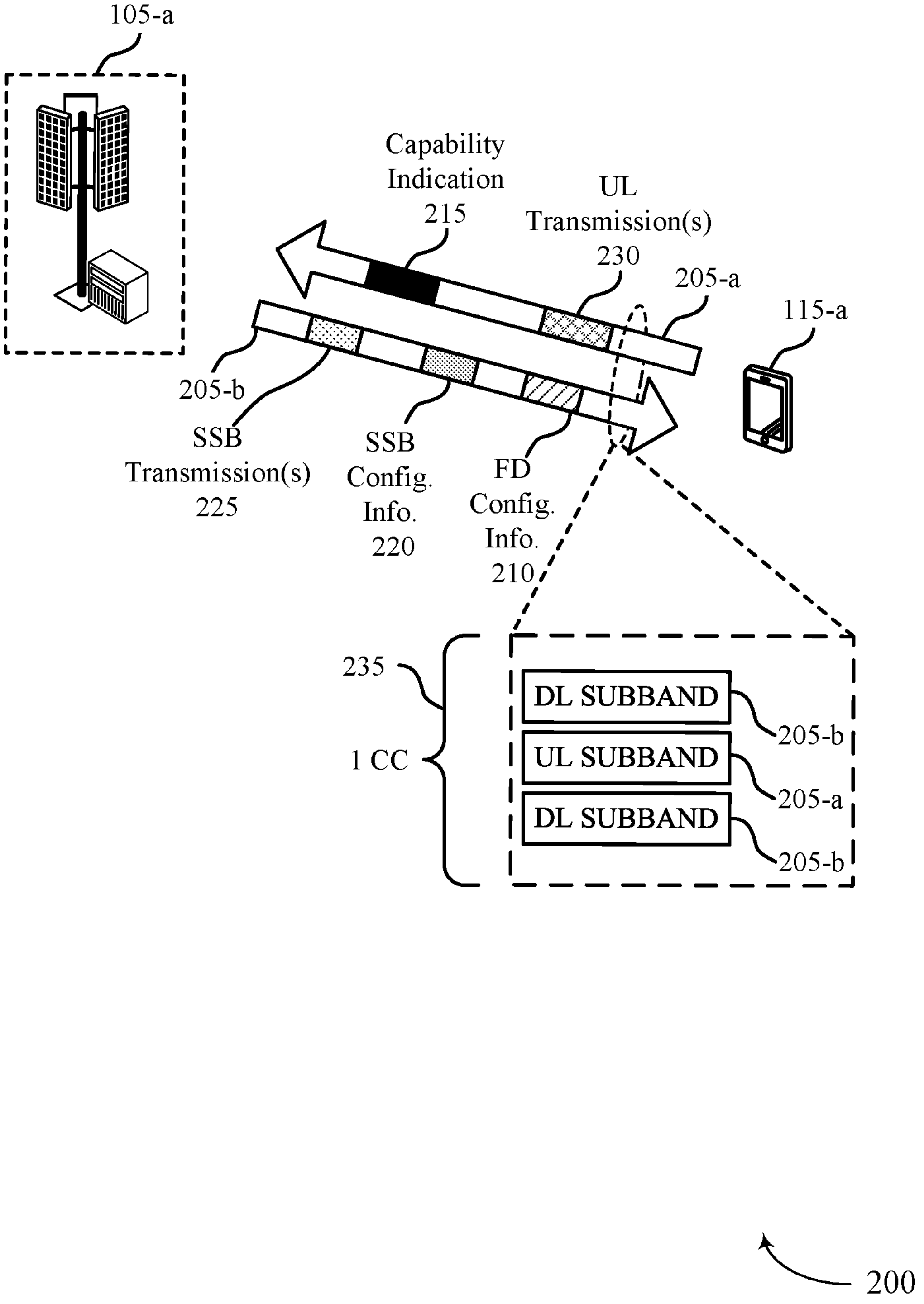
FIG. 2 shows an example of a wireless communications system that supports techniques for SSB transmission in full-duplex communications in accordance with one or more aspects of the present disclosure.

FIG. 2 shows an example of a wireless communications system 200 that supports techniques for SSB transmission in full-duplex communications in accordance with one or more aspects of the present disclosure. The wireless communications system 200 may include a network entity 105-*a*, and a UE 115-*a*, which may represent examples of a network entity 105 and UE 115 as described with reference to FIG. 1.

In this example, the UE 115-*a* may communicate with the network entity 105-*a* via uplink transmissions on one or more uplink sub-bands 205-*a* and downlink transmissions on one or more downlink sub-bands 205-*b* that may use a same component carrier, or that may use different component carriers. While the example of FIG. 2 illustrates sub-band full-duplex (SBFD), other examples may use in-band full-duplex (IBFD) in which uplink sub-bands 205-*a* and downlink sub-bands 205-*b* may be partially or completely overlapping. In the example of FIG. 2, the network entity 105-*a* and UE 115-*a*, for at least some communications, may operate in a full-duplex mode in which a first set of resources may be used for both uplink and downlink communications. For example, a downlink transmission to the UE 115-*a* may be transmitted contemporaneously with receipt of uplink transmissions from a different UE 115 or the UE 115-*a* (e.g., contemporaneous communications using a same frequency band).

In some aspects, the network entity 105-*a* may provide configuration information 210 to the UE 115-*a*. The configuration information 210 may provide a network full-duplex configuration that indicates a subset of a set of symbols are configured for full-duplex communications at the network entity 105-*a*. The network entity 105-*a* may also transmit SSB configuration information 220, that indicates symbols that include SSB transmissions (e.g., for periodic SSB transmissions on multiple beams). In some aspects, the UE 115-*a* and network entity 105-*a* may communicate in accordance with the full-duplex configuration, in which SSB transmissions 225 may be transmitted concurrently with uplink transmissions 230 from the UE 115-*a* or a different UE. In the example of FIG. 2, the full-duplex configuration is a SBFD configuration in which a CC 235 may have two downlink sub-bands 205-*b* and one uplink sub-band 205-*a*. In accordance with various aspects discussed herein, the UE 115-*a* may transmit a capability indication 215 that provides a capability of the UE 115-*a* related to receiving SSB transmissions 225 on full-duplex symbols, or transmitting uplink transmissions 230 on full-duplex symbols.

In some aspects, to support SBFD operation configured in SSB symbols, the UE 115-*a* transmit a uplink transmissions 230 in the SSB symbols based on a priority rule. In such aspects, the priority rule may be used at the UE 115-*a* to determine whether to transmit one or more uplink transmissions 230, or to receive an SSB transmission 225, on the full-duplex symbols configured for SSB transmission. In some aspects, the priority rule may provide that dynamic scheduled uplink transmissions (e.g., uplink transmissions that are scheduled by a resource allocation provided in a downlink control information (DCI) transmission) that overlap with full-duplex symbols that are also configured for SSB transmissions 225, are prioritized over SSB reception. In such cases, the UE 115-*a* may transmit the one or more uplink transmissions 230 on at least a first symbol and will not measure a SSB transmission 225 on at least the first symbol.

In other aspects, the priority rule may provide that configured grant (CG) uplink transmissions (e.g., CG physical uplink shared channel (PUSCH) transmissions in which periodic uplink resources are allocated to the UE 115-*a* and corresponding uplink transmissions do not each have scheduling via DCI) that overlap with full-duplex symbols configured for SSB are transmitted or skipped based on whether the UE 115-*a* is to monitor for the SSB transmission 225 on the overlapping symbols. For example, if the UE 115-*a* is indicated to measure SSB transmissions 225 on the first symbol that overlaps with a CG allocation for a CG uplink transmission 230, then UE 115-*a* will prioritize reception of the SSB transmission 225 and drop the CG uplink transmission 230 on the first symbol. Likewise, if the UE 115-*a* is not indicated to measure SSB transmissions 225 on the first symbol, then the UE may prioritize the CG uplink transmission 230 for transmission on the first symbol, and not measure the overlapping SSB transmission 225.

In some aspects, additionally, or alternatively, the UE 115-*a* may provide capability indication 215 of whether the UE 115-*a* supports the feature of full-duplex operation configured in SSB symbols. In some cases, the capability indication 215 may be provided in capability signaling that is transmitted after establishing (or reestablishing) an RRC connection, or in a random access message (e.g., RACH MSG3) as an early UE 115-*a* capability indication before RRC connection establishment. In some cases, if the full-duplex configuration information 210 is indicated to the UE 115-*a* by dedicated signaling (e.g., signaling that is specific to the UE 115-*a* and not other UEs), and if UEs 115 are not allowed to transmit in the SSB symbol but are allowed to receive within the downlink bandwidth in the SSB symbol, then the UE 115-*a* may indicate a capability that the UE 115-*a* supports or does not support the feature of full-duplex operation configured in SSB symbols. If the network entity 105-*a* receives a capability indication 215 that indicates no support of such a feature, then the network entity 105-*a* may avoid configuration of full-duplex operation in SSB symbols. In other cases, if the full-duplex configuration information 210 is indicated to the UE 115-*a* by dedicated signaling, and if UEs are allowed to transmit in a full-duplex symbol that is configured for SSB, then the UE 115-*a* may provide capability indication 215 that indicates whether the UE 115-*a* supports the feature of full-duplex operation in SSB symbols. If the network entity 105-*a* receives an indication that the UE 115-*a* does not support such a feature, then the network entity 105-*a* may avoid configuring full-duplex symbols in SSB symbols. If the UE 115-*a* does support uplink transmissions 230 in SSB symbols, the priority rule as discussed herein may be implemented at the UE 115-*a* to determine whether to transmit uplink transmissions 230 or monitor for SSB transmissions 225.

Figure 3:
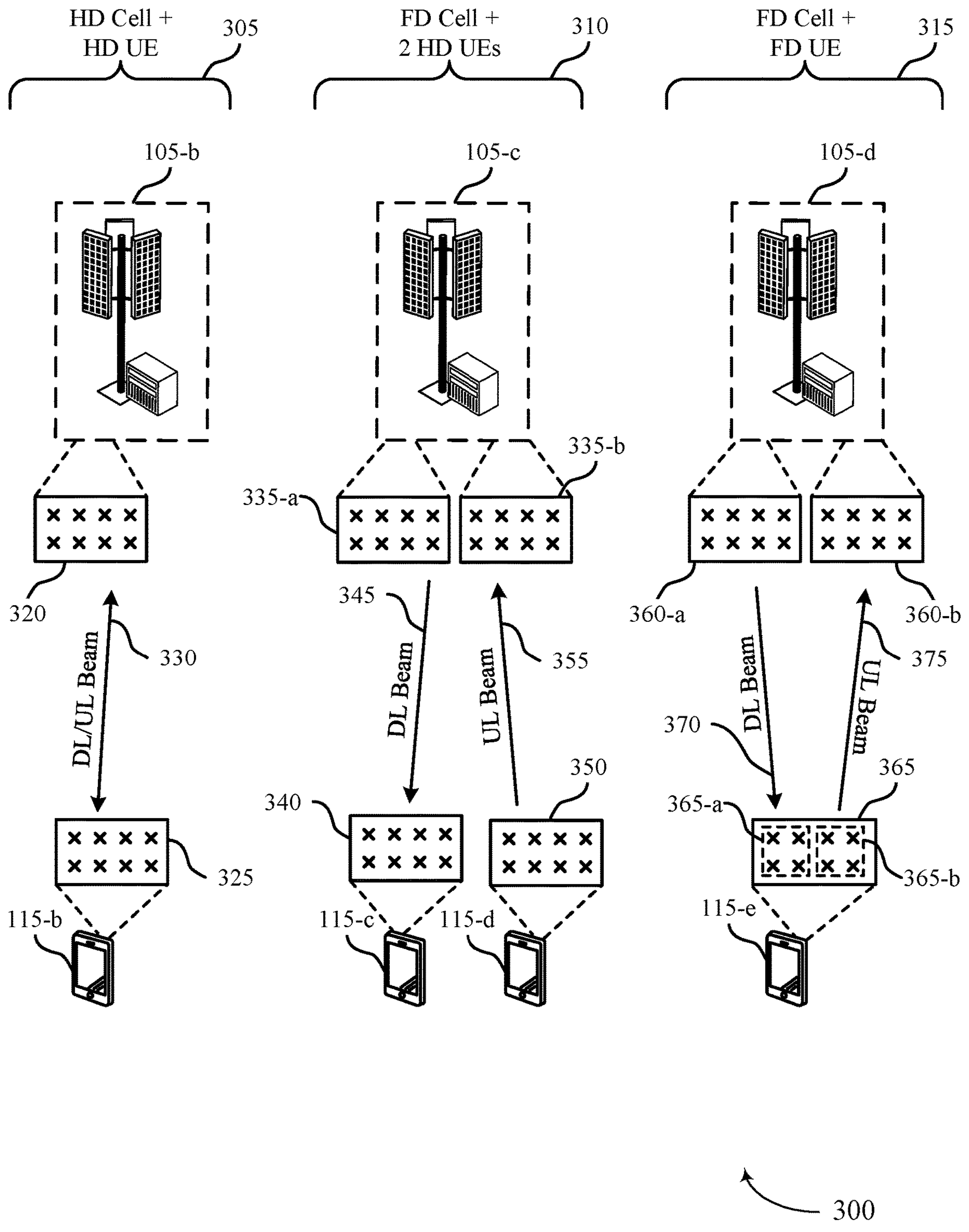
FIG. 3 shows an example of a half-duplex and full-duplex operation modes that supports techniques for SSB transmission in full-duplex communications in accordance with one or more aspects of the present disclosure.
Figure 4:
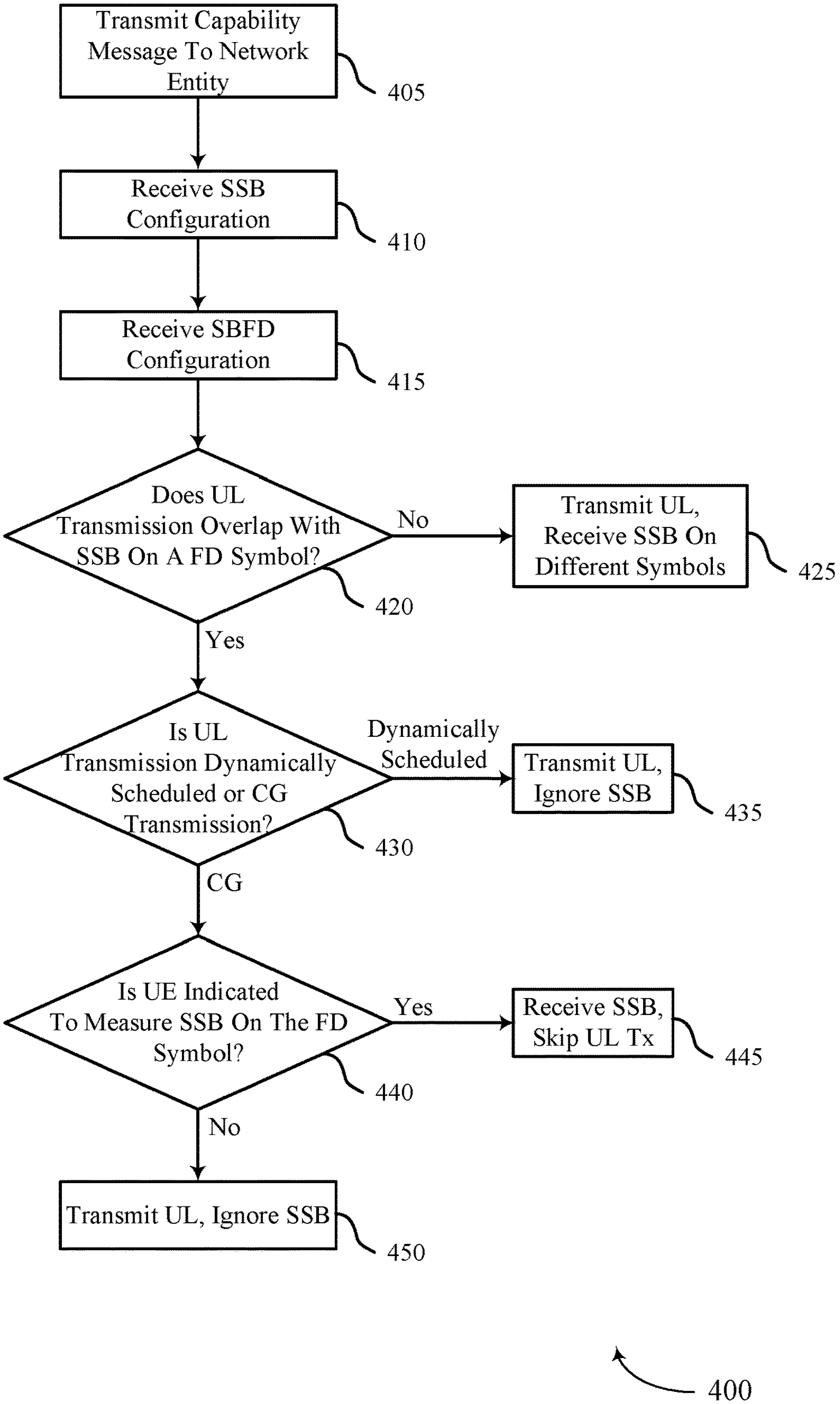
FIG. 4 shows an example of a flow chart illustrating techniques for SSB transmission in full-duplex communications in accordance with one or more aspects of the present disclosure.
Figure 5:
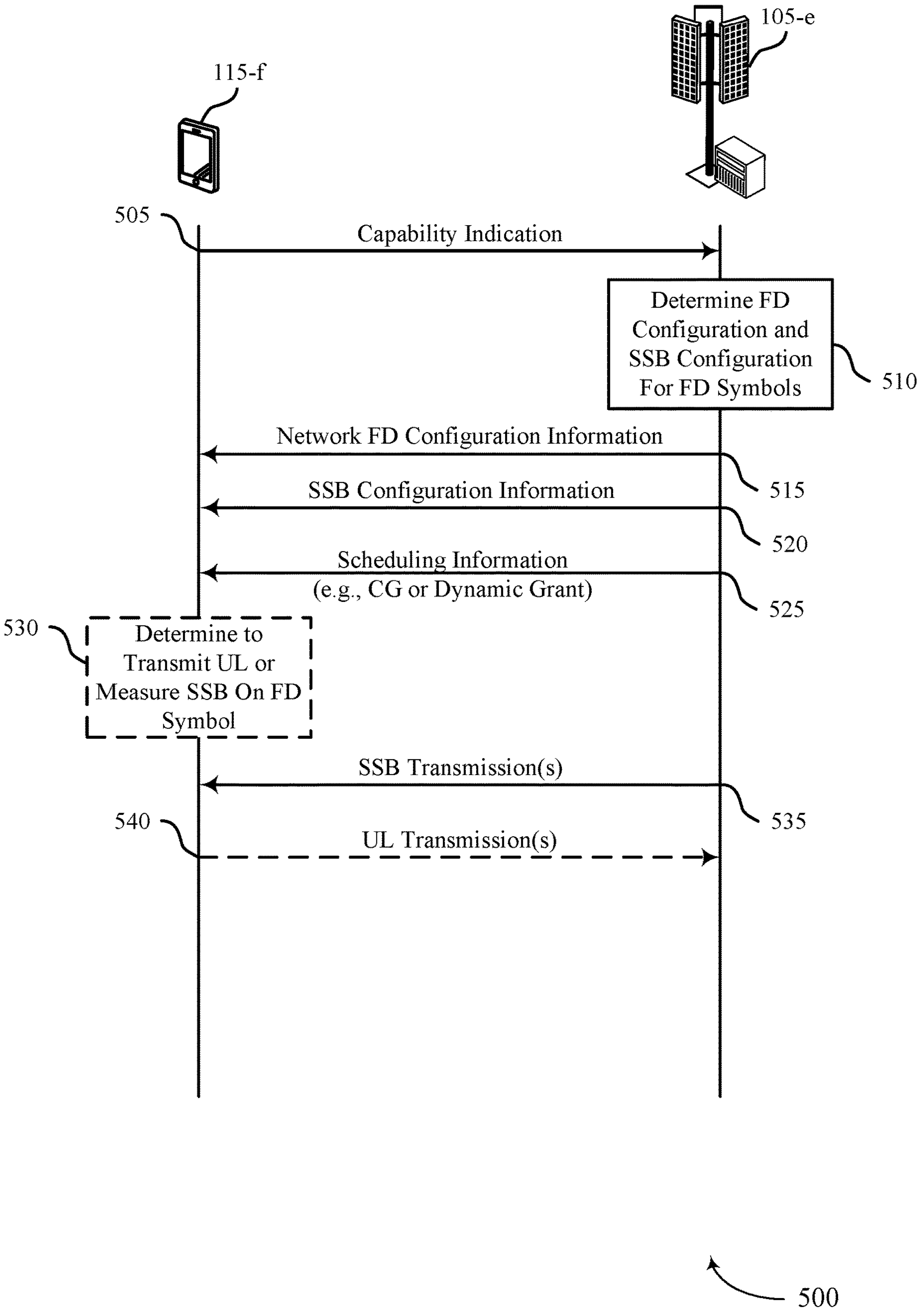
FIG. 5 shows an example of a process flow that supports techniques for SSB transmission in full-duplex communications in accordance with one or more aspects of the present disclosure.

In further cases, the full-duplex configuration information 210 may be indicated in cell common signaling (e.g., group common signaling provided to multiple UEs such that the network entity 105-*a* does not configure full-duplex operation for a particular UE only). As discussed, the capability indication 215 may indicate whether the UE 115-*a* supports full-duplex operation configured in SSB symbols. In such cases, if the UE 115-*a* does not support full-duplex operation in SSB symbols, the UE 115-*a* may ignore SSB transmissions 225 configured in full-duplex symbols, or the UE 115-*a* may ignore the full-duplex configuration information 210 (e.g., the UE 115-*a* operates only in half-duplex mode for symbols indicated as full-duplex in cell common signaling). FIGS. 3 through 5 provide examples of UE and network operation for full-duplex configurations and SSB transmissions on full-duplex symbols for various aspects.

FIG. 3 shows examples of half-duplex and full-duplex operation modes 300 that support techniques for SSB transmission in full-duplex communications in accordance with one or more aspects of the present disclosure. The half-duplex and full-duplex operation modes 300 may provide communications between network entities 105-*b*, 105-*c*, and 105-*d* and UEs 115-*b*, 115-*c*, 115-*d*, and 115-*e*, which may represent examples of network entities 105 and UEs 115 as described with reference to FIGS. 1 and 2.

In a first example 305, a half-duplex mode is illustrated in which both a network entity 105-*b* and a UE 115-*b* perform half-duplex communications using a downlink or uplink beam 330. In the first example 305, the network entity 105-*b* may use a first antenna panel 320 (or subset of antenna elements of an antenna panel), and the UE 115-*b* may use a UE antenna panel 325 for transmission or reception using the downlink or uplink beam 330. Such a half-duplex mode may use an entire bandwidth part for communications (e.g., an entire frequency bandwidth of a CC). In some cases, a half-duplex mode may be used for SSB symbols by UE 115-*b* that does not support full-duplex operation on SSB symbols (e.g., as indicated by a capability indication from the UE 115-*b*).

In a second example 310, a network entity 105-*c* may operate in a full-duplex mode to concurrently communicate with a first UE 115-*c* using downlink beam 345 and with a second UE 115-*d* using uplink beam 355. Each of the first UE 115-*c* and the second UE 115-*d* may operate in a half-duplex mode using a portion of a BWP that is configured for uplink or downlink communications in accordance with the full-duplex configuration of the network entity 105-*c*. For example, the network entity 105-*c* may operate in a SBFD mode in which a BWP has three sub-bands in a downlink/uplink/downlink (D/U/D) or flexible/uplink/flexible (F/U/F) configuration (e.g., which may be referred to as pattern 1). In other examples, the SBFD mode may have a BWP configured with two sub-bands in a downlink/uplink (D/U) or flexible/uplink (F/U) configuration (e.g., which may be referred to as pattern 2). In some cases, a guard band with a certain number of resource blocks (RBs) may be present between downlink and uplink sub-bands. While various examples discussed herein use SBFD, techniques provided herein are also applicable to IBFD, in which downlink and uplink bandwidths partially or fully overlap. In the second example 310, the network entity 105-*c* may use a first antenna panel 335-*a* (or a first subset of antenna elements of one or more antenna panels) for downlink communications to the first UE 115-*c*, and may use a second antenna panel 335-*b* (or a second subset of antenna elements of one or more antenna panels) for uplink communications from the second UE 115-*d*. In this example, each of the first UE 115-*c* and the second UE 115-*d* operate in a half-duplex mode, with the first UE 115-*c* using a first UE antenna panel 340 and the second UE 115-*d* using a second UE antenna panel 350. In some cases, a SBFD mode may be used for SSB symbols by UE 115-*c* and UE 115-*d* that do support full-duplex operation on SSB symbols (e.g., as indicated by a capability indication from the UE 115-*b*). As discussed herein, in cases where UE 115-*d* has uplink communications to transmit in a SSB symbol, a priority rule may be used to determine whether the UE 115-*d* is to transmit the uplink communication or monitor for SSB on the SSB symbol.

In a third example 315, a network entity 105-*d* may operate in a full-duplex mode to concurrently communicate uplink and downlink communications with a full-duplex UE 115-*c*, using downlink beam 370 and uplink beam 375. In this third example 315, both the full-duplex UE 115-*e* and the network entity 105-*d* may operate in a SBFD mode, in which the network entity 105-*c* may use a first antenna panel 360-*a* (or a first subset of antenna elements of one or more antenna panels) for downlink communications to the full-duplex UE 115-*e*, and may use a second antenna panel 360-*b* (or a second subset of antenna elements of one or more antenna panels) for uplink communications from the full-duplex UE 115-*e*. In this example, the full-duplex UE 115-*e* may use a first subset of antenna elements 365-*a* for downlink communications and may use a second subset of antenna elements 365-*b* for uplink communications. In some cases, the different subsets of antenna elements 365-*a* and 365-*b* may be on a same antenna panel, or may be on different antenna panels, at the full-duplex UE 115-*e*. In some cases, a UE 115-*e* capability indication may indicate whether the UE 115-*e* supports such SBFD communications on SSB symbols.

Such full-duplex techniques may be implemented in a TDD carrier or may be intra-band carrier aggregation (CA) based, and may increase the uplink duty cycle. Such an increased uplink duty-cycle may lead to, for example, latency reduction (e.g., it is possible to transmit an uplink signal in an uplink subband of a symbol that would otherwise be downlink only or flexible, or to receive a downlink signal in downlink subband(s) in symbols that would otherwise be uplink only, which can reduce latency), uplink coverage improvements, enhanced system capacity, enhanced resource utilization, enhanced spectrum efficiency, enablement of flexible and dynamic uplink/downlink resource adaptation according to real-time uplink/downlink traffic, or any combinations thereof. In accordance with various aspects discussed herein, UE 115 and network entity 105 full-duplex communication techniques be used in SSB symbols based on UE capability, priority rules, or both, which may further enhance the reliability and efficiency of communications when full-duplex communications are configured.

FIG. 4 shows an example of a flow chart 400 illustrating methods that supports techniques for SSB transmission in full-duplex communications in accordance with one or more aspects of the present disclosure. The flow chart 400 may include various aspects of the present disclosure described with reference to FIGS. 1 through 3. For example, the flow chart 400 may illustrate techniques for full-duplex communications between a UE, and a network entity, which may be examples of corresponding devices as described with reference to FIGS. 1 through 3. Alternative examples of the following may be implemented, where some steps are combined, performed in a different order than described, or are not performed at all. In some cases, a step may include additional features not mentioned below, or further steps may be added.

At 405, a UE may transmit a capability message to a network entity. As discussed herein, the capability message may be transmitted in capability signaling after establishing (or reestablishing) an RRC connection, or in a random access message (e.g., RACH MSG3) as an early UE capability indication before RRC connection establishment. The capability message may provide an indication of whether the UE supports full-duplex communications on symbols that also include SSB transmissions, an accordance with aspects as discussed herein.

At 410, the UE may receive a SSB configuration. For example, a network entity may transmit one or more SSB configurations that indicate symbols with periodic SSB transmissions on one or more beams. Further, the SSB configuration may provide an indication of whether the UE is to monitor for certain SSBs or not. The SSB configuration may be provided by RRC signaling (e.g., in serving cell configuration information, which may provide SSB positions and indicate whether a UE is to monitor certain SSBs).

At 415, the UE may receive a SBFD configuration. For example, a network entity may transmit the SBFD configuration (e.g., via RRC signaling, one or more medium access control (MAC) control elements, DCI, or any combinations thereof) that indicates a subset of symbols that are configured for SBFD communications.

At 420, the UE may determine whether an uplink transmission overlaps with a full-duplex symbol that includes SSB. In some cases, the UE may identify that the uplink transmission is to be transmitted in at least a first symbol that also includes a portion of a SSB transmission. At 425, if the uplink transmission does not overlap with the full-duplex symbol that includes SSB, the UE may transmit the uplink transmission and receive the SSB on different symbols that are non-overlapping.

At 430, if the uplink transmission and SSB symbols are overlapping, the UE may determine whether the uplink transmission is a dynamically scheduled uplink transmission of a configured grant (CG) uplink transmission, in accordance with a priority rule as discussed herein. If the uplink transmission is a dynamically scheduled transmission, at 435, the UE may transmit the uplink transmission and ignore the SSB.

At 440, if the uplink transmission is a CG transmission, the UE may determine whether it is indicated to measure the SSB on the full-duplex symbol. As discussed herein, in some cases a UE may be configured to monitor certain SSBs and may not monitor other SSBs. If the UE is configured to measure the SSB on the full-duplex symbol, at 445, the UE may receive the SSB and skip the CG uplink transmission. If the UE is not configured to measure the SSB on the full-duplex symbol, at 450, the UE may transmit the CG uplink transmission and ignore the SSB on the full-duplex symbol.

FIG. 5 shows an example of a process flow 500 that supports techniques for SSB transmission in full-duplex communications in accordance with one or more aspects of the present disclosure. The process flow 500 may include various aspects of the present disclosure described with reference to FIGS. 1 through 4. For example, the process flow 500 may illustrate techniques for full-duplex communications between a UE 115-*f*, and a network entity 105-*e*, which may be examples of corresponding devices as described with reference to FIGS. 1 through 4. Alternative examples of the following may be implemented, where some steps are performed in a different order than described or are not performed at all. In some cases, a step may include additional features not mentioned below, or further steps may be added.

At 505, the UE 115-*f* may transmit, and the network entity 105-*e* may receive, a capability indication that indicates one or more UE 115-*f* capabilities. For example, the capability indication may provide UE capabilities to perform UE full-duplex communications, and associated capabilities for full-duplex symbols that include SSB transmissions.

At 510, the network entity 105-*e* may determine a full-duplex configuration and SSB configuration for full-duplex symbols. In some cases, if the UE 115-*f* indicates that SSB transmissions on full-duplex symbols are not supported, the network entity 105-*e* may avoid configuring full-duplex symbols that overlap with SSB symbols. In other cases, if the UE 115-*f* indicates that SSB transmissions on full-duplex symbols are supported, the UE may configure full-duplex symbols that overlap with SSB symbols.

At 515, the network entity 105-*e* may transmit, and the UE 115-*f* may receive, network full-duplex configuration information. In some cases, the network full-duplex configuration information may update a half-duplex configuration provided by a slot format indication, to provide that a set of symbols are configured for network full-duplex operation (e.g., for network entity SBFD communications in which the network entity transmits downlink communications on one or more downlink sub-bands contemporaneously with receipt of uplink communications on one or more uplink sub-bands).

At 520, the network entity 105-*e* may transmit, and the UE 115-*f* may receive, SSB configuration information. In some cases, the SSB configuration may provide SSB locations and symbols for monitoring of SSB transmissions at the UE 115-*f*.

At 525, the network entity 105-*e* may transmit, and the UE 115-*f* may receive, scheduling information for one or more uplink transmissions form the UE 115-*f*. In some cases, the scheduling information may be dynamic scheduling information provided in DCI for a dynamic PUSCH transmission from the UE 115-*f*. Additionally, or alternatively, the scheduling information may provide a configuration for CG uplink transmissions (e.g., periodic uplink resources for uplink transmissions from the UE 115-*f*).

Optionally, at 530, if the UE 115-*f* supports the capability for monitoring SSBs on full-duplex symbols, the UE may determine to transmit uplink or measure a SSB of a full-duplex symbol that includes SSB. Such a determination may be made in accordance with various techniques as discussed herein. For example, a priority rule may be used by the UE 115-*f* to determine whether to transmit an uplink transmission or receive a SSB on a full-duplex symbol that includes SSB. At 535, the network entity 105-*e* may transmit one or more SSB transmissions on symbols that are configured for full-duplex communications. Optionally, at 540, the UE 115-*f* may transmit, and the network entity 105-*e* may receive, one or more uplink transmissions that are transmitted on one or more full-duplex symbols that include a SSB.

Figure 6:
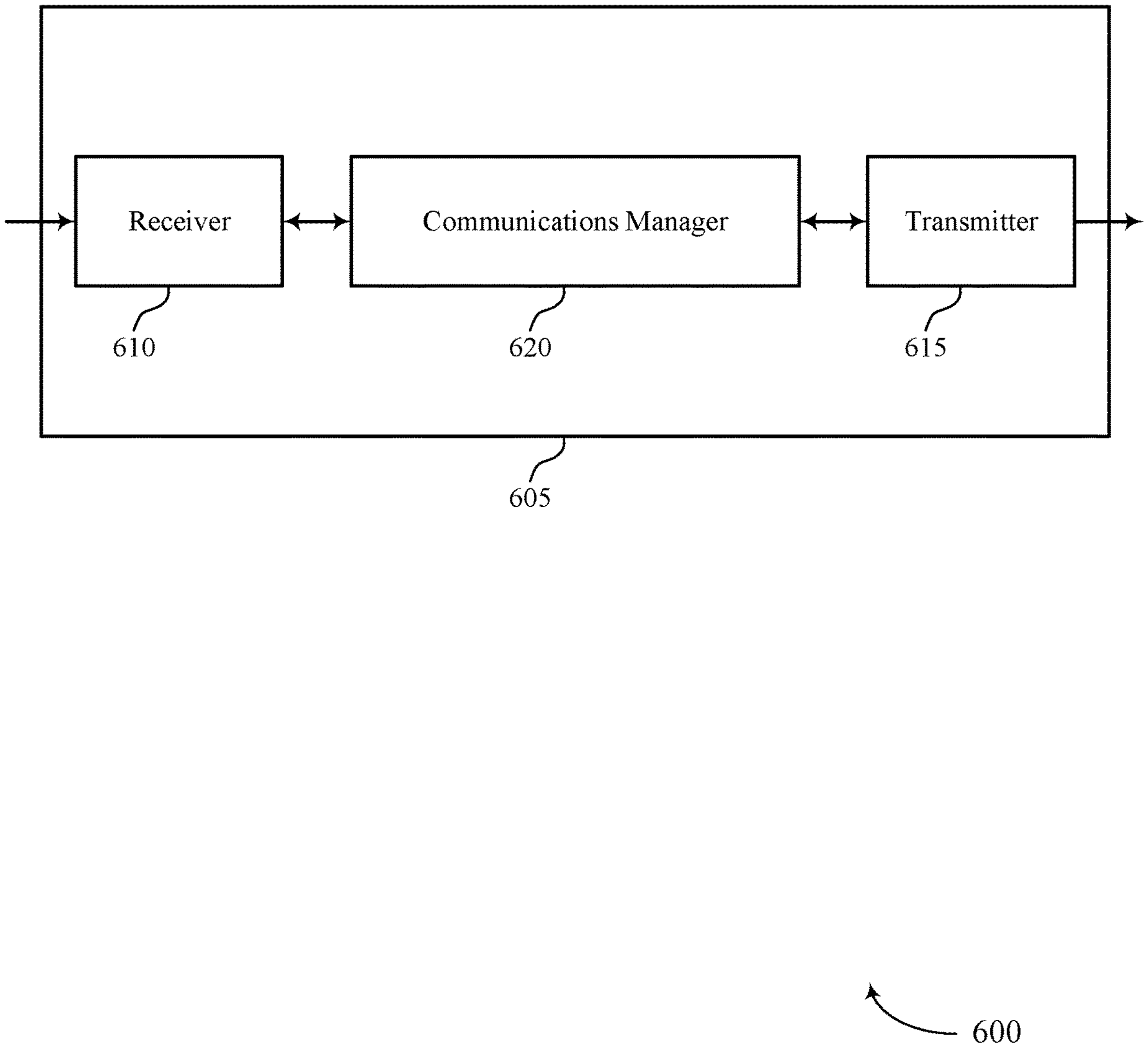
FIGS. 6 and 7 show block diagrams of devices that support techniques for SSB transmission in full-duplex communications in accordance with one or more aspects of the present disclosure.

FIG. 6 shows a block diagram 600 of a device 605 that supports techniques for SSB transmission in full-duplex communications in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for SSB transmission in full-duplex communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for SSB transmission in full-duplex communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for SSB transmission in full-duplex communications as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for receiving first configuration information for full-duplex communications for a set of symbols, the full-duplex communications providing uplink communications and downlink communications for each symbol of the set of symbols. The communications manager 620 is capable of, configured to, or operable to support a means for receiving second configuration information for SSB transmissions, where the second configuration information indicates at least a first subset of symbols of the set of symbols is configured in symbols overlapped on one or more symbols configured for a SSB transmission. The communications manager 620 is capable of, configured to, or operable to support a means for receiving scheduling information that indicates an uplink transmission is scheduled for transmission in at least a first symbol of the first subset of symbols. The communications manager 620 is capable of, configured to, or operable to support a means for configuring the first symbol for uplink communications or downlink communications based on a priority rule associated with the full-duplex communications, where the priority rule indicates the first symbol is to be configured for uplink communications or for downlink communications for reception of the SSB transmission based on whether the uplink transmission is a dynamically scheduled uplink transmission or a configured grant uplink transmission.

Additionally, or alternatively, the communications manager 620 may support wireless communications in accordance with examples as disclosed herein. For example, the communications manager 620 is capable of, configured to, or operable to support a means for transmitting, to a network entity, a capability message that indicates whether the UE supports receipt of SSBs in symbols that are configured for full-duplex communications. The communications manager 620 is capable of, configured to, or operable to support a means for receiving a SSB configuration that indicates at least a first symbol of a set of symbols is configured for reception of a SSB, the first symbol also configured for full-duplex communications, the full-duplex communications providing uplink communications and downlink communications for the first symbol. The communications manager 620 is capable of, configured to, or operable to support a means for communicating with the network entity based on the capability message indication and the SSB configuration of the first symbol.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for full-duplex configurations in which SSB transmissions may be provided in full-duplex symbols, which may enhance network efficiency through reduced overhead, enhance reliability, enhance throughput, and provide for enhanced user experience.

Figure 7:
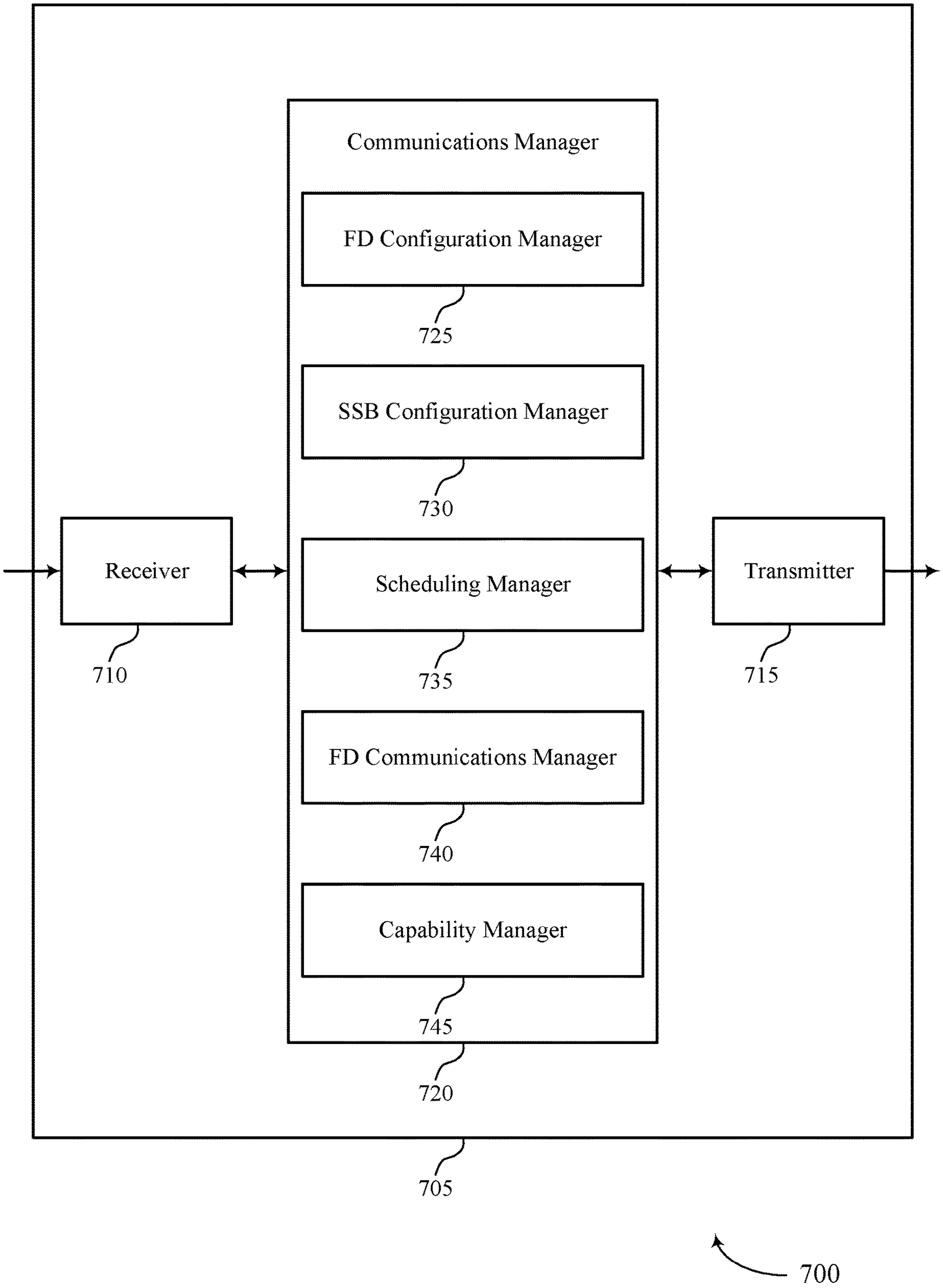

FIG. 7 shows a block diagram 700 of a device 705 that supports techniques for SSB transmission in full-duplex communications in accordance with one or more aspects of the present disclosure. The device 705 may be an example of aspects of a device 605 or a UE 115 as described herein. The device 705 may include a receiver 710, a transmitter 715, and a communications manager 720. The device 705, or one of more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for SSB transmission in full-duplex communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for SSB transmission in full-duplex communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for SSB transmission in full-duplex communications as described herein. For example, the communications manager 720 may include an FD configuration manager 725, an SSB configuration manager 730, a scheduling manager 735, an FD communications manager 740, a capability manager 745, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The FD configuration manager 725 is capable of, configured to, or operable to support a means for receiving first configuration information for full-duplex communications for a set of symbols, the full-duplex communications providing uplink communications and downlink communications for each symbol of the set of symbols. The SSB configuration manager 730 is capable of, configured to, or operable to support a means for receiving second configuration information for SSB transmissions, where the second configuration information indicates at least a first subset of symbols of the set of symbols is configured in symbols overlapped on one or more symbols configured for a SSB transmission. The scheduling manager 735 is capable of, configured to, or operable to support a means for receiving scheduling information that indicates an uplink transmission is scheduled for transmission in at least a first symbol of the first subset of symbols. The FD communications manager 740 is capable of, configured to, or operable to support a means for configuring the first symbol for uplink communications or downlink communications based on a priority rule associated with the full-duplex communications, where the priority rule indicates the first symbol is to be configured for uplink communications or for downlink communications for reception of the SSB transmission based on whether the uplink transmission is a dynamically scheduled uplink transmission or a configured grant uplink transmission.

Additionally, or alternatively, the communications manager 720 may support wireless communications in accordance with examples as disclosed herein. The capability manager 745 is capable of, configured to, or operable to support a means for transmitting, to a network entity, a capability message that indicates whether the UE supports receipt of SSBs in symbols that are configured for full-duplex communications. The SSB configuration manager 730 is capable of, configured to, or operable to support a means for receiving a SSB configuration that indicates at least a first symbol of a set of symbols is configured for reception of a SSB, the first symbol also configured for full-duplex communications, the full-duplex communications providing uplink communications and downlink communications for the first symbol. The FD communications manager 740 is capable of, configured to, or operable to support a means for communicating with the network entity based on the capability message indication and the SSB configuration of the first symbol.

Figure 8:
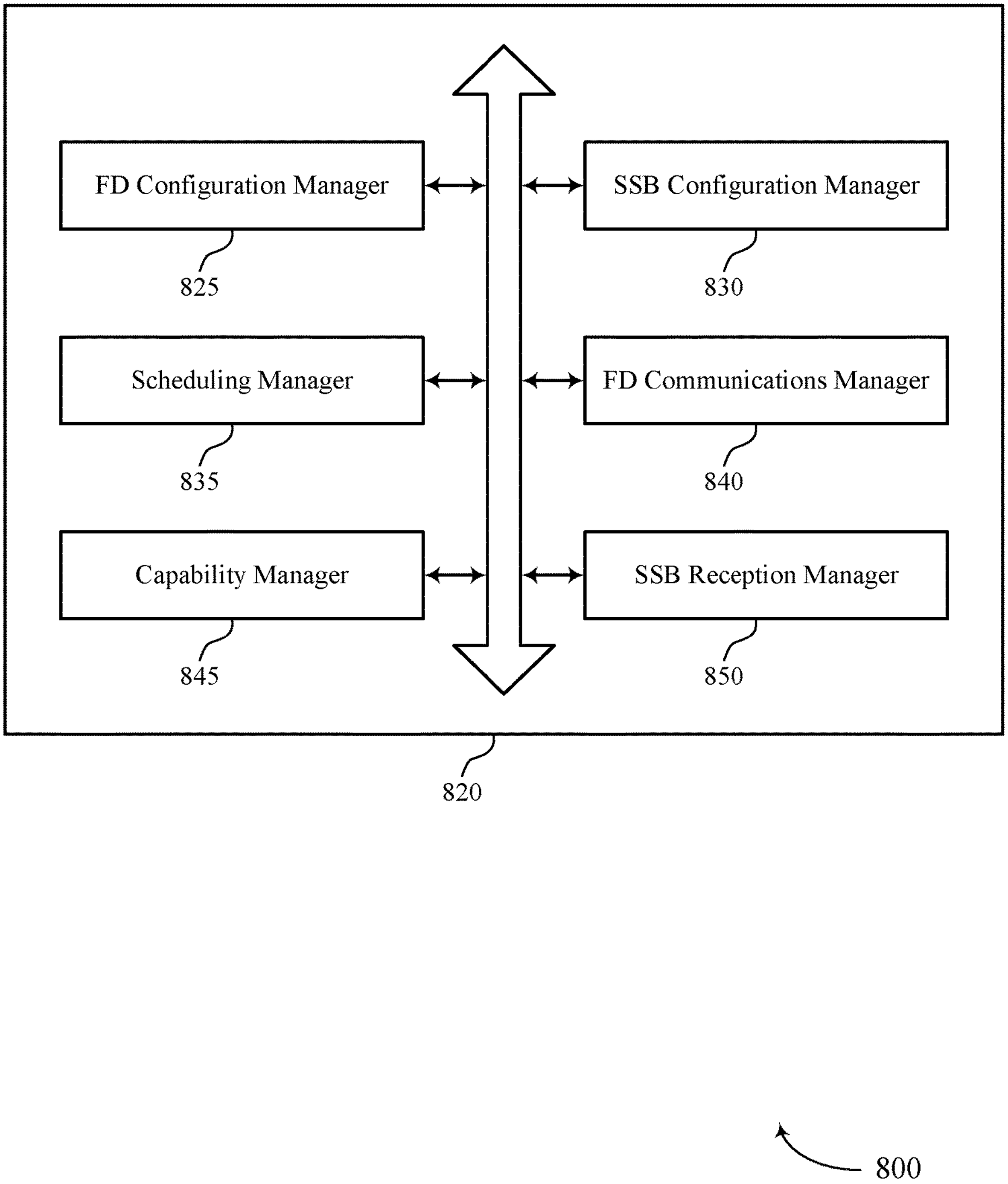
FIG. 8 shows a block diagram of a communications manager that supports techniques for SSB transmission in full-duplex communications in accordance with one or more aspects of the present disclosure.

FIG. 8 shows a block diagram 800 of a communications manager 820 that supports techniques for SSB transmission in full-duplex communications in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for SSB transmission in full-duplex communications as described herein. For example, the communications manager 820 may include an FD configuration manager 825, an SSB configuration manager 830, a scheduling manager 835, an FD communications manager 840, a capability manager 845, an SSB reception manager 850, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The FD configuration manager 825 is capable of, configured to, or operable to support a means for receiving first configuration information for full-duplex communications for a set of symbols, the full-duplex communications providing uplink communications and downlink communications for each symbol of the set of symbols. The SSB configuration manager 830 is capable of, configured to, or operable to support a means for receiving second configuration information for SSB transmissions, where the second configuration information indicates at least a first subset of symbols of the set of symbols is configured in symbols overlapped on one or more symbols configured for a SSB transmission. The scheduling manager 835 is capable of, configured to, or operable to support a means for receiving scheduling information that indicates an uplink transmission is scheduled for transmission in at least a first symbol of the first subset of symbols. The FD communications manager 840 is capable of, configured to, or operable to support a means for configuring the first symbol for uplink communications or downlink communications based on a priority rule associated with the full-duplex communications, where the priority rule indicates the first symbol is to be configured for uplink communications or for downlink communications for reception of the SSB transmission based on whether the uplink transmission is a dynamically scheduled uplink transmission or a configured grant uplink transmission.

In some examples, to support receiving the scheduling information, the scheduling manager 835 is capable of, configured to, or operable to support a means for receiving downlink control information that includes a dynamically scheduled uplink resource allocation of a set of resources that includes the first symbol. In some examples, the FD communications manager 840 is capable of, configured to, or operable to support a means for transmitting the uplink transmission in the first symbol based on the priority rule.

In some examples, to support receiving the scheduling information, the scheduling manager 835 is capable of, configured to, or operable to support a means for receiving configured grant information that provides periodic uplink resources for a set of multiple configured grant uplink transmissions, including first periodic uplink resources that include the first symbol for a first configured grant uplink transmission. In some examples, the FD communications manager 840 is capable of, configured to, or operable to support a means for receiving the SSB transmission in the first symbol based on the priority rule and the second configuration information indicating that the UE is to measure the SSB transmission, and where the first configured grant uplink transmission is skipped.

In some examples, to support receiving the scheduling information, the scheduling manager 835 is capable of, configured to, or operable to support a means for receiving configured grant information that provides periodic uplink resources for a set of multiple configured grant uplink transmissions, including first periodic uplink resources that include the first symbol for a first configured grant uplink transmission. In some examples, the FD communications manager 840 is capable of, configured to, or operable to support a means for transmitting the uplink transmission in the first symbol based on the priority rule and the second configuration information indicating that the UE is not to measure the SSB transmission in the first symbol.

In some examples, the capability manager 845 is capable of, configured to, or operable to support a means for transmitting a capability message that indicates whether the UE supports receipt of SSBs in symbols that are configured for full-duplex communications. In some examples, the capability message is transmitted in capability signaling subsequent to establishment of a radio resource control connection, or is transmitted as an early UE capability indication prior to establishment of the radio resource control connection. In some examples, the first configuration information is a sub-band full-duplex configuration in which at least a first sub-band of a component carrier bandwidth is configured for downlink communications and at least a second sub-band of the component carrier bandwidth or another component carrier is configured for uplink communications.

Additionally, or alternatively, the communications manager 820 may support wireless communications in accordance with examples as disclosed herein. The capability manager 845 is capable of, configured to, or operable to support a means for transmitting, to a network entity, a capability message that indicates whether the UE supports receipt of SSBs in symbols that are configured for full-duplex communications. In some examples, the SSB configuration manager 830 is capable of, configured to, or operable to support a means for receiving a SSB configuration that indicates at least a first symbol of a set of symbols is configured for reception of a SSB, the first symbol also configured for full-duplex communications, the full-duplex communications providing uplink communications and downlink communications for the first symbol. In some examples, the FD communications manager 840 is capable of, configured to, or operable to support a means for communicating with the network entity based on the capability message indication and the SSB configuration of the first symbol.

In some examples, the SSB reception manager 850 is capable of, configured to, or operable to support a means for receiving at least a portion of the SSB in the first symbol based on the capability message indicating that the UE supports receipt of SSBs in symbols configured for full-duplex communications.

In some examples, the SSB reception manager 850 is capable of, configured to, or operable to support a means for receiving SSBs only in symbols configured for half-duplex communications based on the capability message indicating that reception of the SSBs in symbols configured for full-duplex communications is unsupported by the UE. In some examples, the capability message is transmitted in capability signaling subsequent to establishment of a radio resource control connection, or is transmitted as an early UE capability indication prior to establishment of the radio resource control connection.

In some examples, to support communicating with the network entity, the FD communications manager 840 is capable of, configured to, or operable to support a means for configuring the first symbol for an uplink communication or a downlink communication based on a priority rule associated with the full-duplex communications. In some examples, the priority rule indicates the first symbol is to be configured for uplink communications or for the downlink communication for reception of the SSB based on whether the uplink communication is a dynamically scheduled uplink transmission or a configured grant uplink transmission.

In some examples, uplink transmissions are prohibited for UEs configured to monitor for SSBs in symbols that are configured for full-duplex communications, and where the capability message indicates that the UE supports receiving SSBs in symbols that are configured for full-duplex communications. In some examples, the capability message indicates that the UE does not support receiving SSBs in symbols that are configured for full-duplex communications, and where SSBs are not configured to be transmitted in symbols that are configured for full-duplex communications.

In some examples, uplink transmissions are allowed for UEs configured to monitor for SSBs in symbols that are configured for full-duplex communications, and where the capability message indicates that the UE supports receiving downlink communications and transmitting uplink communications in symbols that are configured for full-duplex communications and that include SSB transmissions. In some examples, a priority rule is used to determine whether to transmit an uplink communication or receive a SSB transmission in a symbol configured for full-duplex communications that includes a SSB transmission.

In some examples, the FD configuration manager 825 is capable of, configured to, or operable to support a means for receiving full-duplex configuration information in common signaling that is provided to a set of multiple UEs, and where the full-duplex configuration information applies to each UE of the set of multiple UEs. In some examples, the capability message indicates that the UE does not support receiving SSBs in symbols that are configured for full-duplex communications, and where the UE ignores SSBs that are configured in full-duplex symbols. In some examples, the capability message indicates that the UE does not support receiving SSBs in symbols that are configured for full-duplex communications, and where the UE ignores full-duplex configuration information that is provided in common signaling for the set of multiple UEs.

In some examples, the full-duplex communications are configured by a sub-band full-duplex configuration in which at least a first sub-band of a component carrier bandwidth is configured for downlink communications and at least a second sub-band of the component carrier bandwidth or another component carrier is configured for uplink communications.

Figure 9:
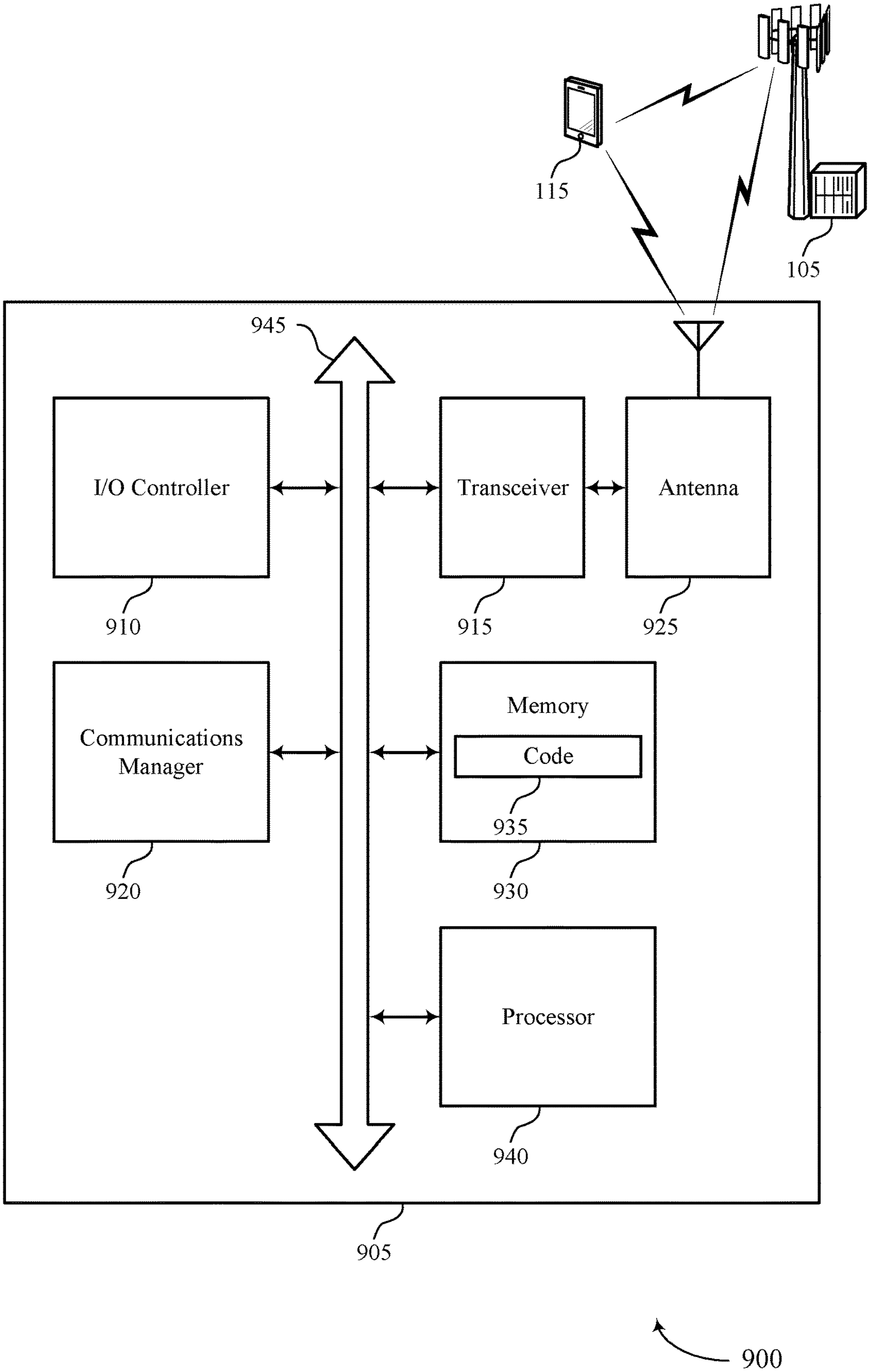
FIG. 9 shows a diagram of a system including a device that supports techniques for SSB transmission in full-duplex communications in accordance with one or more aspects of the present disclosure.

FIG. 9 shows a diagram of a system 900 including a device 905 that supports techniques for SSB transmission in full-duplex communications in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting techniques for SSB transmission in full-duplex communications). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. As such, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for receiving first configuration information for full-duplex communications for a set of symbols, the full-duplex communications providing uplink communications and downlink communications for each symbol of the set of symbols. The communications manager 920 is capable of, configured to, or operable to support a means for receiving second configuration information for SSB transmissions, where the second configuration information indicates at least a first subset of symbols of the set of symbols is configured in symbols overlapped on one or more symbols configured for a SSB transmission. The communications manager 920 is capable of, configured to, or operable to support a means for receiving scheduling information that indicates an uplink transmission is scheduled for transmission in at least a first symbol of the first subset of symbols. The communications manager 920 is capable of, configured to, or operable to support a means for configuring the first symbol for uplink communications or downlink communications based on a priority rule associated with the full-duplex communications, where the priority rule indicates the first symbol is to be configured for uplink communications or for downlink communications for reception of the SSB transmission based on whether the uplink transmission is a dynamically scheduled uplink transmission or a configured grant uplink transmission.

Additionally, or alternatively, the communications manager 920 may support wireless communications in accordance with examples as disclosed herein. For example, the communications manager 920 is capable of, configured to, or operable to support a means for transmitting, to a network entity, a capability message that indicates whether the UE supports receipt of SSBs in symbols that are configured for full-duplex communications. The communications manager 920 is capable of, configured to, or operable to support a means for receiving a SSB configuration that indicates at least a first symbol of a set of symbols is configured for reception of a SSB, the first symbol also configured for full-duplex communications, the full-duplex communications providing uplink communications and downlink communications for the first symbol. The communications manager 920 is capable of, configured to, or operable to support a means for communicating with the network entity based on the capability message indication and the SSB configuration of the first symbol.

By including or configuring the communications manager 920 in accordance with examples as described herein, the device 905 may support techniques for full-duplex configurations in which SSB transmissions may be provided in full-duplex symbols, which may enhance network efficiency through reduced overhead, enhance reliability, enhance throughput, and provide for enhanced user experience.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of techniques for SSB transmission in full-duplex communications as described herein, or the at least one processor 940 and the at least one memory 930 may be otherwise configured to, individually or collectively, perform or support such operations.

Figure 10:
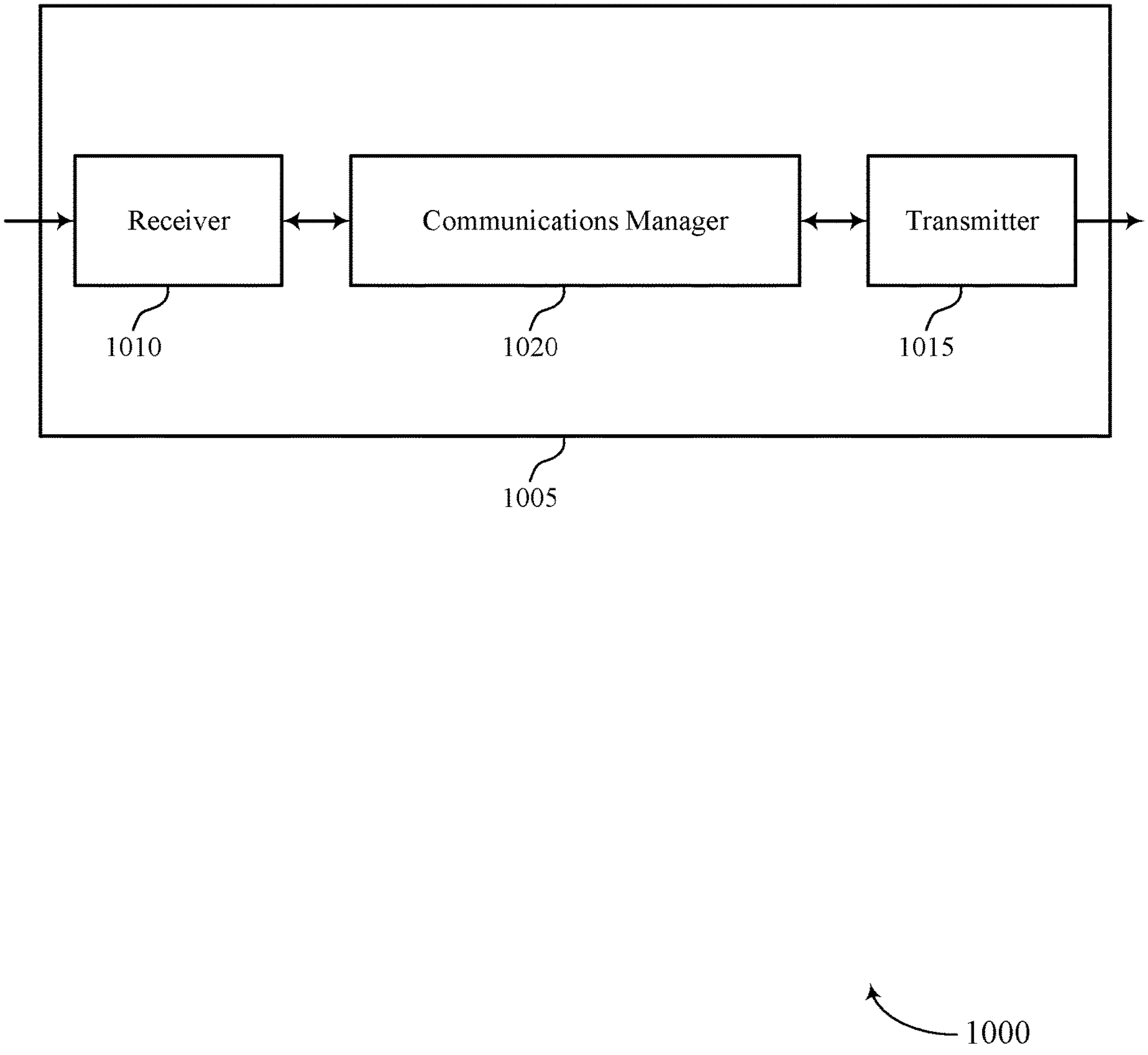
FIGS. 10 and 11 show block diagrams of devices that support techniques for SSB transmission in full-duplex communications in accordance with one or more aspects of the present disclosure.

FIG. 10 shows a block diagram 1000 of a device 1005 that supports techniques for SSB transmission in full-duplex communications in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for SSB transmission in full-duplex communications as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for transmitting, to a UE, first configuration information for full-duplex communications for a set of symbols, the full-duplex communications providing uplink communications and downlink communications for each symbol of the set of symbols. The communications manager 1020 is capable of, configured to, or operable to support a means for transmitting second configuration information for SSB transmissions, where the second configuration information indicates at least a first subset of symbols of the set of symbols is configured in symbols overlapped on one or more symbols configured for a SSB transmission. The communications manager 1020 is capable of, configured to, or operable to support a means for transmitting, to the UE, scheduling information that indicates an uplink transmission is scheduled for transmission in at least a first symbol of the first subset of symbols. The communications manager 1020 is capable of, configured to, or operable to support a means for monitoring the first symbol for uplink communications from the UE based on a priority rule associated with the full-duplex communications, where the priority rule indicates the first symbol is for uplink communications from the UE or for downlink communications of the SSB transmission based on whether the uplink transmission is a dynamically scheduled uplink transmission or a configured grant uplink transmission.

Additionally, or alternatively, the communications manager 1020 may support wireless communications in accordance with examples as disclosed herein. For example, the communications manager 1020 is capable of, configured to, or operable to support a means for receiving, from a UE, a capability message that indicates whether the UE supports receipt of SSBs in symbols that are configured for full-duplex communications. The communications manager 1020 is capable of, configured to, or operable to support a means for transmitting a SSB configuration that indicates at least a first symbol of a set of symbols is configured for transmission of a SSB, the first symbol also configured for full-duplex communications, the full-duplex communications providing uplink communications and downlink communications for the first symbol. The communications manager 1020 is capable of, configured to, or operable to support a means for transmitting the SSB based on the capability message.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for full-duplex configurations in which SSB transmissions may be provided in full-duplex symbols, which may enhance network efficiency through reduced overhead, enhance reliability, enhance throughput, and provide for enhanced user experience.

Figure 11:
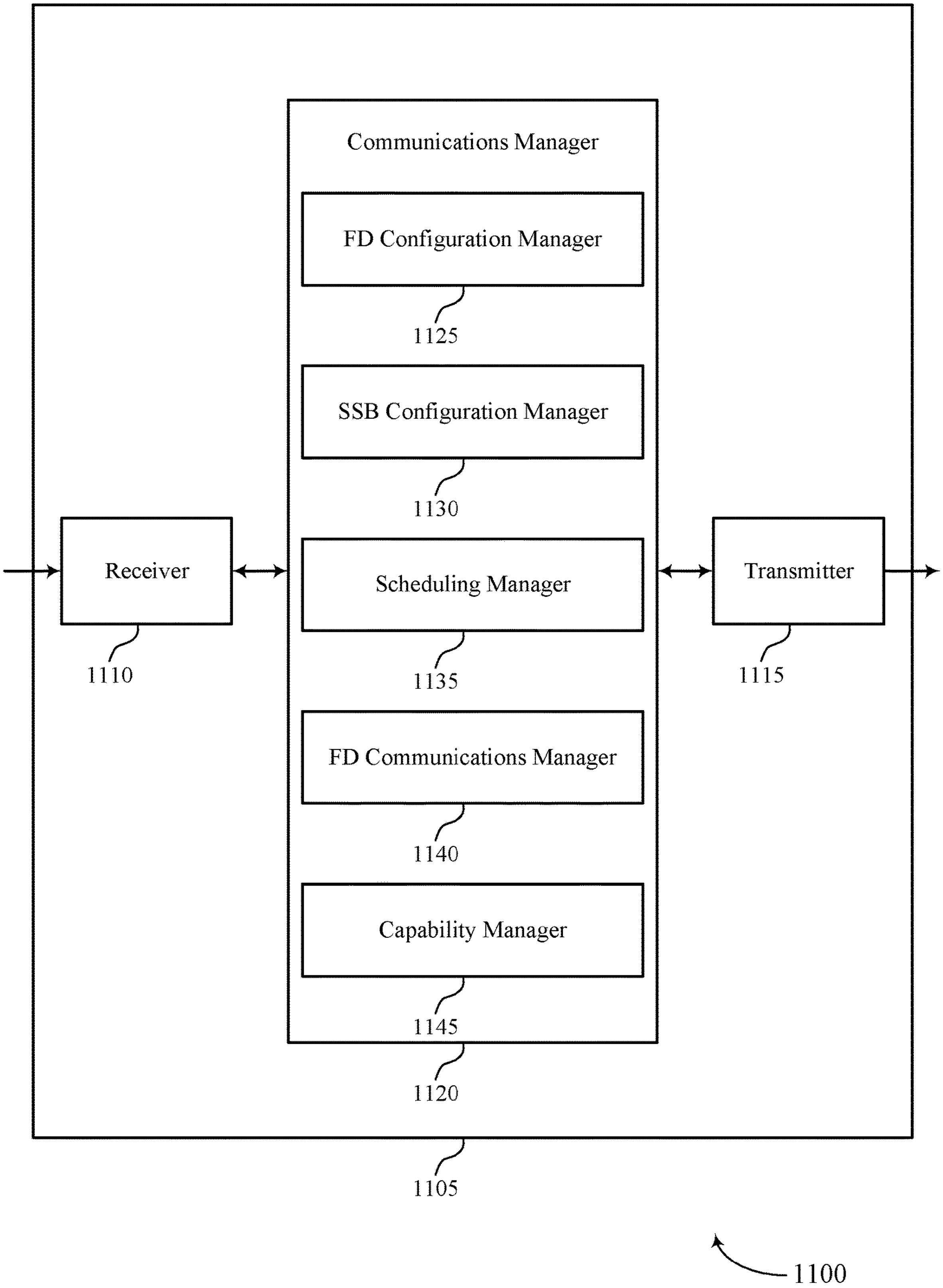

FIG. 11 shows a block diagram 1100 of a device 1105 that supports techniques for SSB transmission in full-duplex communications in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one of more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for SSB transmission in full-duplex communications as described herein. For example, the communications manager 1120 may include an FD configuration manager 1125, an SSB configuration manager 1130, a scheduling manager 1135, an FD communications manager 1140, a capability manager 1145, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The FD configuration manager 1125 is capable of, configured to, or operable to support a means for transmitting, to a UE, first configuration information for full-duplex communications for a set of symbols, the full-duplex communications providing uplink communications and downlink communications for each symbol of the set of symbols. The SSB configuration manager 1130 is capable of, configured to, or operable to support a means for transmitting second configuration information for SSB transmissions, where the second configuration information indicates at least a first subset of symbols of the set of symbols is configured in symbols overlapped on one or more symbols configured for a SSB transmission. The scheduling manager 1135 is capable of, configured to, or operable to support a means for transmitting, to the UE, scheduling information that indicates an uplink transmission is scheduled for transmission in at least a first symbol of the first subset of symbols. The FD communications manager 1140 is capable of, configured to, or operable to support a means for monitoring the first symbol for uplink communications from the UE based on a priority rule associated with the full-duplex communications, where the priority rule indicates the first symbol is for uplink communications from the UE or for downlink communications of the SSB transmission based on whether the uplink transmission is a dynamically scheduled uplink transmission or a configured grant uplink transmission.

Additionally, or alternatively, the communications manager 1120 may support wireless communications in accordance with examples as disclosed herein. The capability manager 1145 is capable of, configured to, or operable to support a means for receiving, from a UE, a capability message that indicates whether the UE supports receipt of SSBs in symbols that are configured for full-duplex communications. The SSB configuration manager 1130 is capable of, configured to, or operable to support a means for transmitting a SSB configuration that indicates at least a first symbol of a set of symbols is configured for transmission of a SSB, the first symbol also configured for full-duplex communications, the full-duplex communications providing uplink communications and downlink communications for the first symbol. The FD communications manager 1140 is capable of, configured to, or operable to support a means for transmitting the SSB based on the capability message.

Figure 12:
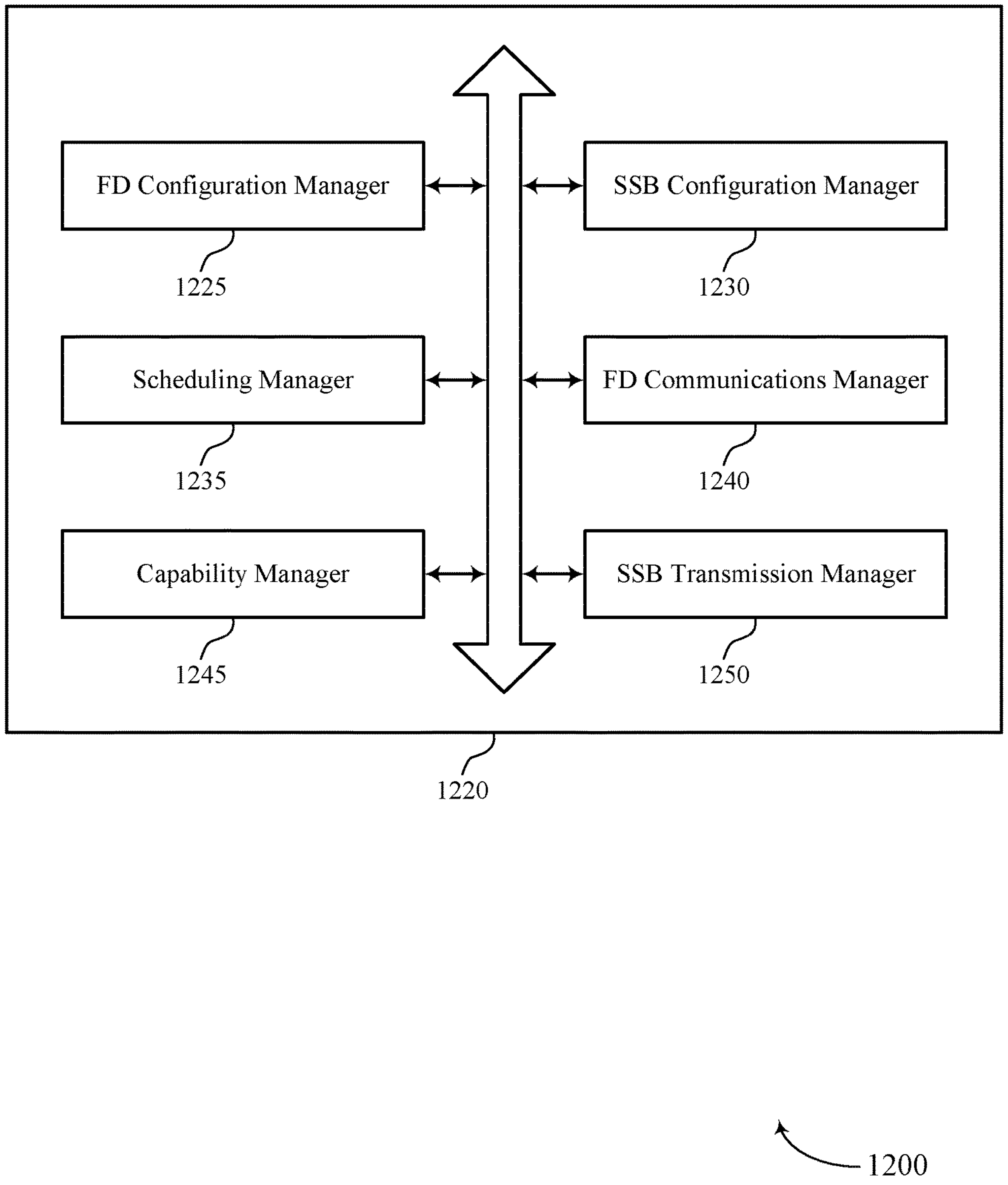
FIG. 12 shows a block diagram of a communications manager that supports techniques for SSB transmission in full-duplex communications in accordance with one or more aspects of the present disclosure.

FIG. 12 shows a block diagram 1200 of a communications manager 1220 that supports techniques for SSB transmission in full-duplex communications in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for SSB transmission in full-duplex communications as described herein. For example, the communications manager 1220 may include an FD configuration manager 1225, an SSB configuration manager 1230, a scheduling manager 1235, an FD communications manager 1240, a capability manager 1245, an SSB transmission manager 1250, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The FD configuration manager 1225 is capable of, configured to, or operable to support a means for transmitting, to a UE, first configuration information for full-duplex communications for a set of symbols, the full-duplex communications providing uplink communications and downlink communications for each symbol of the set of symbols. The SSB configuration manager 1230 is capable of, configured to, or operable to support a means for transmitting second configuration information for SSB transmissions, where the second configuration information indicates at least a first subset of symbols of the set of symbols is configured in symbols overlapped on one or more symbols configured for a SSB transmission. The scheduling manager 1235 is capable of, configured to, or operable to support a means for transmitting, to the UE, scheduling information that indicates an uplink transmission is scheduled for transmission in at least a first symbol of the first subset of symbols. The FD communications manager 1240 is capable of, configured to, or operable to support a means for monitoring the first symbol for uplink communications from the UE based on a priority rule associated with the full-duplex communications, where the priority rule indicates the first symbol is for uplink communications from the UE or for downlink communications of the SSB transmission based on whether the uplink transmission is a dynamically scheduled uplink transmission or a configured grant uplink transmission.

In some examples, to support transmitting the scheduling information, the scheduling manager 1235 is capable of, configured to, or operable to support a means for transmitting downlink control information that includes a dynamically scheduled uplink resource allocation of a set of resources that includes the first symbol. In some examples, the FD communications manager 1240 is capable of, configured to, or operable to support a means for receiving the uplink transmission in the first symbol based on the priority rule.

In some examples, to support transmitting the scheduling information, the scheduling manager 1235 is capable of, configured to, or operable to support a means for transmitting configured grant information that provides periodic uplink resources for a set of multiple configured grant uplink transmissions, including first periodic uplink resources that include the first symbol for a first configured grant uplink transmission. In some examples, the FD communications manager 1240 is capable of, configured to, or operable to support a means for skipping the monitoring of the first symbol for the first configured grant uplink transmission based on the priority rule and the second configuration information indicating that the UE is to measure the SSB transmission.

In some examples, to support transmitting the scheduling information, the scheduling manager 1235 is capable of, configured to, or operable to support a means for transmitting configured grant information that provides periodic uplink resources for a set of multiple configured grant uplink transmissions, including first periodic uplink resources that include the first symbol for a first configured grant uplink transmission. In some examples, the FD communications manager 1240 is capable of, configured to, or operable to support a means for receiving the uplink transmission in the first symbol based on the priority rule and the second configuration information indicating that the UE is not to measure the SSB transmission in the first symbol.

In some examples, the capability manager 1245 is capable of, configured to, or operable to support a means for receiving a capability message from the UE that indicates whether the UE supports receipt of SSBs in symbols that are configured for full-duplex communications. In some examples, the capability message is received in capability signaling subsequent to establishment of a radio resource control connection, or is received as an early UE capability indication prior to establishment of the radio resource control connection. In some examples, the first configuration information is a sub-band full-duplex configuration in which at least a first sub-band of a component carrier bandwidth is configured for downlink communications and at least a second sub-band of the component carrier bandwidth or another component carrier is configured for uplink communications.

Additionally, or alternatively, the communications manager 1220 may support wireless communications in accordance with examples as disclosed herein. The capability manager 1245 is capable of, configured to, or operable to support a means for receiving, from a UE, a capability message that indicates whether the UE supports receipt of SSBs in symbols that are configured for full-duplex communications. In some examples, the SSB configuration manager 1230 is capable of, configured to, or operable to support a means for transmitting a SSB configuration that indicates at least a first symbol of a set of symbols is configured for transmission of a SSB, the first symbol also configured for full-duplex communications, the full-duplex communications providing uplink communications and downlink communications for the first symbol. In some examples, the FD communications manager 1240 is capable of, configured to, or operable to support a means for transmitting the SSB based on the capability message.

In some examples, the SSB transmission manager 1250 is capable of, configured to, or operable to support a means for transmitting at least a portion of the SSB to the UE in the first symbol based on the capability message indicating that the UE supports receipt of SSBs in symbols configured for full-duplex communications.

In some examples, the SSB transmission manager 1250 is capable of, configured to, or operable to support a means for transmitting SSBs to the UE only in symbols configured for half-duplex communications based on the capability message indicating that reception of the SSBs in symbols configured for full-duplex communications is unsupported by the UE. In some examples, the capability message is transmitted in capability signaling subsequent to establishment of a radio resource control connection, or is transmitted as an early UE capability indication prior to establishment of the radio resource control connection.

In some examples, the FD communications manager 1240 is capable of, configured to, or operable to support a means for configuring the first symbol for uplink communications or downlink communications based on a priority rule associated with the full-duplex communications. In some examples, the priority rule indicates the first symbol is to be configured for uplink communications or for downlink communications for reception of the SSB transmission based on whether the uplink communications are dynamically scheduled uplink transmissions or are configured grant uplink transmissions.

In some examples, uplink transmissions are prohibited for UEs configured to monitor for SSBs in symbols that are configured for full-duplex communications, and where the capability message indicates that the UE supports receiving SSBs in symbols that are configured for full-duplex communications. In some examples, the capability message indicates that the UE does not support receiving SSBs in symbols that are configured for full-duplex communications, and where SSBs are not transmitted in symbols that are configured for full-duplex communications.

In some examples, uplink transmissions are allowed for UEs configured to monitor for SSBs in symbols that are configured for full-duplex communications, and where the capability message indicates that the UE supports receiving downlink communications and transmitting uplink communications in symbols that are configured for full-duplex communications and that include SSB transmissions. In some examples, a priority rule is used to determine whether to monitor for an uplink communication in a symbol configured for full-duplex communications that includes a SSB transmission.

In some examples, the FD communications manager 1240 is capable of, configured to, or operable to support a means for transmitting full-duplex configuration information to a set of multiple UEs in common signaling, and where the full-duplex configuration information applies to each UE of the set of multiple UEs. In some examples, the capability message indicates that the UE does not support receiving SSBs in symbols that are configured for full-duplex communications, and where the UE ignores SSBs that are configured in full-duplex symbols. In some examples, the capability message indicates that the UE does not support receiving SSBs in symbols that are configured for full-duplex communications, and where the UE ignores full-duplex configuration information that is provided in common signaling for the set of multiple UEs.

In some examples, the full-duplex communications are configured by a sub-band full-duplex configuration in which at least a first sub-band of a component carrier bandwidth is configured for downlink communications and at least a second sub-band of the component carrier bandwidth or another component carrier is configured for uplink communications.

Figure 13:
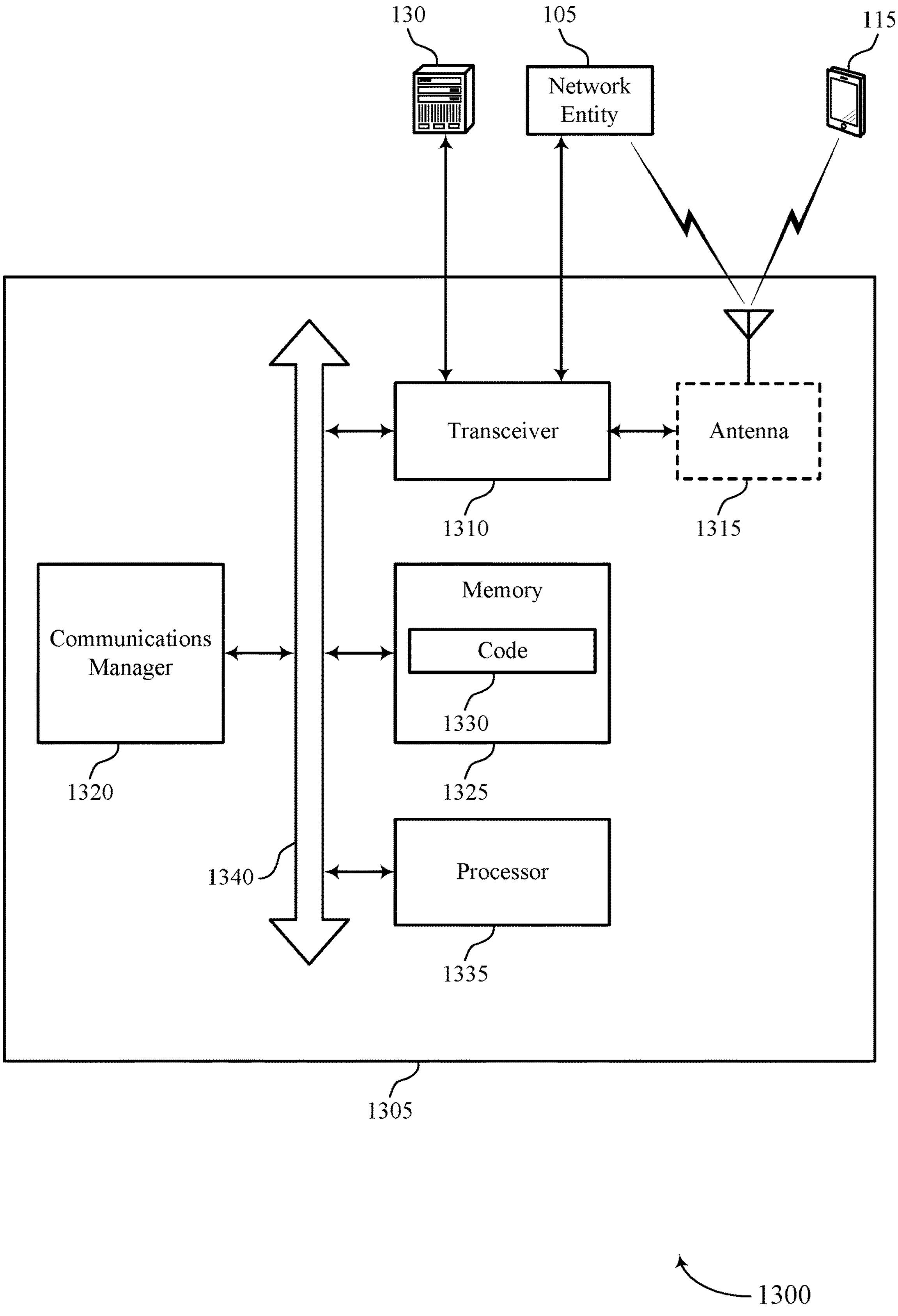
FIG. 13 shows a diagram of a system including a device that supports techniques for SSB transmission in full-duplex communications in accordance with one or more aspects of the present disclosure.

FIG. 13 shows a diagram of a system 1300 including a device 1305 that supports techniques for SSB transmission in full-duplex communications in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable code 1330 including instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may contain, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting techniques for SSB transmission in full-duplex communications). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. As such, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 is capable of, configured to, or operable to support a means for transmitting, to a UE, first configuration information for full-duplex communications for a set of symbols, the full-duplex communications providing uplink communications and downlink communications for each symbol of the set of symbols. The communications manager 1320 is capable of, configured to, or operable to support a means for transmitting second configuration information for SSB transmissions, where the second configuration information indicates at least a first subset of symbols of the set of symbols is configured in symbols overlapped on one or more symbols configured for a SSB transmission. The communications manager 1320 is capable of, configured to, or operable to support a means for transmitting, to the UE, scheduling information that indicates an uplink transmission is scheduled for transmission in at least a first symbol of the first subset of symbols. The communications manager 1320 is capable of, configured to, or operable to support a means for monitoring the first symbol for uplink communications from the UE based on a priority rule associated with the full-duplex communications, where the priority rule indicates the first symbol is for uplink communications from the UE or for downlink communications of the SSB transmission based on whether the uplink transmission is a dynamically scheduled uplink transmission or a configured grant uplink transmission.

Additionally, or alternatively, the communications manager 1320 may support wireless communications in accordance with examples as disclosed herein. For example, the communications manager 1320 is capable of, configured to, or operable to support a means for receiving, from a UE, a capability message that indicates whether the UE supports receipt of SSBs in symbols that are configured for full-duplex communications. The communications manager 1320 is capable of, configured to, or operable to support a means for transmitting a SSB configuration that indicates at least a first symbol of a set of symbols is configured for transmission of a SSB, the first symbol also configured for full-duplex communications, the full-duplex communications providing uplink communications and downlink communications for the first symbol. The communications manager 1320 is capable of, configured to, or operable to support a means for transmitting the SSB based on the capability message.

By including or configuring the communications manager 1320 in accordance with examples as described herein, the device 1305 may support techniques for full-duplex configurations in which SSB transmissions may be provided in full-duplex symbols, which may enhance network efficiency through reduced overhead, enhance reliability, enhance throughput, and provide for enhanced user experience.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of techniques for SSB transmission in full-duplex communications as described herein, or the at least one processor 1335 and the at least one memory 1325 may be otherwise configured to, individually or collectively, perform or support such operations.

Figure 14:
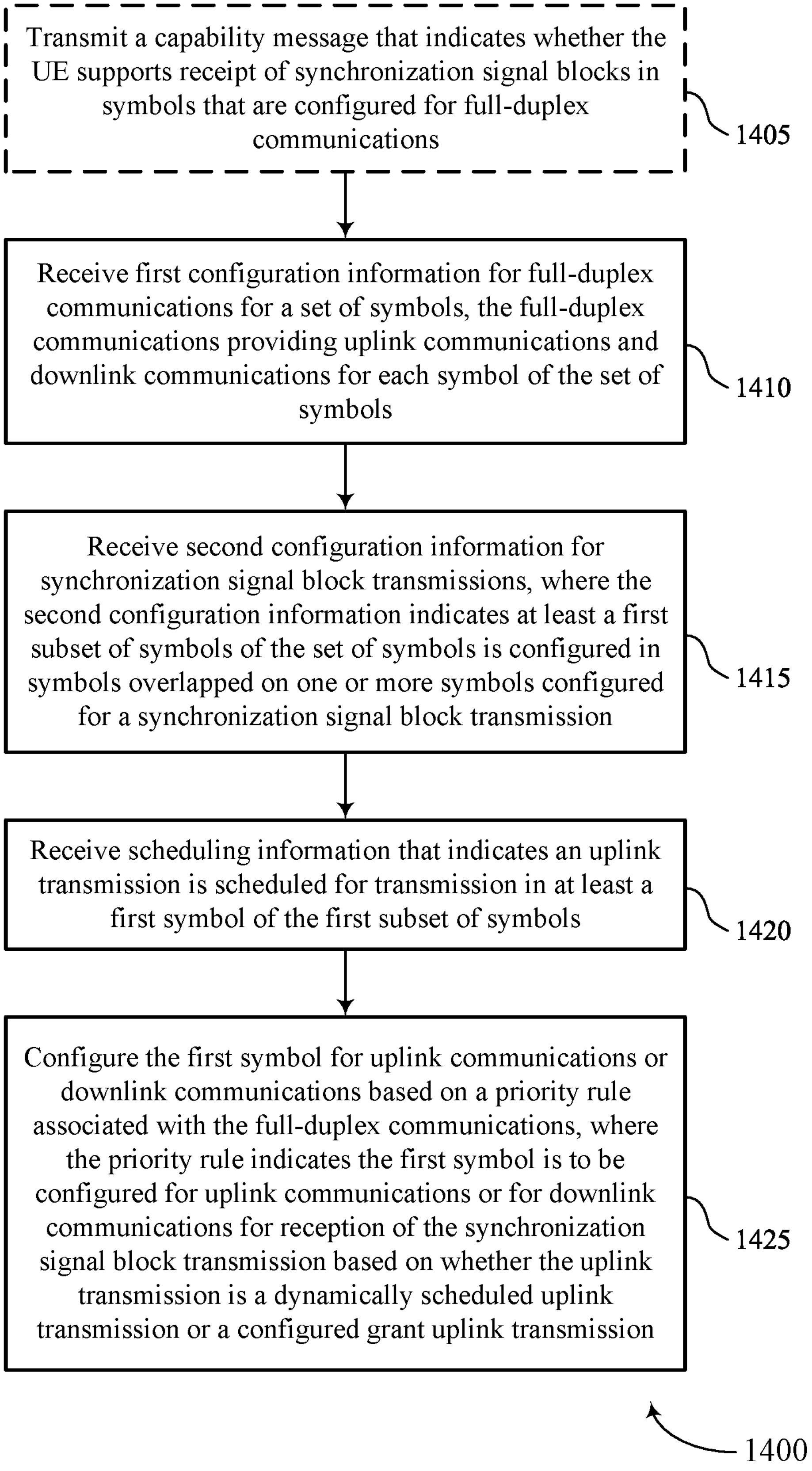

FIG. 14 shows a flowchart illustrating a method 1400 that supports techniques for SSB transmission in full-duplex communications in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

Optionally, at 1405, the method may include transmitting a capability message that indicates whether the UE supports receipt of SSBs in symbols that are configured for full-duplex communications. The operations of block 1405 may be performed in accordance with examples as disclosed herein. In some examples, aspects of the operations of 1405 may be performed by a capability manager 845 as described with reference to FIG. 8.

At 1410, the method may include receiving first configuration information for full-duplex communications for a set of symbols, the full-duplex communications providing uplink communications and downlink communications for each symbol of the set of symbols. The operations of block 1410 may be performed in accordance with examples as disclosed herein. In some examples, aspects of the operations of 1410 may be performed by an FD configuration manager 825 as described with reference to FIG. 8.

At 1415, the method may include receiving second configuration information for SSB transmissions, where the second configuration information indicates at least a first subset of symbols of the set of symbols is configured in symbols overlapped on one or more symbols configured for a SSB transmission. The operations of block 1415 may be performed in accordance with examples as disclosed herein. In some examples, aspects of the operations of 1415 may be performed by an SSB configuration manager 830 as described with reference to FIG. 8.

At 1420, the method may include receiving scheduling information that indicates an uplink transmission is scheduled for transmission in at least a first symbol of the first subset of symbols. The operations of block 1420 may be performed in accordance with examples as disclosed herein. In some examples, aspects of the operations of 1420 may be performed by a scheduling manager 835 as described with reference to FIG. 8.

At 1425, the method may include configuring the first symbol for uplink communications or downlink communications based on a priority rule associated with the full-duplex communications, where the priority rule indicates the first symbol is to be configured for uplink communications or for downlink communications for reception of the SSB transmission based on whether the uplink transmission is a dynamically scheduled uplink transmission or a configured grant uplink transmission. The operations of block 1425 may be performed in accordance with examples as disclosed herein. In some examples, aspects of the operations of 1425 may be performed by an FD communications manager 840 as described with reference to FIG. 8.

Figure 15:
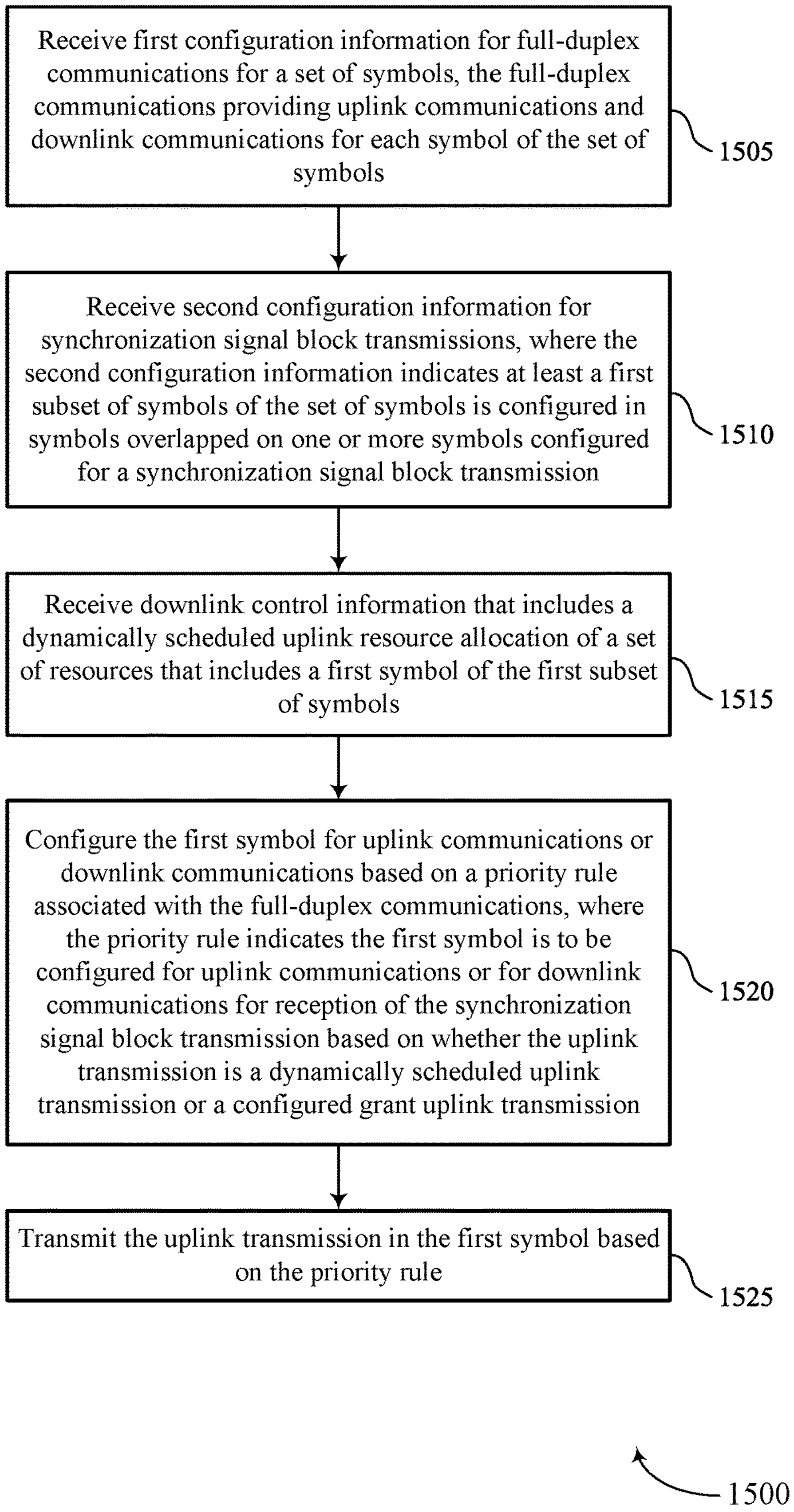

FIG. 15 shows a flowchart illustrating a method 1500 that supports techniques for SSB transmission in full-duplex communications in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving first configuration information for full-duplex communications for a set of symbols, the full-duplex communications providing uplink communications and downlink communications for each symbol of the set of symbols. The operations of block 1505 may be performed in accordance with examples as disclosed herein. In some examples, aspects of the operations of 1505 may be performed by an FD configuration manager 825 as described with reference to FIG. 8.

At 1510, the method may include receiving second configuration information for SSB transmissions, where the second configuration information indicates at least a first subset of symbols of the set of symbols is configured in symbols overlapped on one or more symbols configured for a SSB transmission. The operations of block 1510 may be performed in accordance with examples as disclosed herein. In some examples, aspects of the operations of 1510 may be performed by an SSB configuration manager 830 as described with reference to FIG. 8.

At 1515, the method may include receiving downlink control information that includes a dynamically scheduled uplink resource allocation of a set of resources that includes a first symbol of the first subset of symbols. The operations of block 1515 may be performed in accordance with examples as disclosed herein. In some examples, aspects of the operations of 1515 may be performed by a scheduling manager 835 as described with reference to FIG. 8.

At 1520, the method may include configuring the first symbol for uplink communications or downlink communications based on a priority rule associated with the full-duplex communications, where the priority rule indicates the first symbol is to be configured for uplink communications or for downlink communications for reception of the SSB transmission based on whether the uplink transmission is a dynamically scheduled uplink transmission or a configured grant uplink transmission. The operations of block 1520 may be performed in accordance with examples as disclosed herein. In some examples, aspects of the operations of 1520 may be performed by an FD communications manager 840 as described with reference to FIG. 8.

At 1525, the method may include transmitting the uplink transmission in the first symbol based on the priority rule. The operations of block 1525 may be performed in accordance with examples as disclosed herein. In some examples, aspects of the operations of 1525 may be performed by an FD communications manager 840 as described with reference to FIG. 8.

Figure 16:
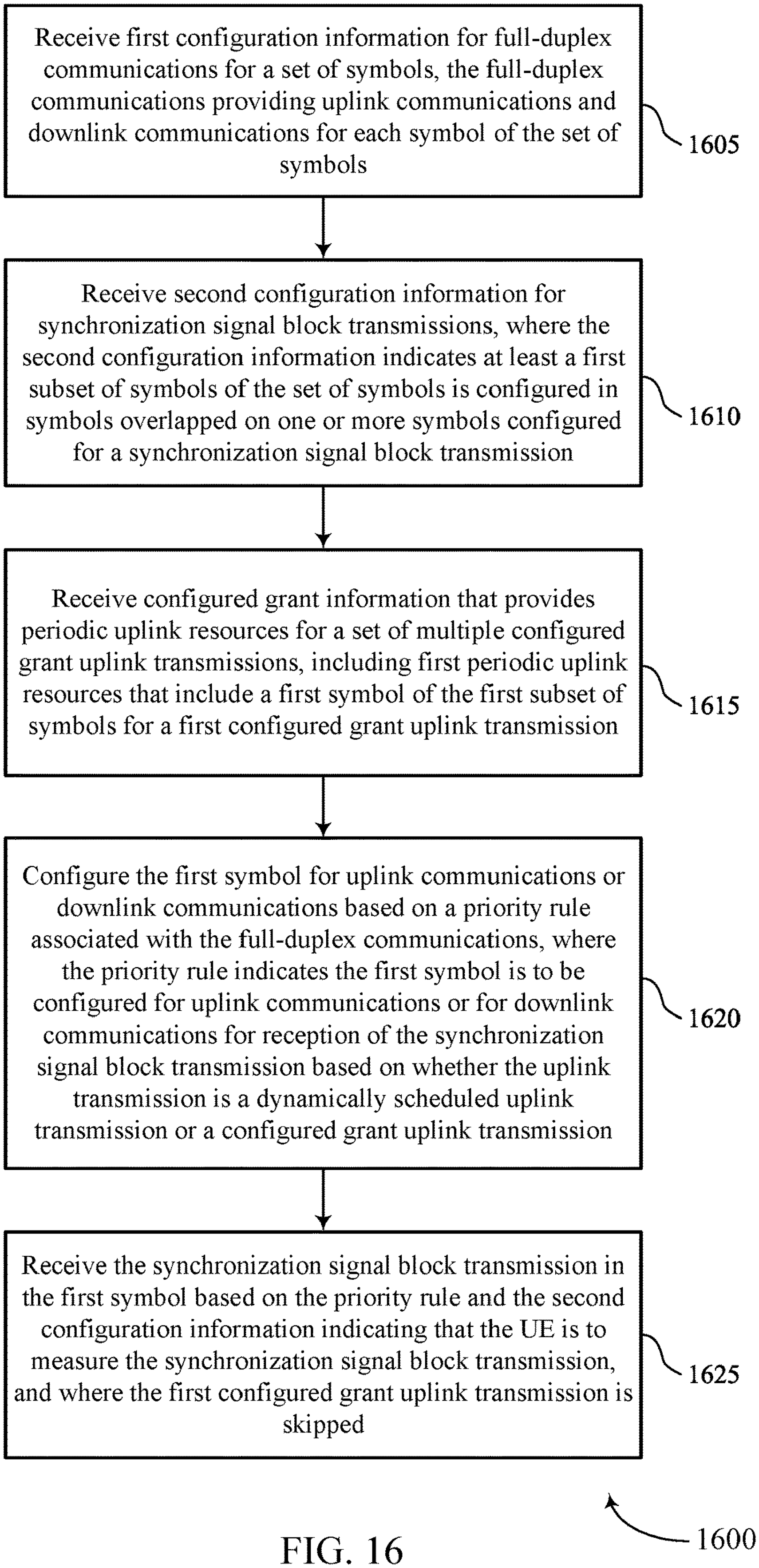

FIG. 16 shows a flowchart illustrating a method 1600 that supports techniques for SSB transmission in full-duplex communications in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving first configuration information for full-duplex communications for a set of symbols, the full-duplex communications providing uplink communications and downlink communications for each symbol of the set of symbols. The operations of block 1605 may be performed in accordance with examples as disclosed herein. In some examples, aspects of the operations of 1605 may be performed by an FD configuration manager 825 as described with reference to FIG. 8.

At 1610, the method may include receiving second configuration information for SSB transmissions, where the second configuration information indicates at least a first subset of symbols of the set of symbols is configured in symbols overlapped on one or more symbols configured for a SSB transmission. The operations of block 1610 may be performed in accordance with examples as disclosed herein. In some examples, aspects of the operations of 1610 may be performed by an SSB configuration manager 830 as described with reference to FIG. 8.

At 1615, the method may include receiving configured grant information that provides periodic uplink resources for a set of multiple configured grant uplink transmissions, including first periodic uplink resources that include a first symbol of the first subset of symbols for a first configured grant uplink transmission. The operations of block 1615 may be performed in accordance with examples as disclosed herein. In some examples, aspects of the operations of 1615 may be performed by a scheduling manager 835 as described with reference to FIG. 8.

At 1620, the method may include configuring the first symbol for uplink communications or downlink communications based on a priority rule associated with the full-duplex communications, where the priority rule indicates the first symbol is to be configured for uplink communications or for downlink communications for reception of the SSB transmission based on whether the uplink transmission is a dynamically scheduled uplink transmission or a configured grant uplink transmission. The operations of block 1620 may be performed in accordance with examples as disclosed herein. In some examples, aspects of the operations of 1620 may be performed by an FD communications manager 840 as described with reference to FIG. 8.

At 1625, the method may include receiving the SSB transmission in the first symbol based on the priority rule and the second configuration information indicating that the UE is to measure the SSB transmission, and where the first configured grant uplink transmission is skipped. The operations of block 1625 may be performed in accordance with examples as disclosed herein. In some examples, aspects of the operations of 1625 may be performed by an FD communications manager 840 as described with reference to FIG. 8.

FIG. 17 shows a flowchart illustrating a method 1700 that supports techniques for SSB transmission in full-duplex communications in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include receiving first configuration information for full-duplex communications for a set of symbols, the full-duplex communications providing uplink communications and downlink communications for each symbol of the set of symbols. The operations of block 1705 may be performed in accordance with examples as disclosed herein. In some examples, aspects of the operations of 1705 may be performed by an FD configuration manager 825 as described with reference to FIG. 8.

At 1710, the method may include receiving second configuration information for SSB transmissions, where the second configuration information indicates at least a first subset of symbols of the set of symbols is configured in symbols overlapped on one or more symbols configured for a SSB transmission. The operations of block 1710 may be performed in accordance with examples as disclosed herein. In some examples, aspects of the operations of 1710 may be performed by an SSB configuration manager 830 as described with reference to FIG. 8.

At 1715, the method may include receiving configured grant information that provides periodic uplink resources for a set of multiple configured grant uplink transmissions, including first periodic uplink resources that include a first symbol of the first subset of symbols for a first configured grant uplink transmission. The operations of block 1715 may be performed in accordance with examples as disclosed herein. In some examples, aspects of the operations of 1715 may be performed by a scheduling manager 835 as described with reference to FIG. 8.

At 1720, the method may include configuring the first symbol for uplink communications or downlink communications based on a priority rule associated with the full-duplex communications, where the priority rule indicates the first symbol is to be configured for uplink communications or for downlink communications for reception of the SSB transmission based on whether the uplink transmission is a dynamically scheduled uplink transmission or a configured grant uplink transmission. The operations of block 1720 may be performed in accordance with examples as disclosed herein. In some examples, aspects of the operations of 1720 may be performed by an FD communications manager 840 as described with reference to FIG. 8.

At 1725, the method may include transmitting the uplink transmission in the first symbol based on the priority rule and the second configuration information indicating that the UE is not to measure the SSB transmission in the first symbol. The operations of block 1725 may be performed in accordance with examples as disclosed herein. In some examples, aspects of the operations of 1725 may be performed by an FD communications manager 840 as described with reference to FIG. 8.

Figure 18:
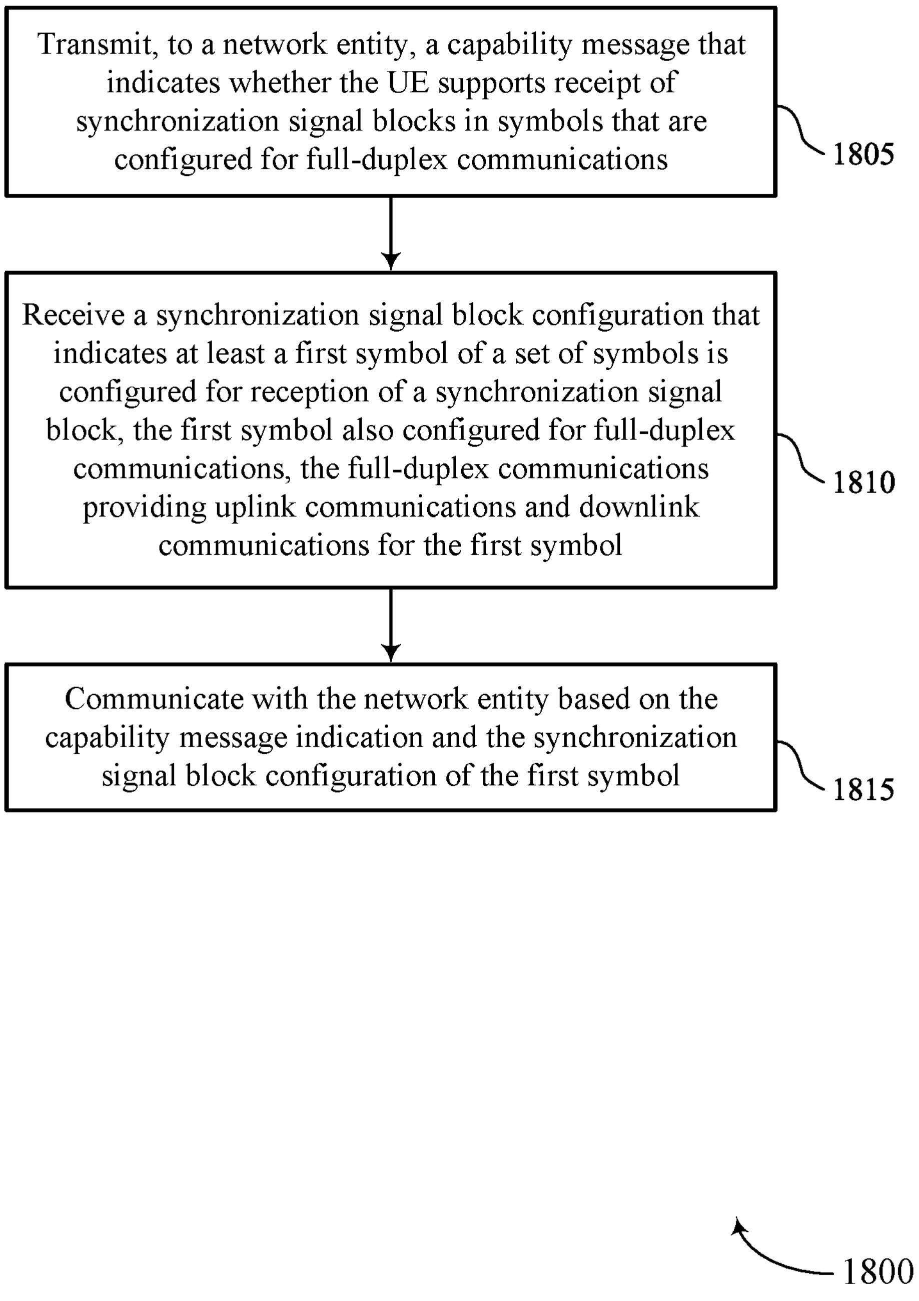

FIG. 18 shows a flowchart illustrating a method 1800 that supports techniques for SSB transmission in full-duplex communications in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1805, the method may include transmitting, to a network entity, a capability message that indicates whether the UE supports receipt of SSBs in symbols that are configured for full-duplex communications. The operations of block 1805 may be performed in accordance with examples as disclosed herein. In some examples, aspects of the operations of 1805 may be performed by a capability manager 845 as described with reference to FIG. 8.

At 1810, the method may include receiving a SSB configuration that indicates at least a first symbol of a set of symbols is configured for reception of a SSB, the first symbol also configured for full-duplex communications, the full-duplex communications providing uplink communications and downlink communications for the first symbol. The operations of block 1810 may be performed in accordance with examples as disclosed herein. In some examples, aspects of the operations of 1810 may be performed by an SSB configuration manager 830 as described with reference to FIG. 8.

At 1815, the method may include communicating with the network entity based on the capability message indication and the SSB configuration of the first symbol. The operations of block 1815 may be performed in accordance with examples as disclosed herein. In some examples, aspects of the operations of 1815 may be performed by an FD communications manager 840 as described with reference to FIG. 8.

Figure 19:
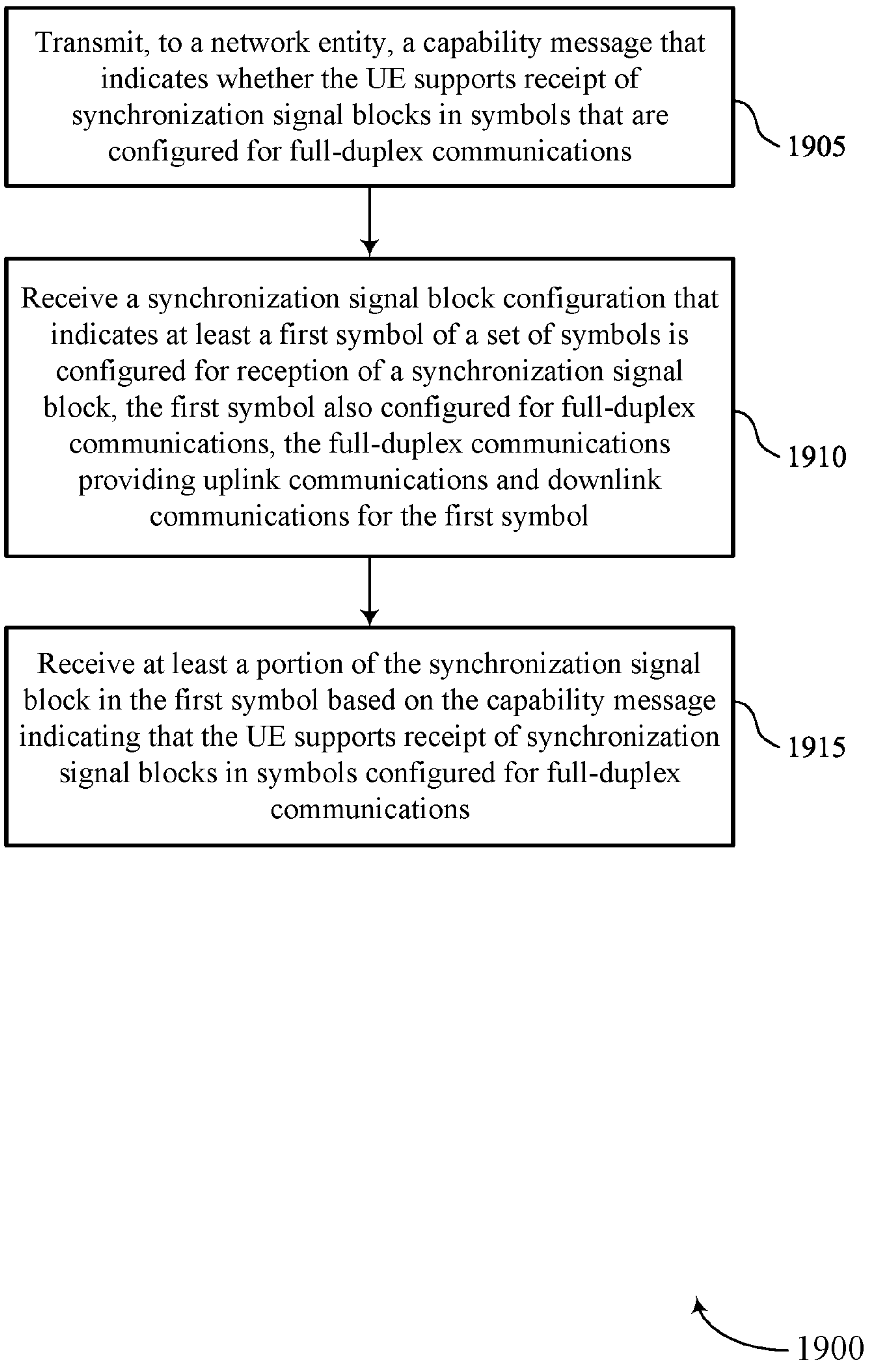

FIG. 19 shows a flowchart illustrating a method 1900 that supports techniques for SSB transmission in full-duplex communications in accordance with aspects of the present disclosure. The operations of the method 1900 may be implemented by a UE or its components as described herein. For example, the operations of the method 1900 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1905, the method may include transmitting, to a network entity, a capability message that indicates whether the UE supports receipt of SSBs in symbols that are configured for full-duplex communications. The operations of block 1905 may be performed in accordance with examples as disclosed herein. In some examples, aspects of the operations of 1905 may be performed by a capability manager 845 as described with reference to FIG. 8.

At 1910, the method may include receiving a SSB configuration that indicates at least a first symbol of a set of symbols is configured for reception of a SSB, the first symbol also configured for full-duplex communications, the full-duplex communications providing uplink communications and downlink communications for the first symbol. The operations of block 1910 may be performed in accordance with examples as disclosed herein. In some examples, aspects of the operations of 1910 may be performed by an SSB configuration manager 830 as described with reference to FIG. 8.

At 1915, the method may include receiving at least a portion of the SSB in the first symbol based on the capability message indicating that the UE supports receipt of SSBs in symbols configured for full-duplex communications. The operations of block 1915 may be performed in accordance with examples as disclosed herein. In some examples, aspects of the operations of 1915 may be performed by an SSB reception manager 850 as described with reference to FIG. 8.

Figure 20:
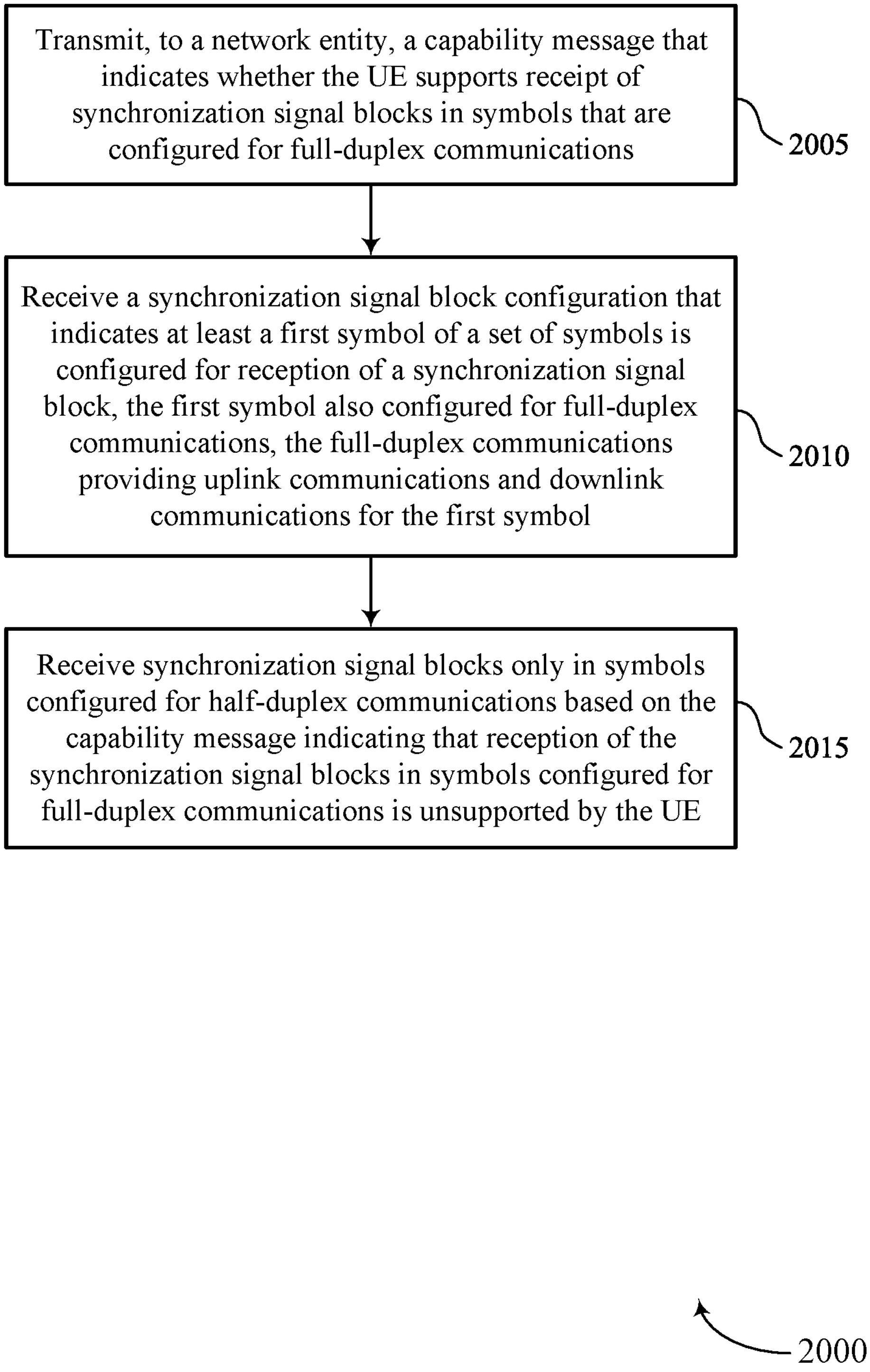

FIG. 20 shows a flowchart illustrating a method 2000 that supports techniques for SSB transmission in full-duplex communications in accordance with aspects of the present disclosure. The operations of the method 2000 may be implemented by a UE or its components as described herein. For example, the operations of the method 2000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 2005, the method may include transmitting, to a network entity, a capability message that indicates whether the UE supports receipt of SSBs in symbols that are configured for full-duplex communications. The operations of block 2005 may be performed in accordance with examples as disclosed herein. In some examples, aspects of the operations of 2005 may be performed by a capability manager 845 as described with reference to FIG. 8.

At 2010, the method may include receiving a SSB configuration that indicates at least a first symbol of a set of symbols is configured for reception of a SSB, the first symbol also configured for full-duplex communications, the full-duplex communications providing uplink communications and downlink communications for the first symbol. The operations of block 2010 may be performed in accordance with examples as disclosed herein. In some examples, aspects of the operations of 2010 may be performed by an SSB configuration manager 830 as described with reference to FIG. 8.

At 2015, the method may include receiving SSBs only in symbols configured for half-duplex communications based on the capability message indicating that reception of the SSBs in symbols configured for full-duplex communications is unsupported by the UE. The operations of block 2015 may be performed in accordance with examples as disclosed herein. In some examples, aspects of the operations of 2015 may be performed by an SSB reception manager 850 as described with reference to FIG. 8.

Figure 21:
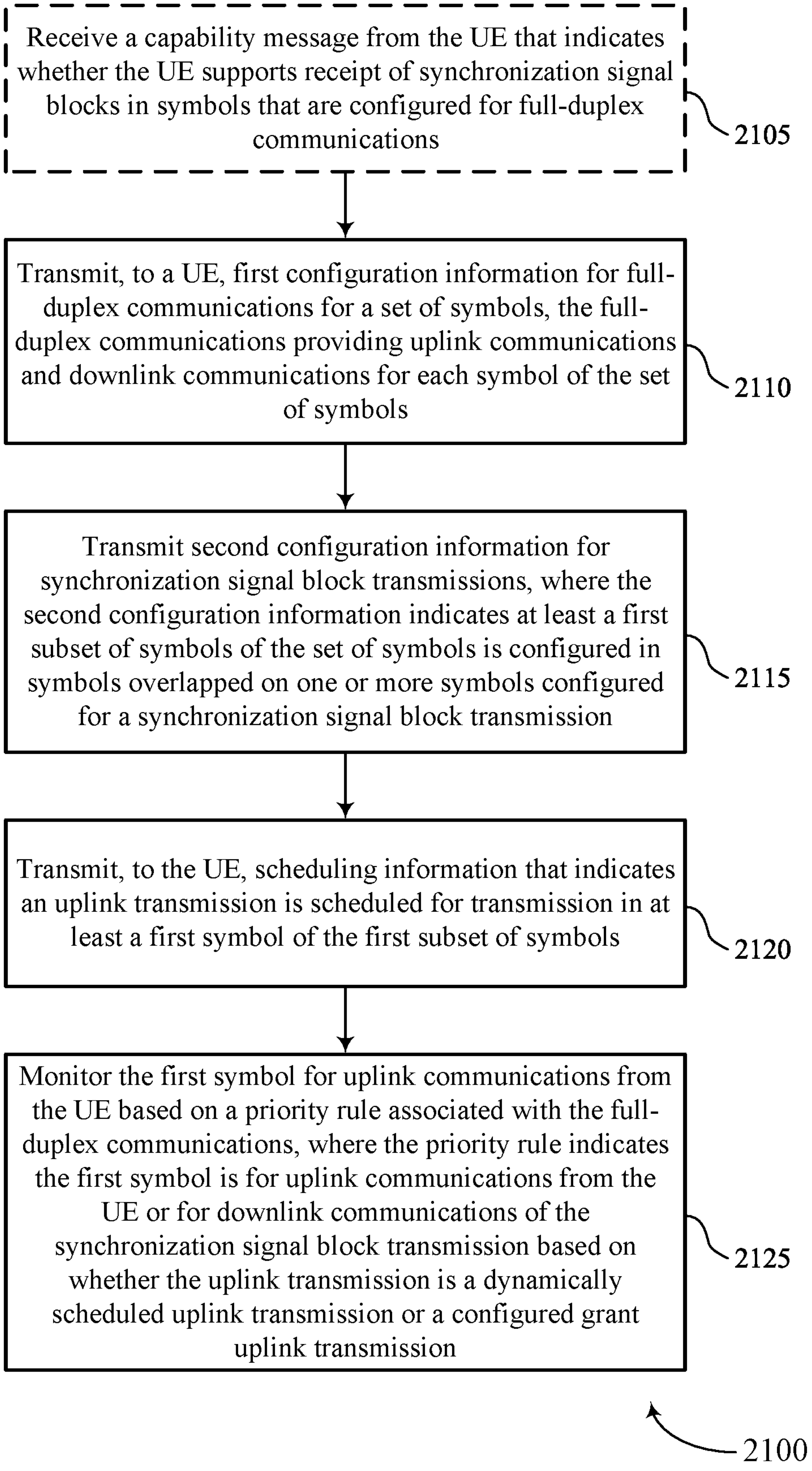

FIG. 21 shows a flowchart illustrating a method 2100 that supports techniques for SSB transmission in full-duplex communications in accordance with aspects of the present disclosure. The operations of the method 2100 may be implemented by a network entity or its components as described herein. For example, the operations of the method 2100 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

Optionally, at 2105, the method may include receiving a capability message from the UE that indicates whether the UE supports receipt of SSBs in symbols that are configured for full-duplex communications. The operations of block 2105 may be performed in accordance with examples as disclosed herein. In some examples, aspects of the operations of 2105 may be performed by a capability manager 1245 as described with reference to FIG. 12.

At 2110, the method may include transmitting, to a UE, first configuration information for full-duplex communications for a set of symbols, the full-duplex communications providing uplink communications and downlink communications for each symbol of the set of symbols. The operations of block 2110 may be performed in accordance with examples as disclosed herein. In some examples, aspects of the operations of 2110 may be performed by an FD configuration manager 1225 as described with reference to FIG. 12.

At 2115, the method may include transmitting second configuration information for SSB transmissions, where the second configuration information indicates at least a first subset of symbols of the set of symbols is configured in symbols overlapped on one or more symbols configured for a SSB transmission. The operations of block 2115 may be performed in accordance with examples as disclosed herein. In some examples, aspects of the operations of 2115 may be performed by an SSB configuration manager 1230 as described with reference to FIG. 12.

At 2120, the method may include transmitting, to the UE, scheduling information that indicates an uplink transmission is scheduled for transmission in at least a first symbol of the first subset of symbols. The operations of block 2120 may be performed in accordance with examples as disclosed herein. In some examples, aspects of the operations of 2120 may be performed by a scheduling manager 1235 as described with reference to FIG. 12.

At 2125, the method may include monitoring the first symbol for uplink communications from the UE based on a priority rule associated with the full-duplex communications, where the priority rule indicates the first symbol is for uplink communications from the UE or for downlink communications of the SSB transmission based on whether the uplink transmission is a dynamically scheduled uplink transmission or a configured grant uplink transmission. The operations of block 2125 may be performed in accordance with examples as disclosed herein. In some examples, aspects of the operations of 2125 may be performed by an FD communications manager 1240 as described with reference to FIG. 12.

Figure 22:
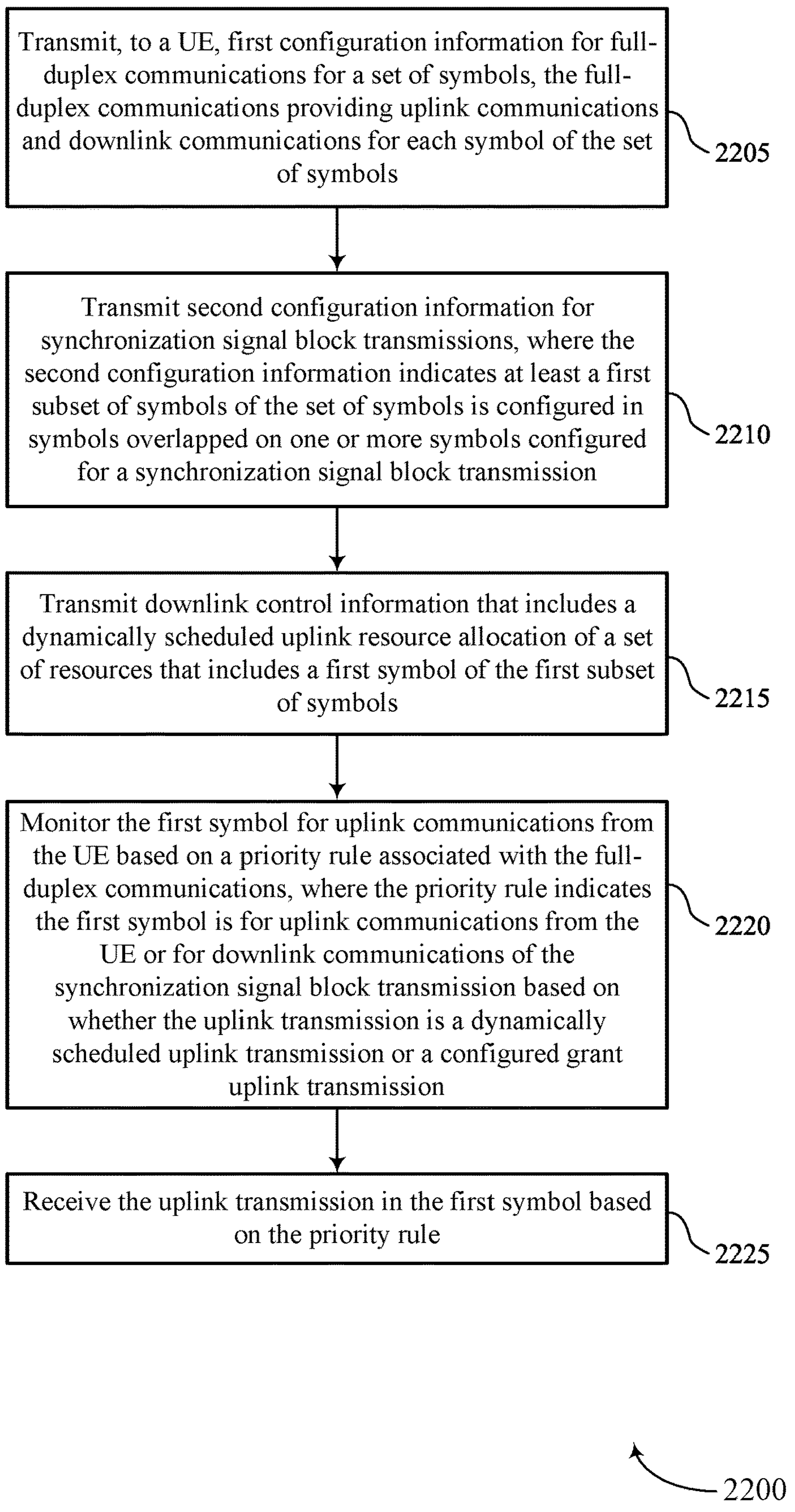

FIG. 22 shows a flowchart illustrating a method 2200 that supports techniques for SSB transmission in full-duplex communications in accordance with aspects of the present disclosure. The operations of the method 2200 may be implemented by a network entity or its components as described herein. For example, the operations of the method 2200 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2205, the method may include transmitting, to a UE, first configuration information for full-duplex communications for a set of symbols, the full-duplex communications providing uplink communications and downlink communications for each symbol of the set of symbols. The operations of block 2205 may be performed in accordance with examples as disclosed herein. In some examples, aspects of the operations of 2205 may be performed by an FD configuration manager 1225 as described with reference to FIG. 12.

At 2210, the method may include transmitting second configuration information for SSB transmissions, where the second configuration information indicates at least a first subset of symbols of the set of symbols is configured in symbols overlapped on one or more symbols configured for a SSB transmission. The operations of block 2210 may be performed in accordance with examples as disclosed herein. In some examples, aspects of the operations of 2210 may be performed by an SSB configuration manager 1230 as described with reference to FIG. 12.

At 2215, the method may include transmitting downlink control information that includes a dynamically scheduled uplink resource allocation of a set of resources that includes a first symbol of the first subset of symbols. The operations of block 2215 may be performed in accordance with examples as disclosed herein. In some examples, aspects of the operations of 2215 may be performed by a scheduling manager 1235 as described with reference to FIG. 12.

At 2220, the method may include monitoring the first symbol for uplink communications from the UE based on a priority rule associated with the full-duplex communications, where the priority rule indicates the first symbol is for uplink communications from the UE or for downlink communications of the SSB transmission based on whether the uplink transmission is a dynamically scheduled uplink transmission or a configured grant uplink transmission. The operations of block 2220 may be performed in accordance with examples as disclosed herein. In some examples, aspects of the operations of 2220 may be performed by an FD communications manager 1240 as described with reference to FIG. 12.

At 2225, the method may include receiving the uplink transmission in the first symbol based on the priority rule. The operations of block 2225 may be performed in accordance with examples as disclosed herein. In some examples, aspects of the operations of 2225 may be performed by an FD communications manager 1240 as described with reference to FIG. 12.

Figure 23:
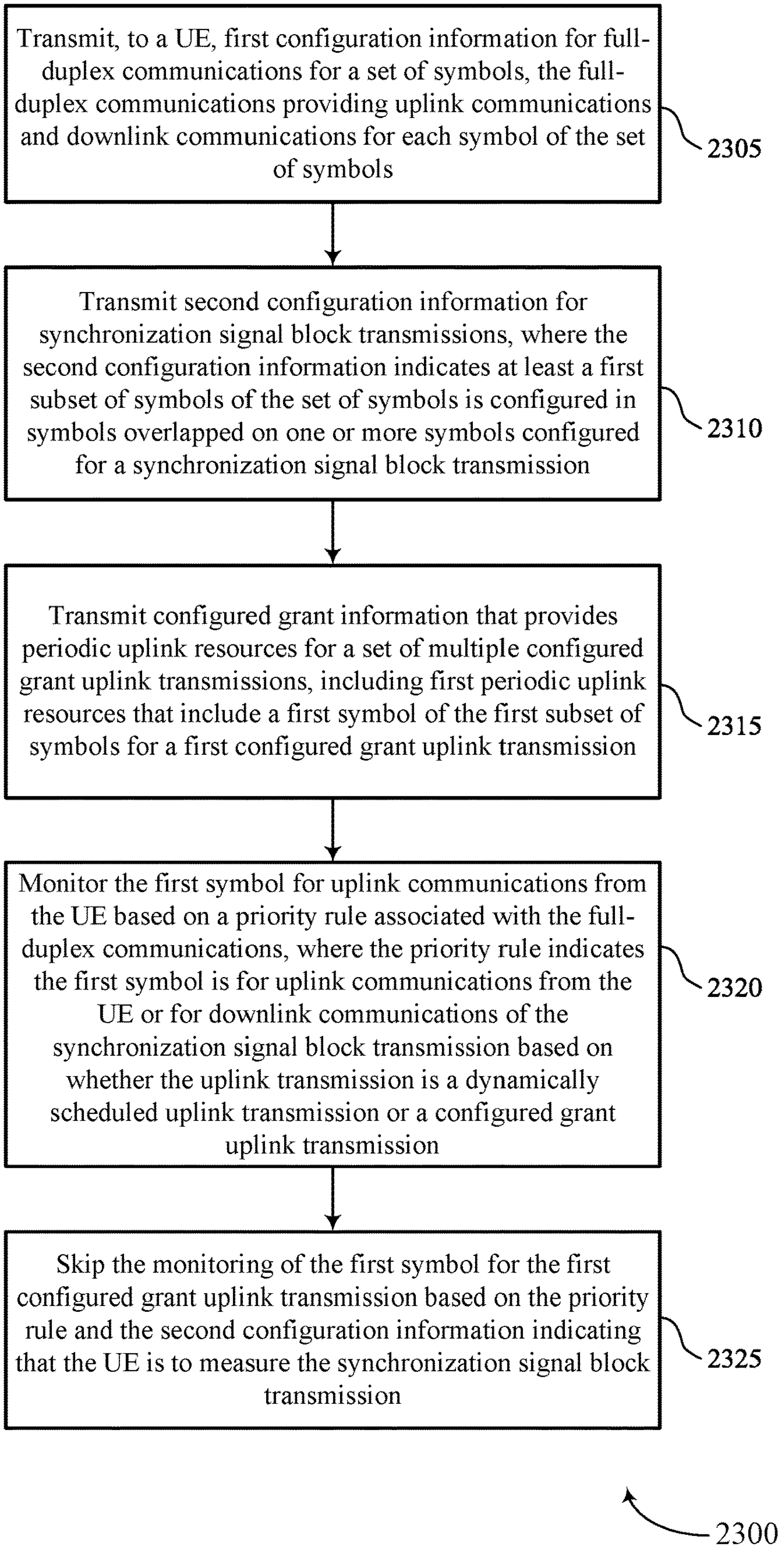

FIG. 23 shows a flowchart illustrating a method 2300 that supports techniques for SSB transmission in full-duplex communications in accordance with aspects of the present disclosure. The operations of the method 2300 may be implemented by a network entity or its components as described herein. For example, the operations of the method 2300 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2305, the method may include transmitting, to a UE, first configuration information for full-duplex communications for a set of symbols, the full-duplex communications providing uplink communications and downlink communications for each symbol of the set of symbols. The operations of block 2305 may be performed in accordance with examples as disclosed herein. In some examples, aspects of the operations of 2305 may be performed by an FD configuration manager 1225 as described with reference to FIG. 12.

At 2310, the method may include transmitting second configuration information for SSB transmissions, where the second configuration information indicates at least a first subset of symbols of the set of symbols is configured in symbols overlapped on one or more symbols configured for a SSB transmission. The operations of block 2310 may be performed in accordance with examples as disclosed herein. In some examples, aspects of the operations of 2310 may be performed by an SSB configuration manager 1230 as described with reference to FIG. 12.

At 2315, the method may include transmitting configured grant information that provides periodic uplink resources for a set of multiple configured grant uplink transmissions, including first periodic uplink resources that include a first symbol of the first subset of symbols for a first configured grant uplink transmission. The operations of block 2315 may be performed in accordance with examples as disclosed herein. In some examples, aspects of the operations of 2315 may be performed by a scheduling manager 1235 as described with reference to FIG. 12.

At 2320, the method may include monitoring the first symbol for uplink communications from the UE based on a priority rule associated with the full-duplex communications, where the priority rule indicates the first symbol is for uplink communications from the UE or for downlink communications of the SSB transmission based on whether the uplink transmission is a dynamically scheduled uplink transmission or a configured grant uplink transmission. The operations of block 2320 may be performed in accordance with examples as disclosed herein. In some examples, aspects of the operations of 2320 may be performed by an FD communications manager 1240 as described with reference to FIG. 12.

At 2325, the method may include skipping the monitoring of the first symbol for the first configured grant uplink transmission based on the priority rule and the second configuration information indicating that the UE is to measure the SSB transmission. The operations of block 2325 may be performed in accordance with examples as disclosed herein. In some examples, aspects of the operations of 2325 may be performed by an FD communications manager 1240 as described with reference to FIG. 12.

Figure 24:
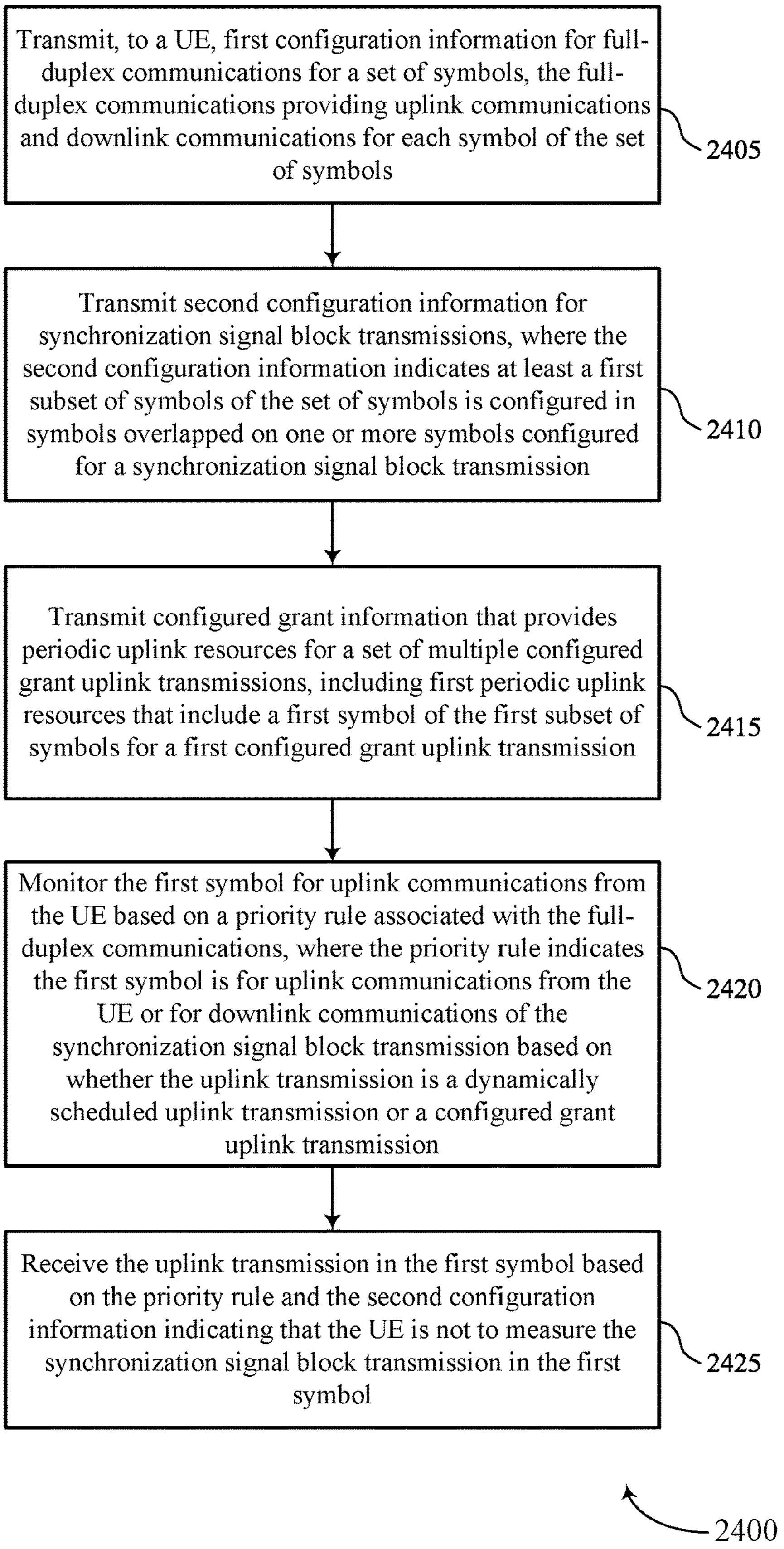

FIG. 24 shows a flowchart illustrating a method 2400 that supports techniques for SSB transmission in full-duplex communications in accordance with aspects of the present disclosure. The operations of the method 2400 may be implemented by a network entity or its components as described herein. For example, the operations of the method 2400 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2405, the method may include transmitting, to a UE, first configuration information for full-duplex communications for a set of symbols, the full-duplex communications providing uplink communications and downlink communications for each symbol of the set of symbols. The operations of block 2405 may be performed in accordance with examples as disclosed herein. In some examples, aspects of the operations of 2405 may be performed by an FD configuration manager 1225 as described with reference to FIG. 12.

At 2410, the method may include transmitting second configuration information for SSB transmissions, where the second configuration information indicates at least a first subset of symbols of the set of symbols is configured in symbols overlapped on one or more symbols configured for a SSB transmission. The operations of block 2410 may be performed in accordance with examples as disclosed herein. In some examples, aspects of the operations of 2410 may be performed by an SSB configuration manager 1230 as described with reference to FIG. 12.

At 2415, the method may include transmitting configured grant information that provides periodic uplink resources for a set of multiple configured grant uplink transmissions, including first periodic uplink resources that include a first symbol of the first subset of symbols for a first configured grant uplink transmission. The operations of block 2415 may be performed in accordance with examples as disclosed herein. In some examples, aspects of the operations of 2415 may be performed by a scheduling manager 1235 as described with reference to FIG. 12.

At 2420, the method may include monitoring the first symbol for uplink communications from the UE based on a priority rule associated with the full-duplex communications, where the priority rule indicates the first symbol is for uplink communications from the UE or for downlink communications of the SSB transmission based on whether the uplink transmission is a dynamically scheduled uplink transmission or a configured grant uplink transmission. The operations of block 2420 may be performed in accordance with examples as disclosed herein. In some examples, aspects of the operations of 2420 may be performed by an FD communications manager 1240 as described with reference to FIG. 12.

At 2425, the method may include receiving the uplink transmission in the first symbol based on the priority rule and the second configuration information indicating that the UE is not to measure the SSB transmission in the first symbol. The operations of block 2425 may be performed in accordance with examples as disclosed herein. In some examples, aspects of the operations of 2425 may be performed by an FD communications manager 1240 as described with reference to FIG. 12.

Figure 25:
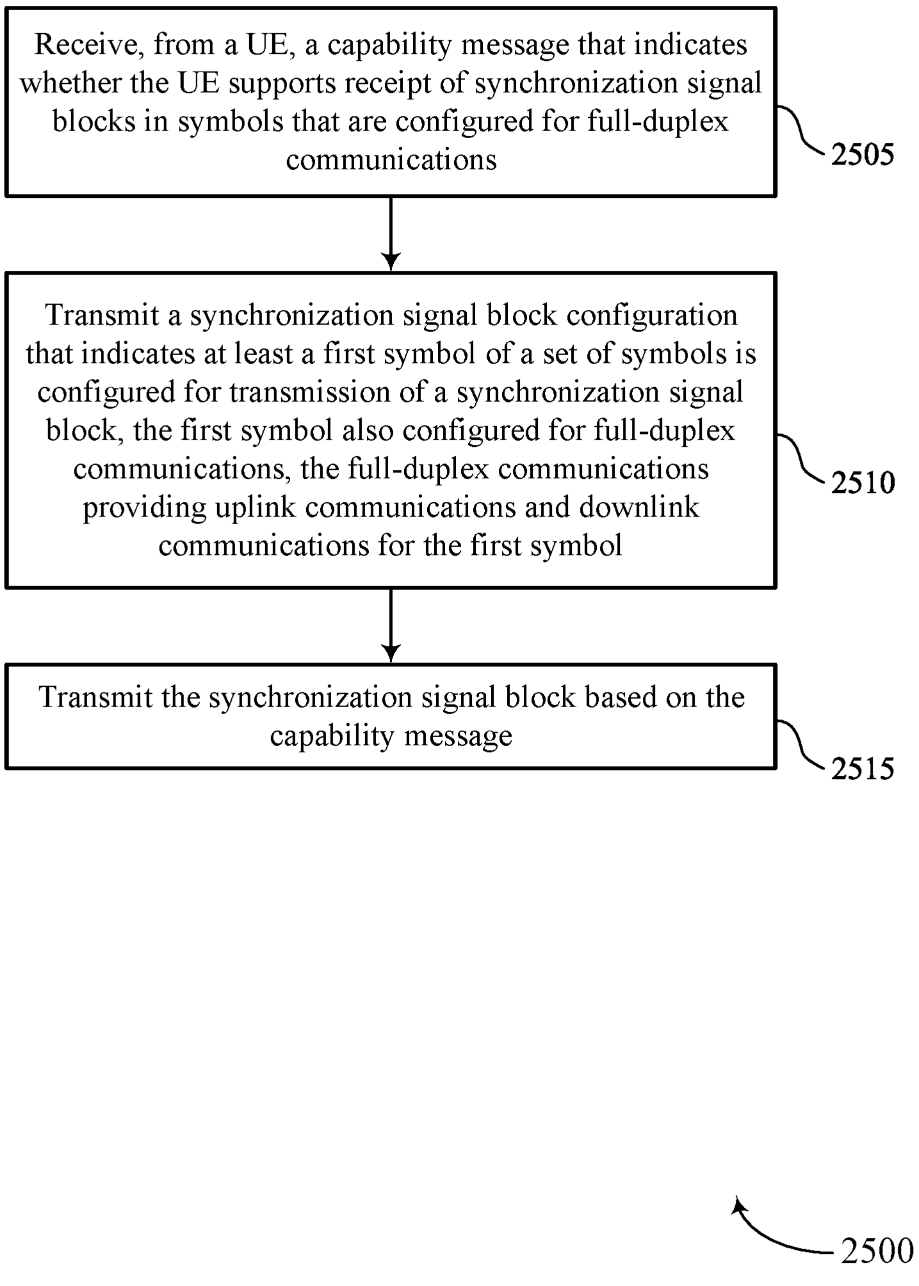

FIG. 25 shows a flowchart illustrating a method 2500 that supports techniques for SSB transmission in full-duplex communications in accordance with aspects of the present disclosure. The operations of the method 2500 may be implemented by a network entity or its components as described herein. For example, the operations of the method 2500 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2505, the method may include receiving, from a UE, a capability message that indicates whether the UE supports receipt of SSBs in symbols that are configured for full-duplex communications. The operations of block 2505 may be performed in accordance with examples as disclosed herein. In some examples, aspects of the operations of 2505 may be performed by a capability manager 1245 as described with reference to FIG. 12.

At 2510, the method may include transmitting a SSB configuration that indicates at least a first symbol of a set of symbols is configured for transmission of a SSB, the first symbol also configured for full-duplex communications, the full-duplex communications providing uplink communications and downlink communications for the first symbol. The operations of block 2510 may be performed in accordance with examples as disclosed herein. In some examples, aspects of the operations of 2510 may be performed by an SSB configuration manager 1230 as described with reference to FIG. 12.

At 2515, the method may include transmitting the SSB based on the capability message. The operations of block 2515 may be performed in accordance with examples as disclosed herein. In some examples, aspects of the operations of 2515 may be performed by an FD communications manager 1240 as described with reference to FIG. 12.

Figure 26:
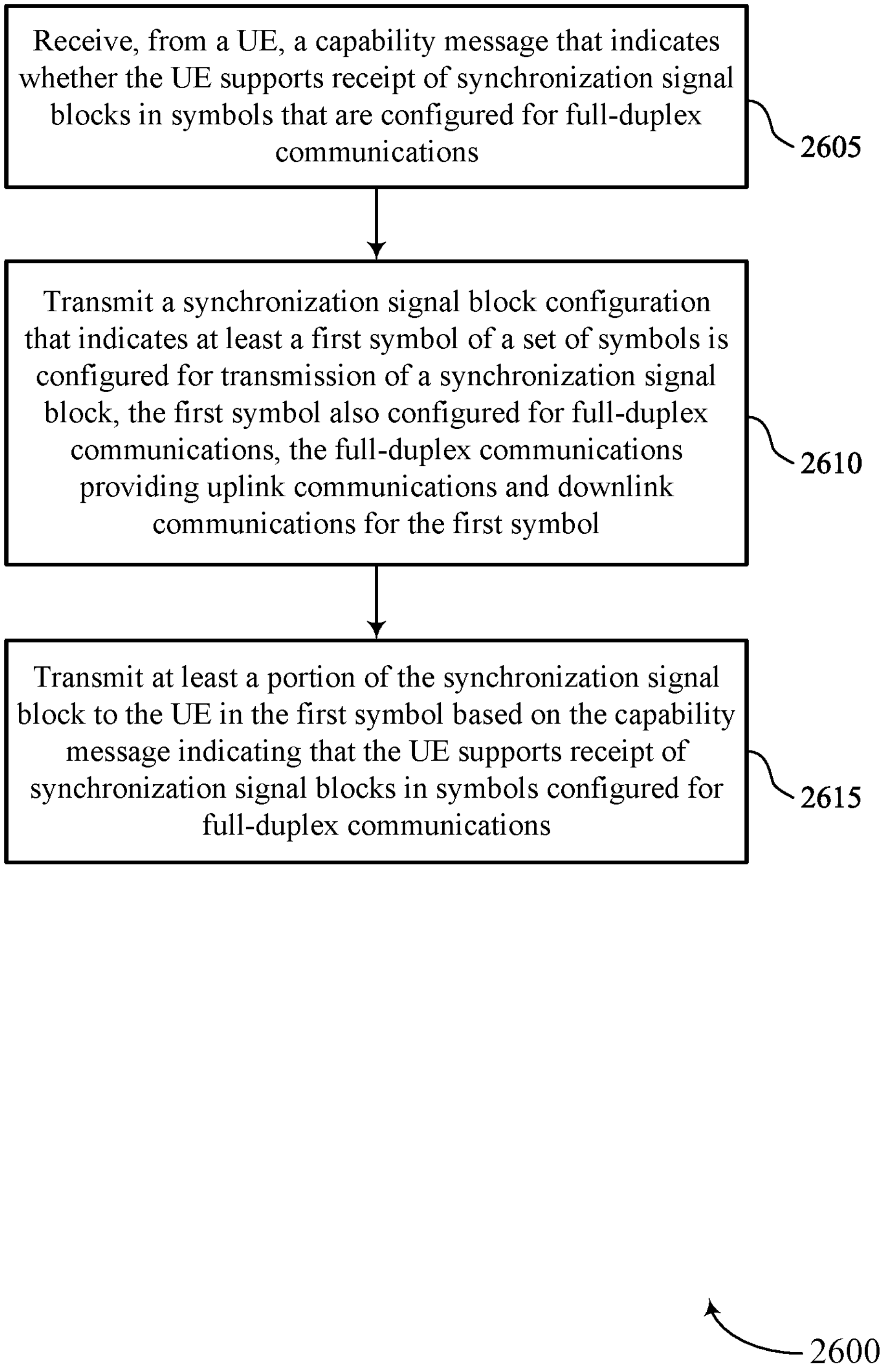

FIG. 26 shows a flowchart illustrating a method 2600 that supports techniques for SSB transmission in full-duplex communications in accordance with aspects of the present disclosure. The operations of the method 2600 may be implemented by a network entity or its components as described herein. For example, the operations of the method 2600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2605, the method may include receiving, from a UE, a capability message that indicates whether the UE supports receipt of SSBs in symbols that are configured for full-duplex communications. The operations of block 2605 may be performed in accordance with examples as disclosed herein. In some examples, aspects of the operations of 2605 may be performed by a capability manager 1245 as described with reference to FIG. 12.

At 2610, the method may include transmitting a SSB configuration that indicates at least a first symbol of a set of symbols is configured for transmission of a SSB, the first symbol also configured for full-duplex communications, the full-duplex communications providing uplink communications and downlink communications for the first symbol. The operations of block 2610 may be performed in accordance with examples as disclosed herein. In some examples, aspects of the operations of 2610 may be performed by an SSB configuration manager 1230 as described with reference to FIG. 12.

At 2615, the method may include transmitting at least a portion of the SSB to the UE in the first symbol based on the capability message indicating that the UE supports receipt of SSBs in symbols configured for full-duplex communications. The operations of block 2615 may be performed in accordance with examples as disclosed herein. In some examples, aspects of the operations of 2615 may be performed by an SSB transmission manager 1250 as described with reference to FIG. 12.

Figure 27:
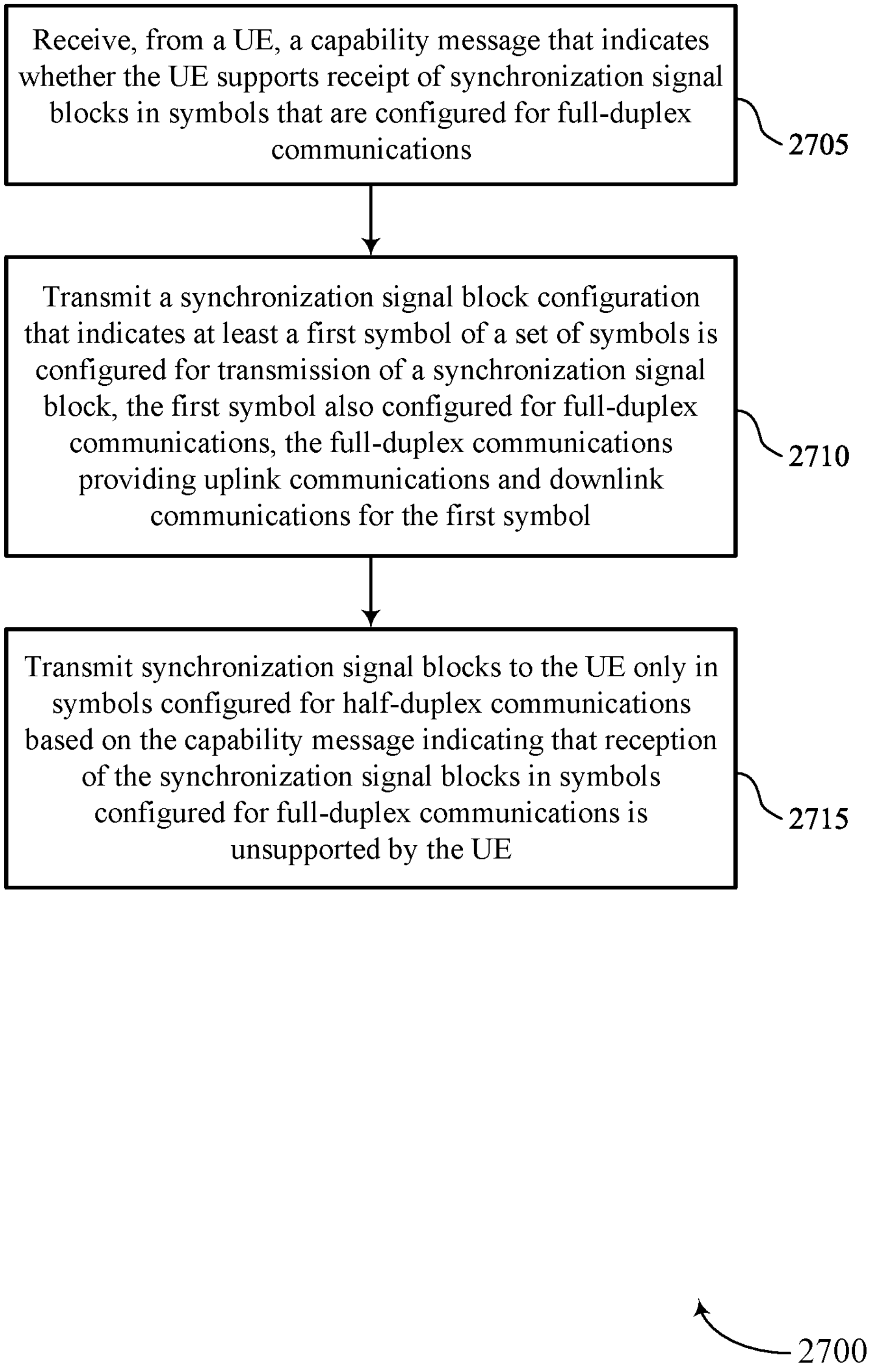

FIG. 27 shows a flowchart illustrating a method 2700 that supports techniques for SSB transmission in full-duplex communications in accordance with aspects of the present disclosure. The operations of the method 2700 may be implemented by a network entity or its components as described herein. For example, the operations of the method 2700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2705, the method may include receiving, from a UE, a capability message that indicates whether the UE supports receipt of SSBs in symbols that are configured for full-duplex communications. The operations of block 2705 may be performed in accordance with examples as disclosed herein. In some examples, aspects of the operations of 2705 may be performed by a capability manager 1245 as described with reference to FIG. 12.

At 2710, the method may include transmitting a SSB configuration that indicates at least a first symbol of a set of symbols is configured for transmission of a SSB, the first symbol also configured for full-duplex communications, the full-duplex communications providing uplink communications and downlink communications for the first symbol. The operations of block 2710 may be performed in accordance with examples as disclosed herein. In some examples, aspects of the operations of 2710 may be performed by an SSB configuration manager 1230 as described with reference to FIG. 12.

At 2715, the method may include transmitting SSBs to the UE only in symbols configured for half-duplex communications based on the capability message indicating that reception of the SSBs in symbols configured for full-duplex communications is unsupported by the UE. The operations of block 2715 may be performed in accordance with examples as disclosed herein. In some examples, aspects of the operations of 2715 may be performed by an SSB transmission manager 1250 as described with reference to FIG. 12.

The following provides an overview of aspects of the present disclosure:

Aspect 1: A method for wireless communications at a UE, comprising: receiving first configuration information for full-duplex communications for a set of symbols, the full-duplex communications providing uplink communications and downlink communications for each symbol of the set of symbols; receiving second configuration information for synchronization signal block transmissions, wherein the second configuration information indicates at least a first subset of symbols of the set of symbols is configured in symbols overlapped on one or more symbols configured for a synchronization signal block transmission; receiving scheduling information that indicates an uplink transmission is scheduled for transmission in at least a first symbol of the first subset of symbols; and configuring the first symbol for uplink communications or downlink communications based at least in part on a priority rule associated with the full-duplex communications, wherein the priority rule indicates the first symbol is to be configured for uplink communications or for downlink communications for reception of the synchronization signal block transmission based at least in part on whether the uplink transmission is a dynamically scheduled uplink transmission or a configured grant uplink transmission.

Aspect 2: The method of aspect 1, wherein the receiving the scheduling information comprises: receiving downlink control information that includes a dynamically scheduled uplink resource allocation of a set of resources that includes the first symbol, and wherein the method further comprises: transmitting the uplink transmission in the first symbol based at least in part on the priority rule.

Aspect 3: The method of any of aspects 1 through 2, wherein the receiving the scheduling information comprises: receiving configured grant information that provides periodic uplink resources for a plurality of configured grant uplink transmissions, including first periodic uplink resources that include the first symbol for a first configured grant uplink transmission, and wherein the method further comprises: receiving the synchronization signal block transmission in the first symbol based at least in part on the priority rule and the second configuration information indicating that the UE is to measure the synchronization signal block transmission, and wherein the first configured grant uplink transmission is skipped.

Aspect 4: The method of any of aspects 1 through 2, wherein the receiving the scheduling information comprises: receiving configured grant information that provides periodic uplink resources for a plurality of configured grant uplink transmissions, including first periodic uplink resources that include the first symbol for a first configured grant uplink transmission, and wherein the method further comprises: transmitting the uplink transmission in the first symbol based at least in part on the priority rule and the second configuration information indicating that the UE is not to measure the synchronization signal block transmission in the first symbol.

Aspect 5: The method of any of aspects 1 through 4, further comprising: transmitting a capability message that indicates whether the UE supports receipt of synchronization signal blocks in symbols that are configured for full-duplex communications.

Aspect 6: The method of aspect 5, wherein the capability message is transmitted in capability signaling subsequent to establishment of a radio resource control connection, or is transmitted as an early UE capability indication prior to establishment of the radio resource control connection.

Aspect 7: The method of any of aspects 1 through 6, wherein the first configuration information is a sub-band full-duplex configuration in which at least a first sub-band of a component carrier bandwidth is configured for downlink communications and at least a second sub-band of the component carrier bandwidth or another component carrier is configured for uplink communications.

Aspect 8: A method for wireless communications at a UE, comprising: transmitting, to a network entity, a capability message that indicates whether the UE supports receipt of synchronization signal blocks in symbols that are configured for full-duplex communications; receiving a synchronization signal block configuration that indicates at least a first symbol of a set of symbols is configured for reception of a synchronization signal block, the first symbol also configured for full-duplex communications, the full-duplex communications providing uplink communications and downlink communications for the first symbol; and communicating with the network entity based at least in part on the capability message indication and the synchronization signal block configuration of the first symbol.

Aspect 9: The method of aspect 8, further comprising: receiving at least a portion of the synchronization signal block in the first symbol based at least in part on the capability message indicating that the UE supports receipt of synchronization signal blocks in symbols configured for full-duplex communications.

Aspect 10: The method of any of aspects 8 through 9, further comprising: receiving synchronization signal blocks only in symbols configured for half-duplex communications based at least in part on the capability message indicating that reception of the synchronization signal blocks in symbols configured for full-duplex communications is unsupported by the UE.

Aspect 11: The method of any of aspects 8 through 10, wherein the capability message is transmitted in capability signaling subsequent to establishment of a radio resource control connection, or is transmitted as an early UE capability indication prior to establishment of the radio resource control connection.

Aspect 12: The method of any of aspects 8 through 11, wherein the communicating with the network entity further comprises: configuring the first symbol for an uplink communication or a downlink communication based at least in part on a priority rule associated with the full-duplex communications.

Aspect 13: The method of aspect 12, wherein the priority rule indicates the first symbol is to be configured for uplink communications or for the downlink communication for reception of the synchronization signal block based at least in part on whether the uplink communication is a dynamically scheduled uplink transmission or a configured grant uplink transmission.

Aspect 14: The method of any of aspects 8 through 13, wherein uplink transmissions are prohibited for UEs configured to monitor for synchronization signal blocks in symbols that are configured for full-duplex communications, and wherein the capability message indicates that the UE supports receiving synchronization signal blocks in symbols that are configured for full-duplex communications.

Aspect 15: The method of any of aspects 8 through 14, wherein the capability message indicates that the UE does not support receiving synchronization signal blocks in symbols that are configured for full-duplex communications, and wherein synchronization signal blocks are not configured to be transmitted in symbols that are configured for full-duplex communications.

Aspect 16: The method of any of aspects 8 through 14, wherein uplink transmissions are allowed for UEs configured to monitor for synchronization signal blocks in symbols that are configured for full-duplex communications, and wherein the capability message indicates that the UE supports receiving downlink communications and transmitting uplink communications in symbols that are configured for full-duplex communications and that include synchronization signal block transmissions.

Aspect 17: The method of aspect 16, wherein a priority rule is used to determine whether to transmit an uplink communication or receive a synchronization signal block transmission in a symbol configured for full-duplex communications that includes a synchronization signal block transmission.

Aspect 18: The method of any of aspects 8 through 17, further comprising: receiving full-duplex configuration information in common signaling that is provided to a plurality of UEs, and wherein the full-duplex configuration information applies to each UE of the plurality of UEs.

Aspect 19: The method of aspect 18, wherein the capability message indicates that the UE does not support receiving synchronization signal blocks in symbols that are configured for full-duplex communications, and wherein the UE ignores synchronization signal blocks that are configured in full-duplex symbols.

Aspect 20: The method of any of aspects 18 through 19, wherein the capability message indicates that the UE does not support receiving synchronization signal blocks in symbols that are configured for full-duplex communications, and wherein the UE ignores full-duplex configuration information that is provided in common signaling for the plurality of UEs.

Aspect 21: The method of any of aspects 8 through 20, wherein the full-duplex communications are configured by a sub-band full-duplex configuration in which at least a first sub-band of a component carrier bandwidth is configured for downlink communications and at least a second sub-band of the component carrier bandwidth or another component carrier is configured for uplink communications.

Aspect 22: A method for wireless communications at a network entity, comprising: transmitting, to a UE, first configuration information for full-duplex communications for a set of symbols, the full-duplex communications providing uplink communications and downlink communications for each symbol of the set of symbols; transmitting second configuration information for synchronization signal block transmissions, wherein the second configuration information indicates at least a first subset of symbols of the set of symbols is configured in symbols overlapped on one or more symbols configured for a synchronization signal block transmission; transmitting, to the UE, scheduling information that indicates an uplink transmission is scheduled for transmission in at least a first symbol of the first subset of symbols; and monitoring the first symbol for uplink communications from the UE based at least in part on a priority rule associated with the full-duplex communications, wherein the priority rule indicates the first symbol is for uplink communications from the UE or for downlink communications of the synchronization signal block transmission based at least in part on whether the uplink transmission is a dynamically scheduled uplink transmission or a configured grant uplink transmission.

Aspect 23: The method of aspect 22, wherein the transmitting the scheduling information comprises: transmitting downlink control information that includes a dynamically scheduled uplink resource allocation of a set of resources that includes the first symbol, and wherein the method further comprises: receiving the uplink transmission in the first symbol based at least in part on the priority rule.

Aspect 24: The method of any of aspects 22 through 23, wherein the transmitting the scheduling information comprises: transmitting configured grant information that provides periodic uplink resources for a plurality of configured grant uplink transmissions, including first periodic uplink resources that include the first symbol for a first configured grant uplink transmission, and wherein the method further comprises: skipping the monitoring of the first symbol for the first configured grant uplink transmission based at least in part on the priority rule and the second configuration information indicating that the UE is to measure the synchronization signal block transmission.

Aspect 25: The method of any of aspects 22 through 23, wherein the transmitting the scheduling information comprises: transmitting configured grant information that provides periodic uplink resources for a plurality of configured grant uplink transmissions, including first periodic uplink resources that include the first symbol for a first configured grant uplink transmission, and wherein the method further comprises: receiving the uplink transmission in the first symbol based at least in part on the priority rule and the second configuration information indicating that the UE is not to measure the synchronization signal block transmission in the first symbol.

Aspect 26: The method of any of aspects 22 through 25, further comprising: receiving a capability message from the UE that indicates whether the UE supports receipt of synchronization signal blocks in symbols that are configured for full-duplex communications.

Aspect 27: The method of aspect 26, wherein the capability message is received in capability signaling subsequent to establishment of a radio resource control connection, or is received as an early UE capability indication prior to establishment of the radio resource control connection.

Aspect 28: The method of any of aspects 22 through 27, wherein the first configuration information is a sub-band full-duplex configuration in which at least a first sub-band of a component carrier bandwidth is configured for downlink communications and at least a second sub-band of the component carrier bandwidth or another component carrier is configured for uplink communications.

Aspect 29: A method for wireless communications at a network entity, comprising: receiving, from a UE, a capability message that indicates whether the UE supports receipt of synchronization signal blocks in symbols that are configured for full-duplex communications; transmitting a synchronization signal block configuration that indicates at least a first symbol of a set of symbols is configured for transmission of a synchronization signal block, the first symbol also configured for full-duplex communications, the full-duplex communications providing uplink communications and downlink communications for the first symbol; and transmitting the synchronization signal block based at least in part on the capability message.

Aspect 30: The method of aspect 29, further comprising: transmitting at least a portion of the synchronization signal block to the UE in the first symbol based at least in part on the capability message indicating that the UE supports receipt of synchronization signal blocks in symbols configured for full-duplex communications.

Aspect 31: The method of any of aspects 29 through 30, further comprising: transmitting synchronization signal blocks to the UE only in symbols configured for half-duplex communications based at least in part on the capability message indicating that reception of the synchronization signal blocks in symbols configured for full-duplex communications is unsupported by the UE.

Aspect 32: The method of any of aspects 29 through 31, wherein the capability message is transmitted in capability signaling subsequent to establishment of a radio resource control connection, or is transmitted as an early UE capability indication prior to establishment of the radio resource control connection.

Aspect 33: The method of any of aspects 29 through 32, further comprising: configuring the first symbol for uplink communications or downlink communications based at least in part on a priority rule associated with the full-duplex communications.

Aspect 34: The method of aspect 33, wherein the priority rule indicates the first symbol is to be configured for uplink communications or for downlink communications for reception of the synchronization signal block transmission based at least in part on whether the uplink communications are dynamically scheduled uplink transmissions or are configured grant uplink transmissions.

Aspect 35: The method of any of aspects 29 through 34, wherein uplink transmissions are prohibited for UEs configured to monitor for synchronization signal blocks in symbols that are configured for full-duplex communications, and wherein the capability message indicates that the UE supports receiving synchronization signal blocks in symbols that are configured for full-duplex communications.

Aspect 36: The method of any of aspects 29 through 35, wherein the capability message indicates that the UE does not support receiving synchronization signal blocks in symbols that are configured for full-duplex communications, and wherein synchronization signal blocks are not transmitted in symbols that are configured for full-duplex communications.

Aspect 37: The method of any of aspects 29 through 36, wherein uplink transmissions are allowed for UEs configured to monitor for synchronization signal blocks in symbols that are configured for full-duplex communications, and wherein the capability message indicates that the UE supports receiving downlink communications and transmitting uplink communications in symbols that are configured for full-duplex communications and that include synchronization signal block transmissions.

Aspect 38: The method of aspect 37, wherein a priority rule is used to determine whether to monitor for an uplink communication in a symbol configured for full-duplex communications that includes a synchronization signal block transmission.

Aspect 39: The method of any of aspects 29 through 38, further comprising: transmitting full-duplex configuration information to a plurality of UEs in common signaling, and wherein the full-duplex configuration information applies to each UE of the plurality of UEs.

Aspect 40: The method of aspect 39, wherein the capability message indicates that the UE does not support receiving synchronization signal blocks in symbols that are configured for full-duplex communications, and wherein the UE ignores synchronization signal blocks that are configured in full-duplex symbols.

Aspect 41: The method of any of aspects 39 through 40, wherein the capability message indicates that the UE does not support receiving synchronization signal blocks in symbols that are configured for full-duplex communications, and wherein the UE ignores full-duplex configuration information that is provided in common signaling for the plurality of UEs.

Aspect 42: The method of any of aspects 29 through 41, wherein the full-duplex communications are configured by a sub-band full-duplex configuration in which at least a first sub-band of a component carrier bandwidth is configured for downlink communications and at least a second sub-band of the component carrier bandwidth or another component carrier is configured for uplink communications.

Aspect 43: A UE for wireless communications, comprising one or more memories storing processor-executable code, and one or more processors coupled with the one or more memories and individually or collectively operable to execute the code to cause the UE to perform a method of any of aspects 1 through 7.

Aspect 44: A UE for wireless communications, comprising at least one means for performing a method of any of aspects 1 through 7.

Aspect 45: A non-transitory computer-readable medium storing code for wireless communications, the code comprising instructions executable by a processor to perform a method of any of aspects 1 through 7.

Aspect 46: A UE for wireless communications, comprising one or more memories storing processor-executable code, and one or more processors coupled with the one or more memories and individually or collectively operable to execute the code to cause the UE to perform a method of any of aspects 8 through 21.

Aspect 47: A UE for wireless communications, comprising at least one means for performing a method of any of aspects 8 through 21.

Aspect 48: A non-transitory computer-readable medium storing code for wireless communications, the code comprising instructions executable by a processor to perform a method of any of aspects 8 through 21.

Aspect 49: A network entity for wireless communications, comprising one or more memories storing processor-executable code, and one or more processors coupled with the one or more memories and individually or collectively operable to execute the code to cause the network entity to perform a method of any of aspects 22 through 28.

Aspect 50: A network entity for wireless communications, comprising at least one means for performing a method of any of aspects 22 through 28.

Aspect 51: A non-transitory computer-readable medium storing code for wireless communications, the code comprising instructions executable by a processor to perform a method of any of aspects 22 through 28.

Aspect 52: A network entity for wireless communications, comprising one or more memories storing processor-executable code, and one or more processors coupled with the one or more memories and individually or collectively operable to execute the code to cause the network entity to perform a method of any of aspects 29 through 42.

Aspect 53: A network entity for wireless communications, comprising at least one means for performing a method of any of aspects 29 through 42.

Aspect 54: A non-transitory computer-readable medium storing code for wireless communications, the code comprising instructions executable by a processor to perform a method of any of aspects 29 through 42.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive first configuration information for full-duplex communications for a set of symbols, the full-duplex communications providing uplink communications and downlink communications for each symbol of the set of symbols;

receive second configuration information for synchronization signal block transmissions, wherein the second configuration information indicates at least a first subset of symbols of the set of symbols overlaps with one or more symbols configured for a synchronization signal block transmission;

receive scheduling information that indicates an uplink transmission is scheduled for transmission in at least a first symbol of the first subset of symbols; and configure the first symbol for uplink communications or for downlink communications for reception of the synchronization signal block transmission based at least in part on a priority rule associated with the full-duplex communications, wherein the priority rule indicates the first symbol is to be configured for uplink communications or for downlink communications for reception of the synchronization signal block transmission based at least in part on whether the uplink transmission is a dynamically scheduled uplink transmission or a configured grant uplink transmission, and wherein, for the configured grant uplink transmission, the priority rule is further based at least in part on whether the UE is indicated to measure the synchronization signal block transmission in the first symbol.

2. The UE of claim 1, wherein, to receive the scheduling information, the one or more processors are individually or collectively operable to execute the code to cause the UE to:

receive downlink control information that includes a dynamically scheduled uplink resource allocation of a set of resources that includes the first symbol, and wherein the one or more processors are individually or collectively further operable to execute the code to cause the UE to:

transmit the uplink transmission in the first symbol based at least in part on the priority rule.

3. The UE of claim 1, wherein, to receive the scheduling information, the one or more processors are individually or collectively operable to execute the code to cause the UE to:

receive configured grant information that provides periodic uplink resources for a plurality of configured grant uplink transmissions, including first periodic uplink resources that include the first symbol for a first configured grant uplink transmission, and wherein the one or more processors are individually or collectively further operable to execute the code to cause the UE to:

receive the synchronization signal block transmission in the first symbol based at least in part on the priority rule and the second configuration information indicating that the UE is to measure the synchronization signal block transmission, and wherein the first configured grant uplink transmission is skipped.

4. The UE of claim 1, wherein, to receive the scheduling information, the one or more processors are individually or collectively operable to execute the code to cause the UE to:

receive configured grant information that provides periodic uplink resources for a plurality of configured grant uplink transmissions, including first periodic uplink resources that include the first symbol for a first configured grant uplink transmission, and wherein the one or more processors are individually or collectively further operable to execute the code to cause the UE to:

transmit the uplink transmission in the first symbol based at least in part on the priority rule and the second configuration information indicating that the UE is not to measure the synchronization signal block transmission in the first symbol.

5. The UE of claim 1, wherein the one or more processors are individually or collectively further operable to execute the code to cause the UE to:

transmit a capability message that indicates whether the UE supports receipt of synchronization signal blocks in symbols that are configured for full-duplex communications.

6. The UE of claim 5, wherein the capability message is transmitted in capability signaling subsequent to establishment of a radio resource control connection, or is transmitted as an early UE capability indication prior to establishment of the radio resource control connection.

7. The UE of claim 1, wherein the first configuration information is a sub-band full-duplex configuration in which at least a first sub-band of a component carrier bandwidth is configured for downlink communications and at least a second sub-band of the component carrier bandwidth or another component carrier is configured for uplink communications.

8. A network entity, comprising:

one or more memories storing processor-executable code; and one or more processors coupled with the one or more memories and individually or collectively operable to execute the code to cause the network entity to:

transmit, to a user equipment (UE), first configuration information for full-duplex communications for a set of symbols, the full-duplex communications providing uplink communications and downlink communications for each symbol of the set of symbols;

transmit second configuration information for synchronization signal block transmissions, wherein the second configuration information indicates at least a first subset of symbols of the set of symbols overlaps with one or more symbols configured for a synchronization signal block transmission;

transmit, to the UE, scheduling information that indicates an uplink transmission is scheduled for transmission in at least a first symbol of the first subset of symbols; and monitor the first symbol for uplink communications from the UE based at least in part on a priority rule associated with the full-duplex communications, wherein the priority rule indicates the first symbol is for uplink communications from the UE or for downlink communications of the synchronization signal block transmission based at least in part on whether the uplink transmission is a dynamically scheduled uplink transmission or a configured grant uplink transmission, and wherein, for the configured grant uplink transmission, the priority rule is further based at least in part on whether the UE is indicated to measure the synchronization signal block transmission in the first symbol.

9. The network entity of claim 8, wherein, to transmit the scheduling information, the one or more processors are individually or collectively operable to execute the code to cause the network entity to:

transmit downlink control information that includes a dynamically scheduled uplink resource allocation of a set of resources that includes the first symbol, and wherein the one or more processors are individually or collectively further operable to execute the code to cause the network entity to:

receive the uplink transmission in the first symbol based at least in part on the priority rule.

10. The network entity of claim 8, wherein, to transmit the scheduling information, the one or more processors are individually or collectively operable to execute the code to cause the network entity to:

transmit configured grant information that provides periodic uplink resources for a plurality of configured grant uplink transmissions, including first periodic uplink resources that include the first symbol for a first configured grant uplink transmission, and wherein the one or more processors are individually or collectively further operable to execute the code to cause the network entity to:

skip the monitoring of the first symbol for the first configured grant uplink transmission based at least in part on the priority rule and the second configuration information indicating that the UE is to measure the synchronization signal block transmission.

11. The network entity of claim 8, wherein the one or more processors are individually or collectively further operable to execute the code to cause the network entity to:

receive a capability message from the UE that indicates whether the UE supports receipt of synchronization signal blocks in symbols that are configured for full-duplex communications.

12. A method for wireless communication at a user equipment (UE), comprising:

receiving first configuration information for full-duplex communications for a set of symbols, the full-duplex communications providing uplink communications and downlink communications for each symbol of the set of symbols;

receiving second configuration information for synchronization signal block transmissions, wherein the second configuration information indicates at least a first subset of symbols of the set of symbols overlaps with one or more symbols configured for a synchronization signal block transmission;

receiving scheduling information that indicates an uplink transmission is scheduled for transmission in at least a first symbol of the first subset of symbols; and configuring the first symbol for uplink communications or for downlink communications for reception of the synchronization signal block transmission based at least in part on a priority rule associated with the full-duplex communications, wherein the priority rule indicates the first symbol is to be configured for uplink communications or for downlink communications for reception of the synchronization signal block transmission based at least in part on whether the uplink transmission is a dynamically scheduled uplink transmission or a configured grant uplink transmission, and wherein, for the configured grant uplink transmission, the priority rule is further based at least in part on whether the UE is indicated to measure the synchronization signal block transmission in the first symbol.

13. The method of claim 12, wherein receiving the scheduling information comprises:

receiving downlink control information that includes a dynamically scheduled uplink resource allocation of a set of resources that includes the first symbol, and wherein the method further comprises:

transmitting the uplink transmission in the first symbol based at least in part on the priority rule.

14. The method of claim 12, wherein receiving the scheduling information comprises:

receiving configured grant information that provides periodic uplink resources for a plurality of configured grant uplink transmissions, including first periodic uplink resources that include the first symbol for a first configured grant uplink transmission, and wherein the method further comprises:

receiving the synchronization signal block transmission in the first symbol based at least in part on the priority rule and the second configuration information indicating that the UE is to measure the synchronization signal block transmission, and wherein the first configured grant uplink transmission is skipped.

15. The method of claim 12, wherein receiving the scheduling information comprises:

receiving configured grant information that provides periodic uplink resources for a plurality of configured grant uplink transmissions, including first periodic uplink resources that include the first symbol for a first configured grant uplink transmission, and wherein the method further comprises:

transmitting the uplink transmission in the first symbol based at least in part on the priority rule and the second configuration information indicating that the UE is not to measure the synchronization signal block transmission in the first symbol.

16. The method of claim 12, further comprising:

transmitting a capability message that indicates whether the UE supports receipt of synchronization signal blocks in symbols that are configured for full-duplex communications.

17. The method of claim 16, wherein the capability message is transmitted in capability signaling subsequent to establishment of a radio resource control connection, or is transmitted as an early UE capability indication prior to establishment of the radio resource control connection.

18. The method of claim 12, wherein the first configuration information is a sub-band full-duplex configuration in which at least a first sub-band of a component carrier bandwidth is configured for downlink communications and at least a second sub-band of the component carrier bandwidth or another component carrier is configured for uplink communications.

19. A method for wireless communication at a network entity, comprising:

transmitting, to a user equipment (UE), first configuration information for full-duplex communications for a set of symbols, the full-duplex communications providing uplink communications and downlink communications for each symbol of the set of symbols;

transmitting second configuration information for synchronization signal block transmissions, wherein the second configuration information indicates at least a first subset of symbols of the set of symbols overlaps with one or more symbols configured for a synchronization signal block transmission;

transmitting, to the UE, scheduling information that indicates an uplink transmission is scheduled for transmission in at least a first symbol of the first subset of symbols; and monitoring the first symbol for uplink communications from the UE based at least in part on a priority rule associated with the full-duplex communications, wherein the priority rule indicates the first symbol is for uplink communications from the UE or for downlink communications of the synchronization signal block transmission based at least in part on whether the uplink transmission is a dynamically scheduled uplink transmission or a configured grant uplink transmission, and wherein, for the configured grant uplink transmission, the priority rule is further based at least in part on whether the UE is indicated to measure the synchronization signal block transmission in the first symbol.

20. The method of claim 19, wherein transmitting the scheduling information comprises:

transmitting downlink control information that includes a dynamically scheduled uplink resource allocation of a set of resources that includes the first symbol, and wherein the method further comprises:

receiving the uplink transmission in the first symbol based at least in part on the priority rule.

21. The method of claim 19, wherein transmitting the scheduling information comprises:

transmitting configured grant information that provides periodic uplink resources for a plurality of configured grant uplink transmissions, including first periodic uplink resources that include the first symbol for a first configured grant uplink transmission, and wherein the method further comprises:

skipping monitoring of the first symbol for the first configured grant uplink transmission based at least in part on the priority rule and the second configuration information indicating that the UE is to measure the synchronization signal block transmission.

22. The method of claim 19, further comprising:

receiving a capability message from the UE that indicates whether the UE supports receipt of synchronization signal blocks in symbols that are configured for full-duplex communications.

23. The method of claim 22, wherein the capability message is transmitted in capability signaling subsequent to establishment of a radio resource control connection, or is transmitted as an early UE capability indication prior to establishment of the radio resource control connection.

24. The method of claim 19, wherein the first configuration information is a sub-band full-duplex configuration in which at least a first sub-band of a component carrier bandwidth is configured for downlink communications and at least a second sub-band of the component carrier bandwidth or another component carrier is configured for uplink communications.

* * * * *